(12) United States Patent
Oh et al.

(10) Patent No.: US 9,503,909 B2
(45) Date of Patent: Nov. 22, 2016

(54) APPARATUS AND METHOD FOR CONTROLLING A RELAY IN A COMMUNICATION SYSTEM

(75) Inventors: Seong-Keun Oh, Gyeonggi-do (KR); Min Lee, Gyeonggi-do (KR)

(73) Assignee: AJOU UNIVERSITY INDUSTRY-ACADEMIC COOPERATION FOUNDATION, Suwon-Si (KR)

( * ) Notice: Subject to any disclaimer, the term of this patent is extended or adjusted under 35 U.S.C. 154(b) by 254 days.

(21) Appl. No.: 14/002,628

(22) PCT Filed: Mar. 2, 2012

(86) PCT No.: PCT/KR2012/001584
§ 371 (c)(1),
(2), (4) Date: Aug. 30, 2013

(87) PCT Pub. No.: WO2012/118348
PCT Pub. Date: Sep. 7, 2012

(65) Prior Publication Data
US 2013/0336202 A1    Dec. 19, 2013

(30) Foreign Application Priority Data

Mar. 1, 2011    (KR) .................. 10-2011-0018261

(51) Int. Cl.
*H04W 16/26*    (2009.01)
*H04B 7/155*    (2006.01)
*H04W 84/04*    (2009.01)

(52) U.S. Cl.
CPC ............ *H04W 16/26* (2013.01); *H04B 7/155* (2013.01); *H04B 7/15528* (2013.01); *H04W 84/045* (2013.01)

(58) Field of Classification Search
CPC .. H04W 16/26; H04W 84/045; H04B 7/155; H04B 7/15528
See application file for complete search history.

(56) References Cited

U.S. PATENT DOCUMENTS

2004/0077374 A1    4/2004    Terry

OTHER PUBLICATIONS

D. Soldani, et al., "Wireless Relays for Broadband Access", IEEE Communications Magazine, Mar. 2008, pp. 58-66.
K. Loa, et al., "IMT-advanced relay standards", IEEE Communications Magazine, Aug. 2010, pp. 40-48.
International Search Report (PCT/ISA/210 Form) received in International Application No. PCT/KR2012/001584, dated Mar. 2, 2012.

*Primary Examiner* — Jackie Zuniga Abad
(74) *Attorney, Agent, or Firm* — Stein IP, LLC

(57) ABSTRACT

An apparatus and method for controlling a communication link that interconnects communication devices through a relay in a communication system is disclosed. A relay connection configuration between one or more first communication devices and one or more second communication devices is determined, and communication between the first communication device and the second communication device is provided by the determined connection configuration. The relay connection configuration includes a backhaul network connection configuration that interconnects the first communication device and the relay device, an access network connection configuration that interconnects the second communication device and the relay device, a direction access connection configuration that interconnects the first communication device and the second communication device, and/or an internal connection configuration that interconnects a backhaul network interface bank connected to the first communication device and an access network interface bank connected to the second communication device in the relay device.

20 Claims, 47 Drawing Sheets

APPARATUS AND METHOD FOR CONTROLLING A RELAY IN A COMMUNICATION SYSTEM

PRIORITY

This application is a National Stage application under 35 U.S.C. §371 of an International application filed on Mar. 2, 2012 and assigned application No. PCT/KR2012/001584, and claims the benefit under 35 U.S.C. §365(b) of a Korean patent application filed on Mar. 1, 2011 in the Korean Intellectual Property Office and assigned Serial No. 10-2011-0018261, the entire disclosure of each of which is hereby incorporated by reference.

TECHNICAL FIELD

The present invention relates to an apparatus and a method for controlling a relay in a communication system, and more particularly, to an apparatus and a method for controlling a communication link interconnecting communication nodes through a relay node.

BACKGROUND ART

In general, in a communication system in which a base station and a user terminal directly communicate with each other, when the user terminal is located in an area having a bad signal quality, such as a cell boundary area or a shaded area, it is difficult for the communication system to provide a reliable communication service.

In order to solve this problem, more attentions are recently being paid to a relay network which can extend the coverage and increase the system capacity with a relatively low cost. Especially, a relay node installed in a cell boundary area or a shaded area, which has a bad signal quality, can improve the system performance with a relatively low cost.

Usually, a relay network refers to a network in which a relay node relays a signal between a source node transmitting the signal and a destination node receiving the signal for expansion of the service coverage, increase of the system capacity, and so on.

For example, a signal transmitted by the source node is received by the destination node and the relay node. Further, the relay node transmits the signal received from the source node to the destination node. By receiving both the signal transmitted from the source node and the signal transmitted from the relay node, the destination node can increase the probability of successful reception.

The most representative technology of the relay network includes a relay-based network which is used in Wireless Personal Area Network (WPAN) based on the IEEE 802.15.3 standard.

For the relay network as described above, there is an urgent necessity to prepare a communication protocol, which not only can improve the performance of the network and reduce the number of times of channel uses, but can also achieve a stable performance in an actual wireless communication environment that is unable to guarantee the reliability.

Further, in order to improve the communication quality in a wireless communication environment having a rapid change in the channel characteristics, it is urgently required to prepare a scheme for rapidly allocating or changing an optimum communication link according to a change in the channel environment.

DISCLOSURE

Technical Problem

An embodiment of the present invention proposes an apparatus and a method for controlling a communication link interconnecting communication nodes in a relay node.

Another embodiment of the present invention proposes an apparatus and a method for determining a relay connection configuration by itself in the relay node.

Another embodiment of the present invention proposes an apparatus and a method for selecting, by the relay node, one of a direct access connection and an indirect access connection for communication between at least one first communication node and at least one second communication node.

Another embodiment of the present invention proposes an apparatus and a method for setting, by the relay node, a backhaul network connection configuration with at least one first communication node and an access network connection configuration with at least one second communication node.

Another embodiment of the present invention proposes an apparatus and a method for setting an internal connection configuration for communication between at least one first communication node and at least one second communication node within the relay node.

Another embodiment of the present invention proposes an apparatus and a method for supporting communication between a plurality of first communication nodes configured by different RATs and a plurality of second communication nodes configured by different RATs in the relay node.

Another embodiment of the present invention proposes an apparatus and a method for determining a relay connection configuration performed by the relay node while sharing roles with another communication node in the determining.

Technical Solution

In accordance with an aspect of the present invention, there is provided a method for controlling connection between at least one first communication node and at least one second communication node by a relay node in a communication system. The method comprises: determining a relay connection configuration for communication between the at least one first communication node and the at least one second communication node, wherein the relay connection configuration comprises at least one connection configuration among an indirect access connection configuration to interconnect the at least one first communication node and the at least one second communication node with passing through the relay node, and a direct access connection configuration to interconnect the at least one first communication node and the at least one second communication node without passing through the relay node, wherein the indirect access connection configuration comprises: a backhaul network connection configuration to interconnect the at least one first communication node and the relay node; an access network connection configuration to interconnect the at least one second communication node and the relay node; and an internal connection configuration to interconnect a backhaul network interface bank to be connected to the at least one first communication node and an access network interface bank to be connected to the at least one second communication node within the relay node.

Preferably, at least one Radio Access Technology (RAT) set corresponding to the at least one first communication node is equal to at least one RAT set corresponding to the at least one second communication node; or at least one RAT set corresponding to the at least one first communication node is different from at least one RAT set corresponding to the at least one second communication node, and when at least one among the at least one first communication node and the at least one second communication node includes a plurality of communication nodes, RATs of at least two of the plurality of the at least one first communication node or the at least one second communication node are identical or different.

More preferably, a part of operations for determining the relay connection configuration is transferred to or taken back from at least one of the at least one first communication node and the at least one second communication node.

More preferably, the relay connection configuration is determined in accordance with at least one among a channel condition, a service condition, an access condition, a base station request, and a user request.

More preferably, the determining of the relay connection configuration comprises: determining at least one of a network access structure, a relay structure, a cooperation scheme, and an interface configuration, wherein the determining of the network access structure comprises at least one of: for the backhaul network connection configuration, a first process of determining a connection configuration for communication between at least one backhaul network interface composing the relay node and the at least one first communication node; for the access network connection configuration, a second process of determining a connection configuration for communication between at least one access network interface composing the relay node and the at least one second communication node; for the direct access connection configuration, a third process of determining a connection configuration for direct communication between the at least one first communication node and the at least one second communication node, the determining of the relay structure comprises: determining an internal connection configuration of the relay node by at least one of a matching matrix setting and a link matching for internal connection between the backhaul network interface bank and the access network interface bank composing the relay node, wherein the matching matrix setting is a connection configuration to determine a matching relation between at least one backhaul network interface and at least one access network interface; and the link matching is a connection configuration to match an RAT signal of at least one backhaul network interface with an RAT signal of at least one access network interface, and the determining of the cooperation scheme comprises: determining at least one of a cooperation transmission scheme and a cooperation structure, wherein the cooperation transmission scheme comprises a non-cooperation scheme, a diversity cooperation scheme, and a multiplexing cooperation scheme; and the cooperation structure comprises a base station-relay node cooperation structure, a relay node-relay node cooperation structure, and a relay node-user terminal cooperation structure.

More preferably, in order to determine the network access structure, a state of each interface included in the access network interface bank and the backhaul network interface bank is set to one of an operation state, an off state, and a standby state.

More preferably, the connection configuration for the backhaul network connection configuration comprises: a connection configuration between a base station or another relay node and a backhaul network interface included in the relay node; a connection configuration between a backhaul network interface and a plurality of base stations, a plurality of other relay nodes, or a plurality of nodes including at least one base station and at least another one relay node; a connection configuration between a plurality of backhaul network interfaces and a base station or another relay node; or a connection configuration between a plurality of backhaul network interfaces and a plurality of base stations, a plurality of other relay nodes, or a plurality of nodes including at least one base station and at least another one relay node, the connection configuration for the access network connection configuration comprises: a connection configuration between a user terminal or another relay node and an access network interface included in the relay node; a connection configuration between an access network interface and a plurality of user terminals, a plurality of other relay nodes, or a plurality of nodes including at least one user terminal and at least another one relay node; a connection configuration between a plurality of access network interfaces and a user terminal or another relay node; or a connection configuration between a plurality of access network interfaces and a plurality of user terminals, a plurality of other relay nodes, or a plurality of nodes including at least one user terminal and at least another one relay node, and the connection configuration for the direct access connection configuration comprises: a direct access connection configuration between a base station or another relay node and a user terminal or another relay node; a direct access connection configuration between a plurality of base stations, a plurality of other relay nodes, or a plurality of nodes including at least one base station and at least another one relay node and a plurality of user terminals, a plurality of other relay nodes, or a plurality of nodes including at least one user terminal and at least another one relay node; a direct access connection configuration between a base station or another relay node and a plurality of user terminals, a plurality of other relay nodes, or a plurality of nodes including at least one user terminal and at least another one relay node; or a direct access connection configuration between a plurality of base stations, a plurality of relay nodes, or a plurality of nodes including at least one base station and at least another one relay node and a user terminal or another relay node.

More preferably, the RAT signal of the at least one backhaul network interface and the RAT signal of the at least one access network interface are matched in accordance with at least one among a relay matching, a conversion matching, a distribution matching, a distribution-conversion matching, a combination matching, a combination-conversion matching, a combination-distribution matching, a combination distribution-conversion matching, a combination-conversion distribution matching, and a combination-conversion distribution-conversion matching.

More preferably, the interface configuration comprises a connection configuration to independently reconfigure RAT for each of at least one backhaul network interface and at least one access network interface included in the relay node into another RAT.

More preferably, scanning at least one of the at least one first communication node and the at least one second communication node.

In accordance with another aspect of the present invention, there is provided a relay node for controlling connection between at least one first communication node and at least one second communication node in a communication system. The relay node comprises: a backhaul network interface bank including at least one backhaul network interface to form a link with the at least one first communication node; an access network interface bank including at least one access network interface to form a link with the at least one second communication node; and a control unit to determine a relay connection configuration between the at least one first communication node and the at least one second communication node and control the backhaul network interface bank and the access network interface bank by the determined connection configuration, wherein the relay connection configuration comprises at least one connection configuration among an indirect access connection configuration to interconnect the at least one first communication node and the at least one second communication node with passing through the relay node and a direct access connection configuration to interconnect the at least one first communication node and the at least one second communication node without passing through the relay node, wherein the indirect access connection configuration comprises: a backhaul network connection configuration to interconnect the at least one first communication node and the relay node; an access network connection configuration to interconnect the at least one second communication node and the relay node; and an internal connection configuration to interconnect a backhaul network interface bank to be connected to the at least one first communication node and an access network interface bank to be connected to the at least one second communication node within the relay node.

More preferably, at least one RAT set corresponding to the at least one first communication node is equal to at least one RAT set corresponding to the at least one second communication node or at least one RAT set corresponding to the at least one first communication node is different from at least one RAT set corresponding to the at least one second communication node, and when at least one among the at least one first communication node and the at least one second communication node includes a plurality of communication nodes, RATs of at least two of the plurality of the at least one first communication node or the at least one second communication node are identical or different.

Further, more preferably, a connection configuration determining unit configuring the control unit performs transfers or taken back a part of an operation for determining the relay connection configuration to or from at least one of the at least one first communication node and the at least one second communication node.

Further, more preferably, the relay connection configuration is determined in accordance with at least one among a channel condition, a service condition, an access condition, a base station request, and a user request.

Further, more preferably, a connection configuration determining unit configuring the control unit determines at least one of a network access structure, a relay structure, a cooperation scheme, and an interface configuration, wherein the network access structure is determined by at least one of: for the backhaul network connection configuration, a first process of determining a connection configuration for communication between at least one backhaul network interface composing the relay node and the at least one first communication node; for the access network connection configuration, a second process of determining a connection configuration for communication between at least one access network interface composing the relay node and the at least one second communication node; for the direct access connection configuration, a third process of determining a connection configuration for direct communication between the at least one first communication node and the at least one second communication node, the relay structure is determined by determining an internal connection configuration of the relay node by at least one of a matching matrix setting and a link matching for internal connection between the backhaul network interface bank and the access network interface bank composing the relay node, wherein the matching matrix setting is a connection configuration to determine a matching relation between at least one backhaul network interface and at least one access network interface; the link matching is a connection configuration to match an RAT signal of at least one backhaul network interface with an RAT signal of at least one access network interface, and the cooperation scheme is determined by determining at least one of a cooperation transmission scheme and a cooperation structure, wherein the cooperation transmission scheme comprises a non-cooperation scheme, a diversity cooperation scheme, and a multiplexing cooperation scheme; and the cooperation structure comprises a base station-relay node cooperation structure, a relay node-relay node cooperation structure, and a relay node-user terminal cooperation structure.

Further, more preferably, the control unit further includes a connection operation control unit to set, in order to determine the network access structure, a state of each interface included in the access network interface bank and the backhaul network interface bank to one of an operation state, an off state, and a standby state.

Further, more preferably, the connection configuration for the backhaul network connection configuration comprises: a connection configuration between a base station or another relay node and a backhaul network interface included in the relay node; a connection configuration between a backhaul network interface and a plurality of base stations, a plurality of other relay nodes, or a plurality of nodes including at least one base station and at least another one relay node; a connection configuration between a plurality of backhaul network interfaces and a base station or another relay node; or a connection configuration between a plurality of backhaul network interfaces and a plurality of base stations, a plurality of other relay nodes, or a plurality of nodes including at least one base station and at least another one relay node, the connection configuration for the access network connection configuration comprises: a connection configuration between a user terminal or another relay node and an access network interface included in the relay node; a connection configuration between an access network interface and a plurality of user terminals, a plurality of other relay nodes, or a plurality of nodes including at least one user terminal and at least another one relay node; a connection configuration between a plurality of access network interfaces and a user terminal or another relay node; or a connection configuration between a plurality of access network interfaces and a plurality of user terminals, a plurality of other relay nodes, or a plurality of nodes including at least one user terminal and at least another one relay node, and the connection configuration for the direct access connection configuration comprises: a direct access connection configuration between a base station or another relay node and a user terminal or another relay node; a direct access connection configuration between a plurality of base stations, a plurality of other relay nodes, or a plurality of nodes including at least one base station and at least another one relay node and a plurality of user terminals, a plurality of other relay nodes, or a plurality of nodes including at least one user terminal and at least another one relay node; a direct access connection configuration between a base station or another relay node and a plurality of user terminals, a plurality of other relay nodes, or a plurality of nodes including at least one user terminal and at least another one relay node; or a direct access connection configuration between a plurality of base stations, a plurality of relay nodes, or a plurality of nodes including at least one base station and at least another one relay node and a user terminal or another relay node.

Further, more preferably, the RAT signal of the at least one backhaul network interface and the RAT signal of the at least one access network interface are matched in accordance with at least one among a relay matching, a conversion matching, a distribution matching, a distribution-conversion matching, a combination matching, a combination-conversion matching, a combination-distribution matching, a combination distribution-conversion matching, a combination-conversion distribution matching, and a combination-conversion distribution-conversion matching.

Further, more preferably, the interface configuration comprises a connection configuration to independently reconfigure RAT for each of at least one backhaul network interface and at least one access network interface included in the relay node into another RAT.

Further, more preferably, the control unit performs scanning at least one of the at least one first communication node and the at least one second communication node.

Advantageous Effects

A relay node designed according to an embodiment of the present invention can provide a service which guarantees a Quality of Service (OoS) required by a user, by providing an adaptive relay function that determines a relay connection configuration, including a network access structure, a relay structure, a cooperation scheme, and an interface configuration, in consideration of a communication environment between a base station and a relay node, a communication environment between a relay node and a user terminal, and a communication environment between a base station and a user terminal.

Further, a relay node designed according to an embodiment of the present invention can configure an efficient and flexible communication network in various RAT environments and communication environments, by matching different backhaul network RAT sets and different access network RAT sets with each other.

Further, a relay node designed according to an embodiment of the present invention can perform relaying through various RAT signal matchings even when RAT of a base station and RAT of a user terminal are different, and can achieve a multi-homing for relaying signals between at least one user terminal and at least two base stations whose RATs are different by combining the signals through RAT conversion even when at least two backhaul network interfaces are configured by different RATs, so as to guarantee the service connectivity for the user terminal.

Further, when a relay node designed according to an embodiment of the present invention includes a plurality of backhaul network interfaces, the relay node can scan other adjacent base stations through a scan function while maintaining a communication with a currently connected base station, and can independently communicate with the adjacent base stations.

Further, a relay node designed according to an embodiment of the present invention can determine an access network connection configuration for providing various RAT services to one service area and simultaneously provide a plurality of RAT services, so as to efficiently process or distribute traffics.

Further, a relay node designed according to an embodiment of the present invention can dynamically reconfigure a network, including a network access structure, a relay structure, a cooperation scheme, and an interface configuration, according to a channel condition, a service condition, an access condition, a base station request, a user request, etc.

BEST MODE

Mode for Invention

Hereinafter, embodiments of the present invention will be described in detail. In the following description, only the part necessary for the understanding of operations according to the present invention will be described and a detailed description of other parts will be omitted in order not to make the subject matter of the present invention rather unclear.

In the following description of embodiments of the present invention, a relay control scheme and a relay structure for the same in order to support communication between at least one first communication node and at least one second communication node through a relay node will be discussed in detail. For example, the first communication node may be a base station or another relay node and the second communication node may be a user terminal or another relay node.

The relay control scheme proposed by an embodiment of the present invention includes a network access structure determining process, a relay structure determining process, a cooperation scheme determining process, and an interface configuration determining process.

Further, a relay control scheme proposed by an embodiment of the present invention defines a direct access connection configuration and an indirect access connection configuration as examples for setting a connection between at least one first communication node and at least one second communication node.

The direct access connection configuration refers to a connection configuration for directly connecting at least one first communication node with at least one second communication node, and the indirect access connection configuration refers to a connection configuration for connecting at least one first communication node with at least one second communication node through a relay node. Therefore, for example, the indirect access connection configuration may include a backhaul network connection configuration, an internal connection configuration, and an access network connection configuration.

A. Relay Control Method

Hereinafter, a relay control method according to an embodiment of the present invention will be described.

Figure 1:
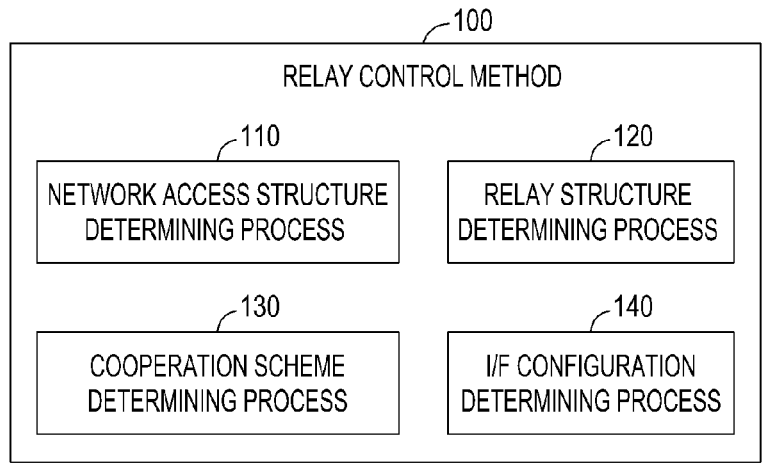
FIG. 1 illustrates an arrangement of operations to be performed for relay control according to an embodiment of the present invention.

FIG. 1 illustrates an arrangement of operations to be performed for relay control according to an embodiment of the present invention. In FIG. 1, the relay control method 100 is defined to include a network access structure determining process 110, a relay structure determining process 120, a cooperation scheme determining process 130, and an interface configuration determining process 140. However, the relay control method 100 shown in FIG. 1 is only an embodiment for relay control, and it is natural that some processes may be removed from the method or the method may be performed by a combination of only some or all of the processes.

First, in the relay control according to an embodiment of the present invention, the network access structure determining process 110 will be described.

For communication between at least one first communication node and at least one second communication node, the network access structure determining process 110 determines a connection configuration (backhaul link connection configuration) between a relay node and the first communication node and a connection configuration (access link connection configuration) between the relay node and the second communication node. For example the relay node has a backhaul network interface bank for link with the first communication node and an access network interface bank for link with the second communication node.

The relay node independently determines the state of each interface of the access network interface bank and the backhaul network interface bank in order to determine the network access structure. For example, the relay node determines the state of each interface of the access network interface bank and the backhaul network interface bank, as one of an operation state, an off state, and a standby state.

Moreover, the network access structure determining process 110 determines a connection structure for direct communication between at least one first communication node and at least one second communication node.

More specifically, the relay node configures a backhaul link connection for communication with at least one first communication node through at least one backhaul network interface. For example, the relay node connects one backhaul network interface with one first communication node or connects one backhaul network interface with a plurality of first communication nodes. Otherwise, the relay node connects a plurality of backhaul network interfaces with one first communication node or connects a plurality of backhaul network interfaces with a plurality of first communication nodes. In this event, the plurality of first communication nodes may be configured by a combination of at least one base station and at least another one relay node or be configured by only a plurality of base stations or a plurality of other relay nodes.

The relay node configures an access link connection for communication with at least one second communication node through at least one access network interface. For example, the relay node connects one access network interface with one second communication node or connects one access network interface with a plurality of second communication nodes. Otherwise, the relay node connects a plurality of access network interfaces with one second communication node or connects a plurality of access network interfaces with a plurality of second communication nodes. In this event, the plurality of second communication nodes may be configured by a combination of at least one user terminal and at least another one relay node or be configured by only a plurality of user terminals or a plurality of other relay nodes.

The relay node configures a direct access link connection for direct communication between at least one first communication node and at least one second communication node. For example, in the process of configuring a direct access link connection, one first communication node and one second communication node are directly connected to each other, a plurality of first communication nodes and one second communication node are directly connected to each other, or one first communication node and a plurality of second communication nodes are directly connected to each other. In this event, the plurality of first communication nodes may be configured by a combination of a base station and other relay nodes or be configured by only a plurality of base stations or a plurality of other relay nodes. Further, the plurality of second communication nodes may be configured by a combination of a user terminal and other relay nodes or be configured by only a plurality of user terminals or a plurality of other relay nodes.

Next, the relay structure determining process performed by the relay node will be described.

The relay structure determining process determines an internal connection structure for communication between at least one first communication node and at least one second communication node. That is, this process corresponds to a process of determining an internal connection structure for relaying between at least one first communication node and at least one second communication node. The first communication node may include a base station and another relay node and the second communication node may include a user terminal and another relay node.

More specifically, the relay node connects at least one backhaul link and at least one access link for relaying between at least one first communication node and at least one second communication node. To this end, the relay node performs at least one of a matching matrix setting and a link matching.

The matching matrix setting determines a matching relation between at least one backhaul network interface and at least one access network interface. The link matching matches an RAT signal of at least one backhaul network interface with an RAT signal of at least one access network interface. As a method for the link matching, a relay matching, a conversion matching, a distribution matching, a distribution-conversion matching, a combination matching, a combination-conversion matching, a combination-distribution matching, a combination distribution-conversion matching, a combination-conversion distribution matching, or a combination-conversion distribution-conversion matching may be used.

Next, the cooperation scheme determining process performed by the relay node will be described.

The cooperation scheme determining process determines a cooperation scheme to be applied to the relay node for the communication between at least one first communication node and at least one second communication node. The first communication node may include a base station or another relay node and the second communication node may include a user terminal or another relay node.

The cooperation scheme includes at least one of a cooperation transmission scheme and a cooperation structure. The cooperation transmission scheme includes a non-cooperation scheme, a diversity cooperation scheme, and a multiplexing cooperation scheme, and the cooperation structure includes a base station-relay node cooperation structure, a relay node-relay node cooperation structure, and a relay node-user terminal cooperation structure.

For example, the non-cooperation scheme refers to a scheme in which a relay node does not transmit a signal, which the relay node has received from at least one first communication node, to at least one second communication node.

The diversity cooperation scheme refers to a scheme in which a relay node forwards a signal, which the relay node has received from at least one first communication node, to at least one second communication node so as to provide a diversity gain.

The multiplexing cooperation scheme refers to a scheme in which a relay node forwards a signal, which the relay node has received from at least one first communication node, to at least one second communication node so as to provide a multiplexing gain.

The base station-relay node cooperation structure refers to a structure in which a relay node forwards, in cooperation with a base station, a signal to a user terminal, and the relay node-relay node cooperation structure refers to a structure in which a relay node forwards, in cooperation with another relay node, a signal to a base station or a user terminal. The relay node-user terminal cooperation structure refers to a structure in which a relay node forwards, in cooperation with a user terminal, a signal to a base station.

Finally, the interface configuration determining process performed by the relay node will be described.

The interface configuration determining process determines a backhaul network interface configuration for enabling a relay node to connect with at least one first communication node and an access network interface configuration for enabling a relay node to connect with at least one second communication node. The first communication node may include a base station or another relay node and the second communication node may include a user terminal or another relay node.

The interface configuration determining process independently reconfigures an RAT of each of at least one access network interface and at least one backhaul network interface included in the relay node. As a result, the relay node reconfigures an RAT of at least one backhaul network interface included in the relay node in order to form at least one backhaul link with at least one first communication node, into another RAT, or reconfigures an RAT of at least one access network interface included in the relay node in order to form at least one access link with at least one second communication node, into another RAT.

In order to reconfigure an RAT of the interface, a Software Defined Radio (SDR) technology may be used. For example, the relay node reconfigures an RAT of a first backhaul network interface into a first RAT by using the SDR in order to form a backhaul link with a first base station using the first RAT, and reconfigures an RAT of a first access network interface into a second RAT by using the SDR in order to form an access link with a first user terminal using the second RAT.

Thereafter, the relay node reconfigures an RAT of the first backhaul network interface into a second RAT by using the SDR in order to form a backhaul link with a second base station using the second RAT, and reconfigures an RAT of the first access network interface into a third RAT by using the SDR in order to form an access link with a second user terminal using the third RAT.

Based on the above discussion, the following comments can be made on a relay control method according to an embodiment of the present invention.

The relay control method illustrated in FIG. 1 corresponds to only an embodiment and may not require all of the four processes. For example, the relay control method 100 may exclude some processes among the network access structure determining process 110, the relay structure determining process 120, the cooperation scheme determining process 130, and the interface configuration determining process 140, and may be performed by only a part of them or a combination of all processes.

For example, in relaying, the network access structure may be determined such that a backhaul link connection between the backhaul network interface and the first base station is configured, and an access link connection between the access network interface and the first user terminal is configured. Further, the relay structure is determined to construct a link connection between the backhaul network interface and the access network interface for communication between the first base station and the first user terminal. Therefore, the network access structure determining process 110 and the relay structure determining process 120 are excluded.

In the case of the example described above, first, the relay node determines the connection configuration by itself by determining a cooperation scheme of the relay node for communication between the first user terminal and the first base station through the cooperation scheme determining process 130. For example, the relay node determines a diversity cooperation scheme through a base station-relay node cooperation structure by the cooperation scheme determining process 130. This is only one embodiment and the sequence may be changed.

As another example, through the network access structure determining process 110, the relay node may determine at least one base station and at least one user terminal for performing the relaying, and configure a backhaul link connection and an access link connection with the determined at least on base station and the determined at least one user terminal. In this event, the relay node reconfigures an RAT of each interface for connection between interfaces of the relay node, the at least one user terminal, and the at least one base station determined through the interface configuration determining process.

Moreover, the relay node determines a connection structure between the backhaul link and the access link through the relay structure determining process 120. For example, through the network access structure determining process 110, the relay node configures a backhaul link with the first base station and the second base station and an access link with the first user terminal. In this event, through the interface configuration determining process 140, the relay node reconfigures an RAT of the first backhaul network interface into a first RAT for a backhaul link connection with the first base station configured by the first RAT and reconfigures an RAT of the second backhaul network interface into a second RAT for a backhaul link connection with the second base station configured by the second RAT. Further, the relay node reconfigures an RAT of the first access network interface into a third RAT for an access link connection with the first base station configured by the third RAT.

Moreover, through the relay structure determining process 120, the relay node combines an RAT signal of the first backhaul network interface and an RAT signal of the second backhaul network interface to match with an RAT signal of the first access network interface, for communication between the first base station, and the second base station, and the first user terminal. In this event, in order to combine RAT signals of two backhaul network interfaces configured by different RATs and relay the RAT signals to an access network interface configured by another RAT, a combination-conversion matching is necessary. This is only one example and the sequence may be changed.

B☐ Relay Node Structure

Hereinafter, a structure of a relay node for applying a relay control method according to an embodiment of the present invention will be described.

Figure 2:
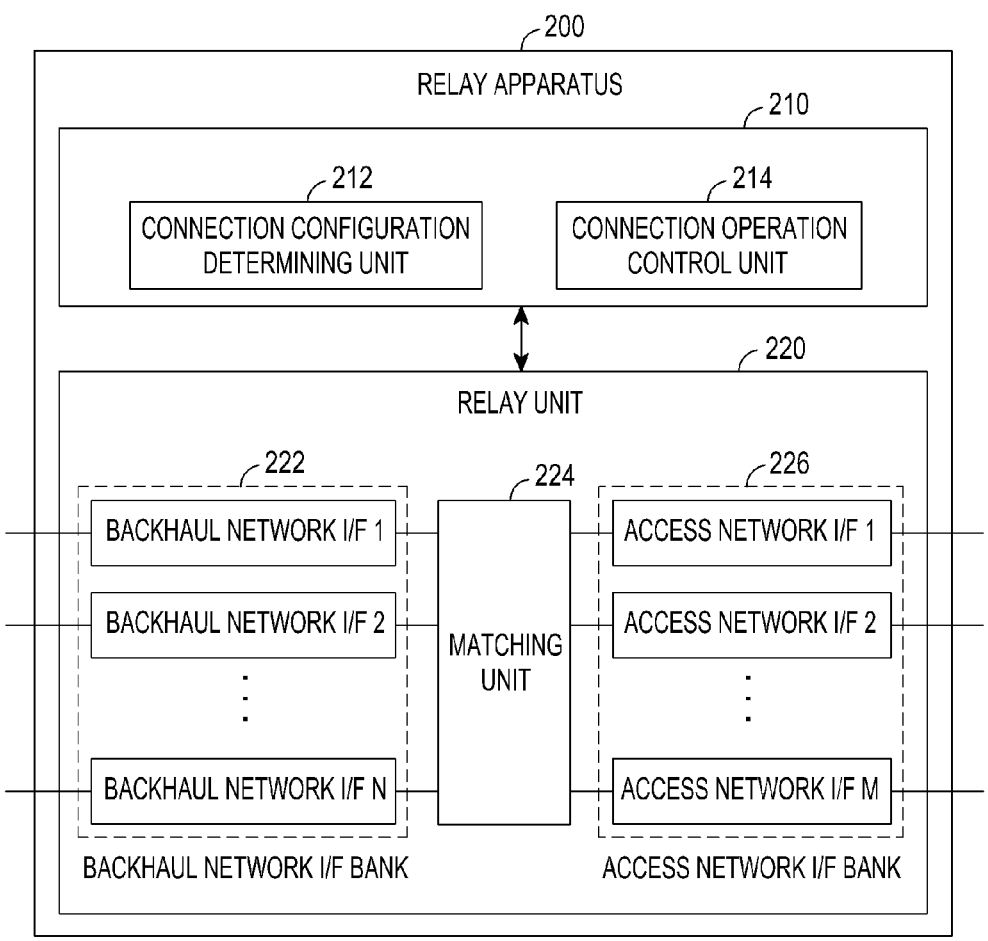
FIG. 2 is a block diagram of a relay node according to an embodiment of the present invention.

FIG. 2 is a block diagram of a relay node according to an embodiment of the present invention.

Referring to FIG. 2, a relay node 200 includes a control unit 210 and a relay unit 220. However, it goes without saying that the structure of the relay node illustrated in FIG. 2 is only an example, the function and location of each unit can be changed, and some or all of the units may be either combined or distributed.

The control unit 210 includes a connection configuration determining unit 212 and a connection operation control unit 214. The control unit 210 controls the operation of the relay node by performing a control process of a predetermined level.

The connection configuration determining unit 212 determines at least one of a network access structure, a relay structure, a cooperation scheme, and an interface configuration.

Now, the processes, in which the connection configuration determining unit 212 determines a network access structure, a relay structure, a cooperation scheme, and an interface configuration, respectively, will be described.

Now, determination of a network access structure by the connection configuration determining unit 212 of the control unit 210 will be described in detail.

First, the connection configuration determining unit 212 may determine the network access structure by controlling at least one of a backhaul link connection, an access link connection, and a direct access link connection.

In more detail, the connection configuration determining unit 212 selectively connects at least one base station and at least one other relay node to at least one backhaul network interface, through control of a backhaul link connection. For example, the connection configuration determining unit 212 may connect one base station or another relay node to one backhaul network interface, or connect a plurality of base stations, a plurality of other relay nodes, or a plurality of nodes including at least one base station and at least another one relay node to one backhaul network interface. Moreover, the connection configuration determining unit 212 may connect one base station or another relay node to at least two backhaul network interfaces, or connect a plurality of base stations, a plurality of other relay nodes, or a plurality of nodes including at least one base station and at least another one relay node to at least two backhaul network interfaces.

The connection configuration determining unit 212 selectively connects at least one access network interface, at least one user terminal, and at least one other relay node with each other through control of an access link connection. For example, the connection configuration determining unit 212 connects one user terminal or another relay node to one access network interface, or connects a plurality of user terminals, a plurality of other relay nodes, or a plurality of nodes including at least one user terminal and at least another one relay node to one access network interface. Moreover, the connection configuration determining unit 212 connects one user terminal or another relay node to at least two access network interfaces, or connects a plurality of user terminals, a plurality of other relay nodes, or a plurality of nodes including at least one user terminal and at least another one relay node to at least two access network interfaces.

The connection configuration determining unit 212 controls a connection for direct communication between at least one first communication node (at least one base station and/or at least another one relay node) and at least one second communication node (at least one user terminal and/or at least another one relay node), through control of a direct access link connection. For example, the connection configuration determining unit 212 directly interconnects one first communication node and one second communication node, directly interconnects a plurality of first communication nodes and one second communication node, directly interconnects one first communication node and a plurality of second communication nodes, or directly interconnects a plurality of first communication nodes and a plurality of second communication nodes. In this event, the plurality of first communication nodes refers to a plurality of base stations, a plurality of other relay nodes, or a plurality of nodes including at least one base station and at least another one relay node. The plurality of second communication nodes refers to a plurality of user terminals, a plurality of other relay nodes, or a plurality of nodes including at least one user terminal and at least another one relay node.

The connection configuration determining unit 212 may determine the network access structure by independently setting each of the interfaces of a backhaul network interface bank 222 and an access network interface bank 226 to one of an operation state, an off state, and a standby state.

Figure 3:
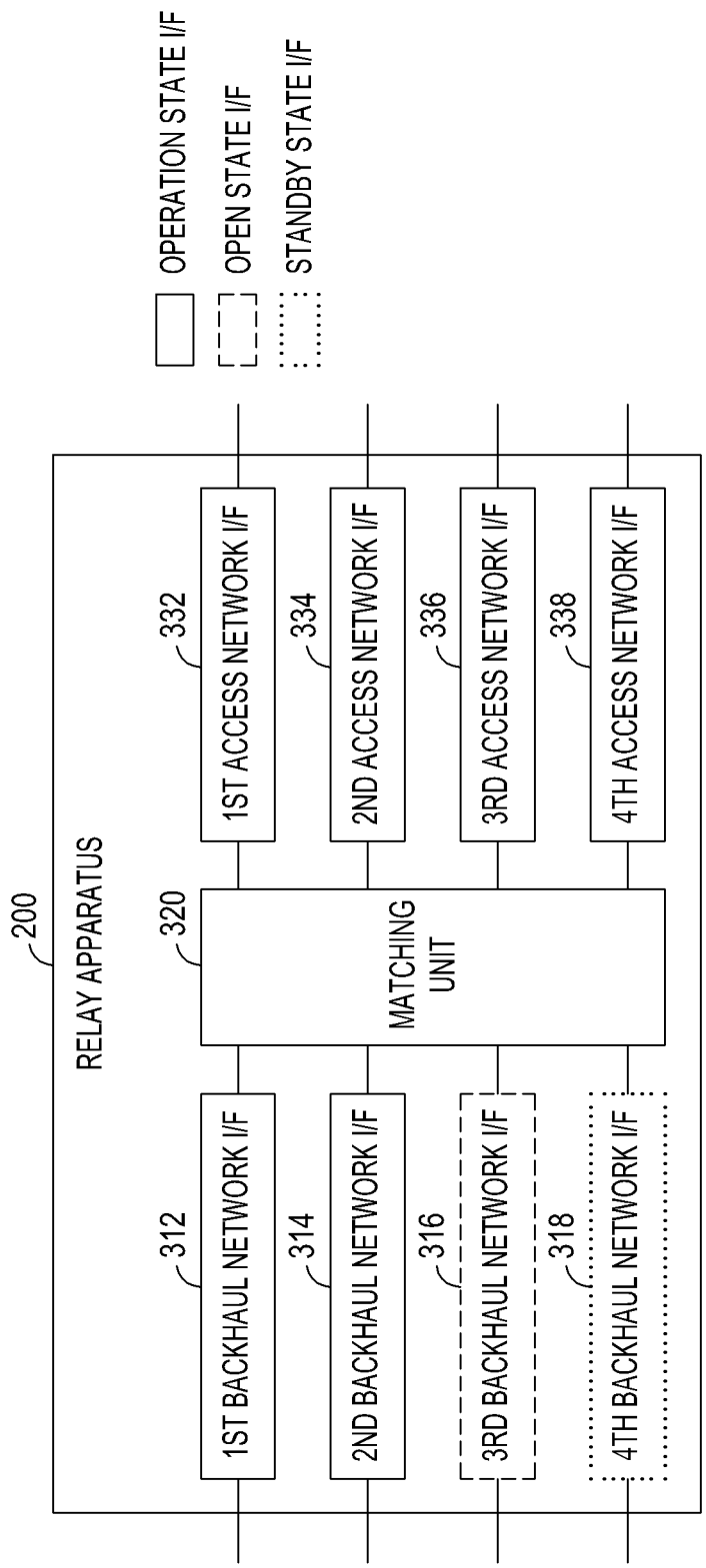
FIG. 3 illustrates an example of state setting for each of four backhaul network interfaces in a relay node.
Figure 4:
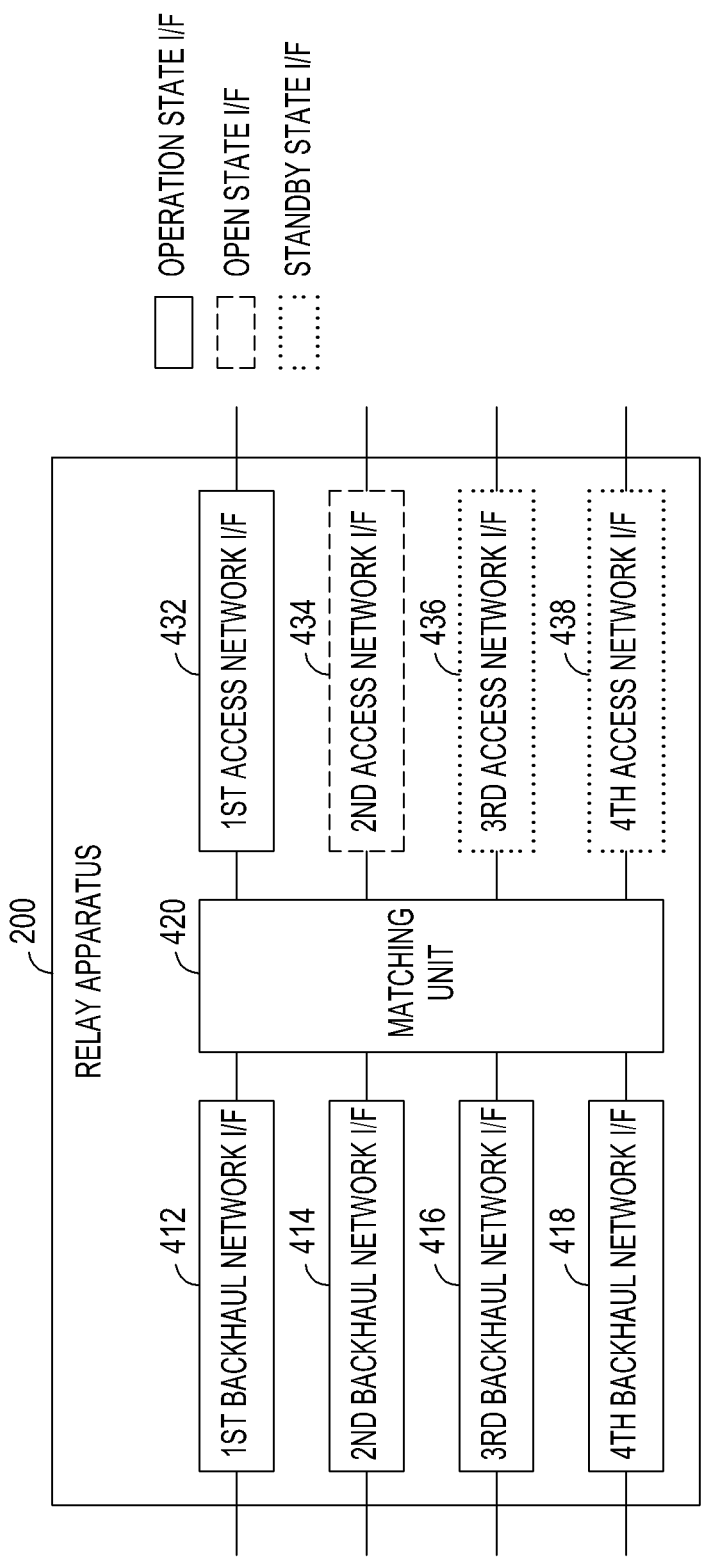
FIG. 4 illustrates an example of state setting for each of four backhaul network interfaces in a relay node.

FIGS. 3 and 4 illustrate examples of state setting for backhaul network interfaces and access network interfaces included in a relay node. That is, as shown, the state of each of the backhaul network interfaces and the access network interfaces is set to one of an operation state, an off state, and a standby state. The illustrated examples are based on an assumption that the relay node includes four backhaul network interfaces and four access network interfaces. However, the above assumption is only for convenience of description, and it goes without saying that the present invention can be also applied to the cases where each of the number of backhaul network interfaces and the number of access network interfaces is fewer or more than four.

FIG. 3 illustrates an example of state setting for each of four backhaul network interfaces in a relay node.

Referring to FIG. 3, each of a first backhaul network interface 312 and a second backhaul network interface 314 is set to an operation state, a third backhaul network interface 316 is set to an off state, and a fourth backhaul network interface 318 is set to a standby state. In this manner, the state of each of the backhaul network interfaces included in the relay node 200 can be set to one of the operation state, the off state, and the standby state.

FIG. 4 illustrates an example of state setting for each of four access network interfaces in a relay node.

Referring to FIG. 4, a first access network interface 432 is set to an operation state, a second access network interface 434 is set to an off state, and a third access network interface 436 and a fourth access network interface 438 are set to a standby state. In this manner, the state of each of the access network interfaces included in the relay node 200 can be set to one of the operation state, the off state, and the standby state.

Figure 5:
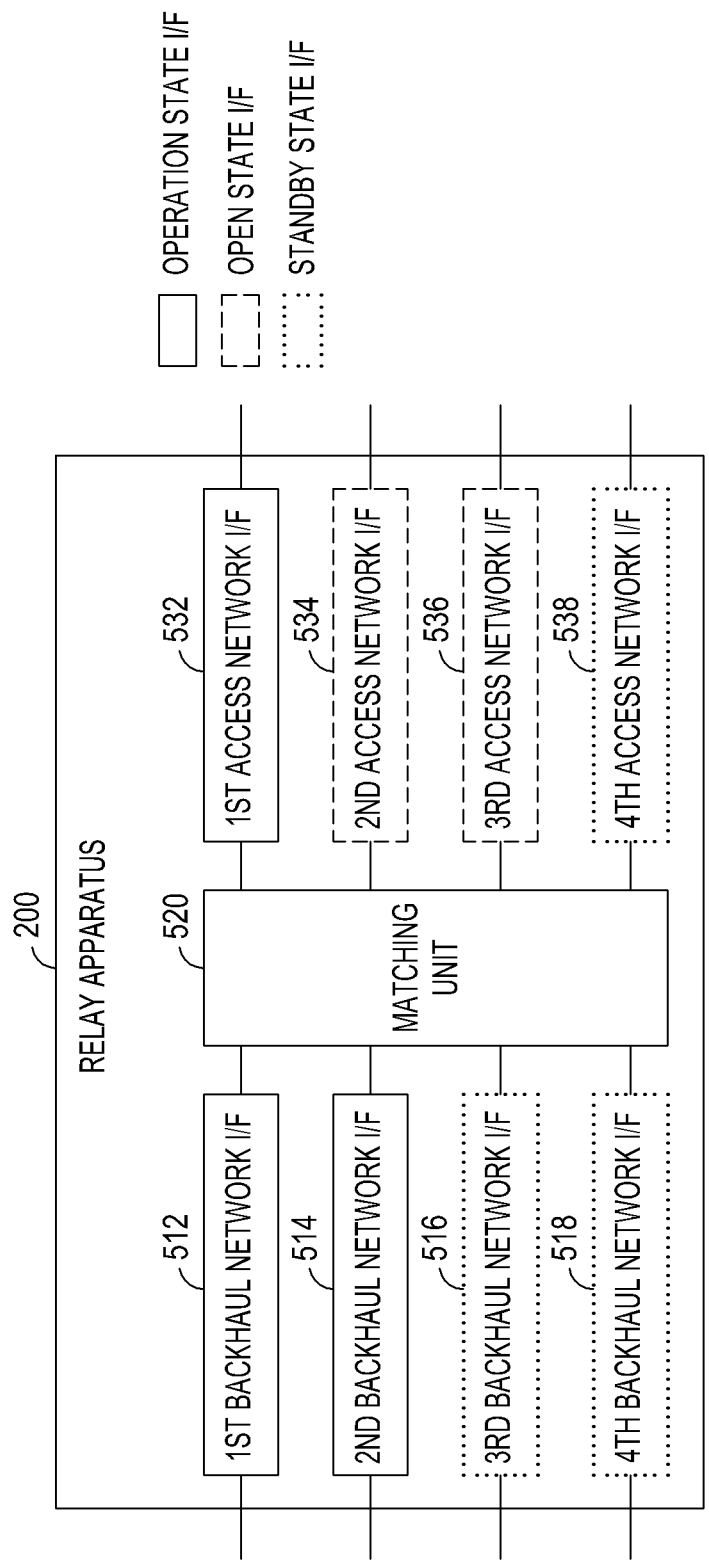
FIG. 5 illustrates an example of state setting for each of four backhaul network interfaces and four access network interfaces in a relay node.

FIG. 5 illustrates an example of state setting for each of four backhaul network interfaces and four access network interfaces in a relay node.

Referring to FIG. 5, each of a first backhaul network interface 512 and a second backhaul network interface 514 is set to an operation state, and each of a third backhaul network interface 516 and a fourth backhaul network interface 518 is set to a standby state.

Further, a first access network interface 532 is set to an operation state, each of a second access network interface 534 and a third access network interface 536 is set to an off state, and a fourth access network interface 538 is set to a standby state.

In this manner, the state of each of the backhaul network interfaces and the access network interfaces included in the relay node 200 can be set to one of the operation state, the off state, and the standby state.

Next, determination of a relay structure by the connection configuration determining unit 212 of the control unit 210 will be described in detail.

First, the connection configuration determining unit 212 may determine the relay structure by controlling at least one of a matching matrix setting and a link matching.

In more detail, the connection configuration determining unit 212 sets a matching relation between at least one backhaul network interface and at least one access network interface, through a matching matrix setting.

Figure 6:
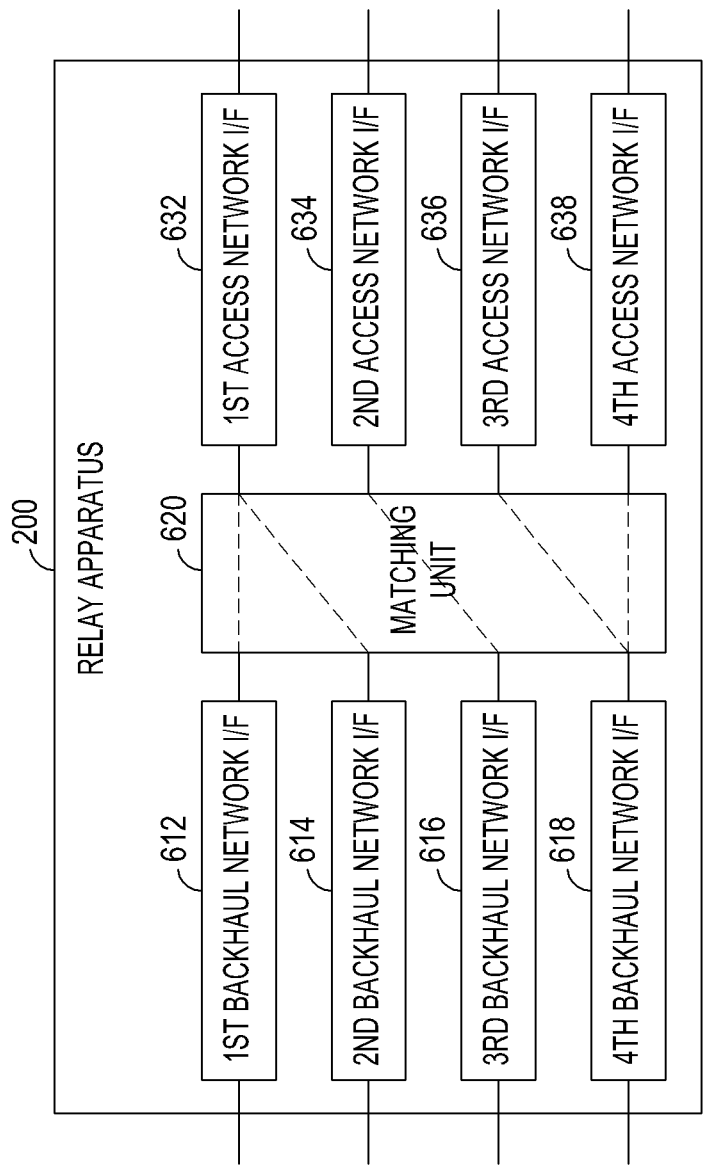
FIG. 6 illustrates an example of setting of a matching relation between backhaul network interfaces and access network interfaces included in a relay node.

FIG. 6 illustrates an example of setting of a matching relation between backhaul network interfaces and access network interfaces included in a relay node. The example illustrated in FIG. 6 is based on an assumption that the relay node includes four backhaul network interfaces and four access network interfaces. However, the above assumption is only for convenience of description, and it goes without saying that the matching relation can be applied in the same manner to the cases where each of the number of backhaul network interfaces and the number of access network interfaces is fewer or more than four.

Referring to FIG. 6, each of a first backhaul network interface 612 and a second backhaul network interface 614 matches with a first access network interface 632, and a third backhaul network interface 616 matches with a second access network interface 634. Further, a fourth backhaul network interface 618 matches with a third access network interface 636 and a fourth access network interface 638. In this manner, it is possible to set a matching matrix between at least one backhaul network interface and at least one access network interface.

Next, the connection configuration determining unit 212 controls to match at least one backhaul network RAT signal and at least one access network RAT signal with each other through a link matching.

As an example, when RATs of a backhaul network RAT signal and an access network RAT signal are identical, a case of matching the backhaul network RAT signal and the access network RAT signal is considered. In this case, an RAT signal received through one backhaul network interface is relay-matched with a transmission RAT signal of one access network interface or an RAT signal received through one access network interface is relay-matched with a transmission RAT signal of one backhaul network interface. For example, a first RAT signal received through a backhaul network interface configured by a first RAT is relay-matched with a transmission RAT signal of an access network interface configured by the first RAT.

As another example, when RATs of a backhaul network RAT signal and an access network RAT signal are different, a case of matching the backhaul network RAT signal and the access network RAT signal is considered. In this case, an RAT signal received through one backhaul network interface is conversion-matched with a transmission RAT signal of one access network interface or an RAT signal received through one access network interface is conversion-matched with a transmission RAT signal of one backhaul network interface. For example, a first RAT signal received through a backhaul network interface configured by a first RAT is conversion-matched with a second transmission RAT signal of an access network interface configured by a second RAT.

As another example, when RATs of a backhaul network RAT signal and a plurality of access network RAT signals are identical, a case of matching the backhaul network RAT signal and the plurality of access network RAT signals is considered. In this case, an RAT signal received through one backhaul network interface is distribution-matched with transmission RAT signals of a plurality of access network interfaces or RAT signals received through a plurality of access network interfaces are combination-matched with a transmission RAT signal of one backhaul network interface. For example, a first RAT signal received through a backhaul network interface configured by a first RAT is distribution-matched with first transmission RAT signals of two access network interfaces configured by the first RAT.

As another example, when RATs of a backhaul network RAT signal and a plurality of access network RAT signals are different, a case of matching the backhaul network RAT signal and the plurality of access network RAT signals is considered. In this case, an RAT signal received through one backhaul network interface is distribution-conversion-matched with transmission RAT signals of a plurality of access network interfaces configured by different RATs, or RAT signals received through a plurality of access network interfaces configured by different RATs are combination-conversion-matched with a transmission RAT signal of one backhaul network interface. For example, a first RAT signal received through a backhaul network interface configured by a first RAT is distribution-conversion-matched with a first transmission RAT signal and a second transmission RAT signal of two access network interfaces configured by the first RAT and a second RAT, respectively.

As another example, when RATs of a plurality backhaul network RAT signals and an access network RAT signal are identical, a case of matching the plurality of backhaul network RAT signals and the access network RAT signal is considered. In this case, RAT signals received through the plurality of backhaul network interfaces are combination-matched with a transmission RAT signal of one access network interface or an RAT signal received through one access network interface is distribution-matched with transmission RAT signals of a plurality of backhaul network interfaces. For example, first RAT signals received through two backhaul network interfaces configured by a first RAT are combination-matched with a first transmission RAT signal of an access network interface configured by the first RAT.

As another example, when RATs of a plurality backhaul network RAT signals and an access network RAT signal are different, a case of matching the plurality of backhaul network RAT signals and the access network RAT signal is considered. In this case, RAT signals received through a plurality of backhaul network interfaces configured by different RATs are combination-conversion-matched with a transmission RAT signal of one access network interface, or an RAT signal received through one access network interface is distribution-conversion-matched with transmission RAT signals of a plurality of backhaul network interfaces configured by different RATs. For example, a first RAT signal and a second RAT signal received through a plurality of backhaul network interfaces configured by a first RAT and a second RAT are combination-conversion-matched with a third transmission RAT signal of an access network interface configured by a third RAT.

As another example, when RATs of a plurality backhaul network RAT signals and a plurality of access network RAT signals are identical, a case of matching the plurality of backhaul network RAT signals and the plurality of access network RAT signals is considered. In this case, RAT signals received through the plurality of backhaul network interfaces are combination-distribution-matched with transmission RAT signals of the plurality of access network interfaces, or RAT signals received through the plurality of access network interfaces are combination-distribution-matched with transmission RAT signals of the plurality of backhaul network interfaces. For example, first RAT signals received through two backhaul network interfaces configured by a first RAT are combination-distribution-matched with first transmission RAT signals of two access network interfaces configured by the first RAT.

As another example, when RATs of a plurality backhaul network RAT signals are identical but RATs of a plurality of access network RAT signals are different, a case of matching the plurality of backhaul network RAT signals and the plurality of access network RAT signals is considered. In this case, RAT signals received through a plurality of backhaul network interfaces are combination-distribution-conversion-matched with transmission RAT signals of the plurality of access network interfaces, or RAT signals received through a plurality of access network interfaces are combination-conversion-distribution-matched with transmission RAT signals of a plurality of backhaul network interfaces. For example, first RAT signals received through two backhaul network interface configured by a first RAT are combination-distribution-conversion-matched with a first transmission RAT signal and a second transmission RAT signal of two access network interfaces configured by the first RAT and a second RAT, respectively.

As another example, when RATs of a plurality backhaul network RAT signals are different but RATs of a plurality of access network RAT signals are identical, a case of matching the plurality of backhaul network RAT signals and the plurality of access network RAT signals is considered. In this case, RAT signals received through a plurality of backhaul network interfaces are combination-conversion-distribution-matched with transmission RAT signals of a plurality of access network interfaces, or RAT signals received through a plurality of access network interfaces are combination-distribution-conversion-matched with transmission RAT signals of a plurality of backhaul network interfaces. For example, a first RAT signal and a second RAT signal received through two backhaul network interfaces configured by a first RAT and a second RAT are combination-conversion-distribution-matched with third transmission RAT signals of two access network interfaces configured by a third RAT.

As another example, when RATs of a plurality backhaul network RAT signals are different and RATs of a plurality of access network RAT signals are also different, a case of matching the plurality of backhaul network RAT signals and the plurality of access network RAT signals is considered. In this case, RAT signals received through a plurality of backhaul network interfaces are combination-conversion-distribution-conversion-matched with transmission RAT signals of a plurality of access network interfaces, or RAT signals received through a plurality of access network interfaces are combination-conversion-distribution-conversion-matched with transmission RAT signals of a plurality of backhaul network interfaces. For example, a first RAT signal and a second RAT signal received through two backhaul network interfaces configured by a first RAT and a second RAT, respectively, are combination-conversion-distribution-conversion-matched with a third transmission RAT signal and a fourth transmission RAT signal of two access network interfaces configured by a third RAT and a fourth RAT, respectively.

As noted from the above description of various embodiments, through a link combining, the connection configuration determining unit 212 controls to combine information received through a plurality of backhaul links and then forward the combined information to one access link or a plurality of access links or combine information received through a plurality of access links and then forward the combined information to one backhaul link or a plurality of backhaul links.

Third, determination of a cooperation scheme by the connection configuration determining unit 212 of the control unit 210 will be described in detail. The connection configuration determining unit 212 controls a cooperation transmission scheme and a cooperation structure through the cooperation scheme.

The connection configuration determining unit 212 controls to forwards signals between at least one first communication node and at least one second communication node, by using at least one cooperation transmission scheme among a non-cooperation scheme, a diversity cooperation scheme, and a multiplexing cooperation scheme.

The connection configuration determining unit 212 controls to forward signals between at least one first communication node and at least one second communication node, by using at least one cooperation structure among a base station-relay node cooperation structure, a relay node-relay node cooperation structure, and a relay node-user terminal cooperation structure.

Fourth, determination of an interface configuration and location management by the connection configuration determining unit 212 of the control unit 210 will be described in detail.

The connection configuration determining unit controls to independently reconfigure an RAT of each of backhaul network interfaces and access network interfaces into another RAT by using a technology capable of reconfiguring an RAT of an interface, such as a Software Defined Ratio (SDR), through an interface configuration. Further, the connection configuration determining unit 212 controls at least one of an access user terminal management and an area management through the location management.

In addition, the connection configuration determining unit 212 controls operations relating to a scan function and signal transmission/reception.

The scan function refers to a function of determining whether signals from adjacent base stations, other relay nodes, and/or user terminals exist. To this end, the connection configuration determining unit 212 scans at least one communication nodes comprising of at least one first communication node and/or at least one second communication node for forming at least one backhaul link and/or at least one access link.

Further, the connection configuration determining unit 212 controls operations relating to signal transmission and reception for relaying between at least one first communication node and at least one second communication node. That is, the connection configuration determining unit 212 controls operations, including decoding, demodulation, and detection, of a relay node for receiving a signal from at least one first communication node. Further, the connection configuration determining unit 212 controls operations, including encoding, modulation, and power allocation, of a relay node for transmitting a signal to at least one second communication node.

The relay unit 220 includes a backhaul network interface bank 222, an access network interface bank 226, and a matching unit 224. The backhaul network interface bank 222 includes at least one backhaul network interface, and the access network interface bank 226 includes at least one access network interface. Further, the matching unit 224 matches signals between at least one backhaul network interface of the backhaul network interface bank 222 and at least one access network interface of the access network interface bank 226.

The matching unit 224 configures the matching relation between at least one backhaul network interface and at least one access network interface, according to a relay structure determination command from the connection configuration determining unit 212 of the control unit 210.

The matching unit 224 may change the matching relation between at least one backhaul network interface and at least one access network interface currently connected to each other, according to a relay structure determination command from the connection configuration determining unit 212.

As an example, when RATs of one backhaul network RAT signal and one access network RAT signal are identical, a case in which the matching unit 224 matches the backhaul network RAT signal and the access network RAT signal is considered. In this case, according to a relay structure determination command provided by the connection configuration determining unit 212, an RAT signal received through one backhaul network interface is relay-matched with a transmission RAT signal of one access network interface or an RAT signal received through one access network interface is relay-matched with a transmission RAT signal of one backhaul network interface. For example, a first RAT signal received through a backhaul network interface configured by a first RAT is relay-matched with a transmission RAT signal of an access network interface configured by the first RAT.

As another example, when RATs of one backhaul network RAT signal and one access network RAT signal are different, a case in which the matching unit 224 matches the backhaul network RAT signal and the access network RAT signal is considered. In this case, according to a relay structure determination command provided by the connection configuration determining unit 212, an RAT signal received through one backhaul network interface is conversion-matched with a transmission RAT signal of one access network interface or an RAT signal received through one access network interface is conversion-matched with a transmission RAT signal of one backhaul network interface. For example, a first RAT signal received through a backhaul network interface configured by a first RAT is conversion-matched with a second transmission RAT signal of an access network interface configured by a second RAT.

As another example, when RATs of one backhaul network RAT signal and a plurality of access network RAT signals are identical, a case in which the matching unit 224 matches the backhaul network RAT signal and the plurality of access network RAT signals is considered. In this case, according to a relay structure determination command provided by the connection configuration determining unit 214, an RAT signal received through one backhaul network interface is distribution-matched with transmission RAT signals of a plurality of access network interfaces or RAT signals received through a plurality of access network interfaces is combination-matched with a transmission RAT signal of one backhaul network interface. For example, a first RAT signal received through a backhaul network interface configured by a first RAT is distribution-matched with first transmission RAT signals of two access network interfaces configured by the first RAT.

As another example, when RATs of one backhaul network RAT signal and a plurality of access network RAT signals are different, a case in which the matching unit 224 matches the backhaul network RAT signal and the plurality of access network RAT signals is considered. In this case, according to a relay structure determination command provided by the connection configuration determining unit 214, an RAT signal received through one backhaul network interface is distribution-conversion-matched with transmission RAT signals of a plurality of access network interfaces configured by different RATs or RAT signals received through a plurality of access network interfaces configured by different RATs are combination-conversion-matched with a transmission RAT signal of one backhaul network interface. For example, a first RAT signal received through a backhaul network interface configured by a first RAT is distribution-conversion-matched with a first transmission RAT signal and a second transmission RAT signal of two access network interfaces configured by the first RAT and a second RAT, respectively.

As another example, when RATs of a plurality of backhaul network RAT signals and one access network RAT signal are identical, a case in which the matching unit 224 matches the plurality of backhaul network RAT signals and the access network RAT signal is considered. In this case, according to a relay structure determination command provided by the connection configuration determining unit 214, RAT signals received through a plurality of backhaul network interfaces are combination-matched with a transmission RAT signal of one access network interface or an RAT signal received through one access network interface is distribution-matched with transmission RAT signals of a plurality of backhaul network interfaces. For example, first RAT signals received through two backhaul network interfaces configured by a first RAT is combination-matched with a first transmission RAT signal of an access network interface configured by the first RAT.

As another example, when RATs of a plurality of backhaul network RAT signals and one access network RAT signal are different, a case in which the matching unit 224 matches the plurality of backhaul network RAT signals and the access network RAT signal is considered. In this case, according to a relay structure determination command provided by the connection configuration determining unit 214, RAT signals received through a plurality of backhaul network interfaces configured by different RATs are combination-conversion-matched with a transmission RAT signal of one access network interface or an RAT signal received through one access network interface is distribution-conversion-matched with transmission RAT signals of a plurality of backhaul network interfaces configured by different RATs. For example, a first RAT signal and a second RAT signal received through two backhaul network interfaces configured by a first RAT and a second RAT are combination-conversion-matched with a third transmission RAT signal of an access network interface configured by a third RAT.

As another example, when RATs of a plurality of backhaul network RAT signals and a plurality of access network RAT signals are identical, a case in which the matching unit 224 matches the plurality of backhaul network RAT signals and the plurality of access network RAT signals is considered. In this case, according to a relay structure determination command provided by the connection configuration determining unit 214, RAT signals received through a plurality of backhaul network interfaces are combination-distribution-matched with transmission RAT signals of a plurality of access network interfaces or RAT signals received through a plurality of access network interfaces are combination-distribution-matched with transmission RAT signals of a plurality of backhaul network interfaces. For example, first RAT signals received through two backhaul network interfaces configured by a first RAT are combination-matched with first transmission RAT signals of two access network interfaces configured by the first RAT.

As another example, when RATs of a plurality of backhaul network RAT signals are identical but RATs of a plurality of access network RAT signals are different, a case in which the matching unit 224 matches the plurality of backhaul network RAT signals and the plurality of access network RAT signals is considered. In this case, according to a relay structure determination command provided by the connection configuration determining unit 214, RAT signals received through a plurality of backhaul network interfaces configured by the same RAT are combination-distribution-conversion-matched with transmission RAT signals of the plurality of access network interfaces configured by different RATs, or RAT signals received through a plurality of access network interfaces configured by different RATs are combination-conversion-distribution-matched with transmission RAT signals of a plurality of backhaul network interfaces configured by the same RAT. For example, first RAT signals received through two backhaul network interface configured by a first RAT are combination-distribution-conversion-matched with a first transmission RAT signal and a second transmission RAT signal of two access network interfaces configured by the first RAT and a second RAT, respectively.

As another example, when RATs of a plurality of backhaul network RAT signals are different but RATs of a plurality of access network RAT signals are identical, a case in which the matching unit 224 matches the plurality of backhaul network RAT signals and the plurality of access network RAT signals is considered. In this case, according to a relay structure determination command provided by the connection configuration determining unit 214, RAT signals received through a plurality of backhaul network interfaces configured by different RATs are combination-conversion-distribution-matched with transmission RAT signals of the plurality of access network interfaces configured by the same RAT, or RAT signals received through a plurality of access network interfaces configured by the same RAT are combination-distribution-conversion-matched with transmission RAT signals of a plurality of backhaul network interfaces configured by different RATs. For example, a first RAT signal and a second RAT signal received through two backhaul network interfaces configured by a first RAT and a second RAT are combination-conversion-distribution-matched with third transmission RAT signals of two access network interfaces configured by a third RAT.

As another example, when RATs of a plurality of backhaul network RAT signals are different and RATs of a plurality of access network RAT signals are different, a case in which the matching unit 224 matches the plurality of backhaul network RAT signals and the plurality of access network RAT signals is considered. In this case, according to a relay structure determination command provided by the connection configuration determining unit 214, RAT signals received through a plurality of backhaul network interfaces configured by different RATs are combination-conversion-distribution-conversion-matched with transmission RAT signals of a plurality of access network interfaces configured by different RATs, or RAT signals received through a plurality of access network interfaces configured by different RATs are combination-conversion-distribution-conversion-matched with transmission RAT signals of a plurality of backhaul network interfaces configured by different RATs. For example, a first RAT signal and a second RAT signal received through two backhaul network interfaces configured by a first RAT and a second RAT, respectively, are combination-conversion-distribution-conversion-matched with a third transmission RAT signal and a fourth transmission RAT signal of two access network interfaces configured by a third RAT and a fourth RAT, respectively.

The above-described examples are now described in more detail with reference to FIG. 2. The relay unit 220 of the relay node includes a backhaul network interface bank 222 including N number of backhaul network interfaces, an access network interface bank 226 including M number of access network interfaces, and a matching unit 224. The N backhaul network interfaces are connected with the matching unit 224, and the M access network interfaces are also connected with the matching unit 224.

First, a backhaul network connection between at least one backhaul network interface and a first communication node is configured. Here, the first communication node may be a base station, a repeater, or a relay node.

For example, through a wired or wireless network, a backhaul network connection may be established between at least one backhaul network interface and at least one first communication node.

Figure 7:
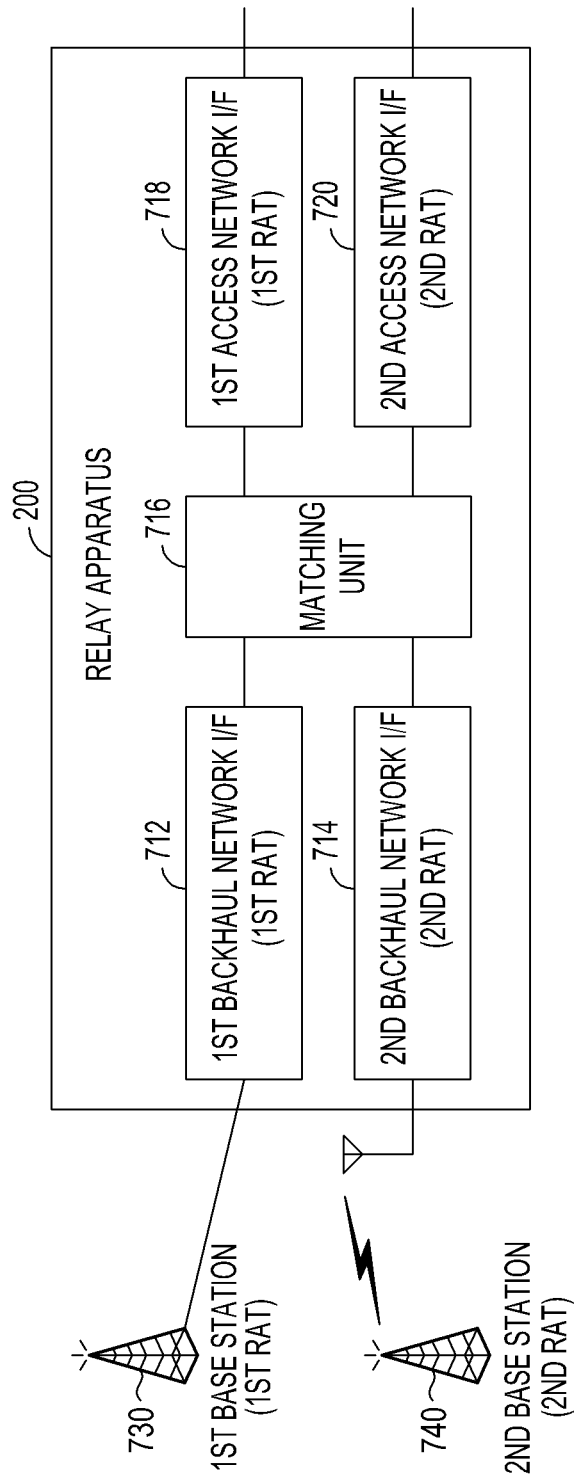
FIG. 7 illustrates an example of a backhaul network connection according to an embodiment of the present invention.

FIG. 7 illustrates an example of a backhaul network connection according to an embodiment of the present invention.

Referring to FIG. 7, a first backhaul network interface 712 of the relay node 200 configures a wired backhaul network connection with a first base station 730 configured by a first RAT, and a second backhaul network interface 714 configures a wireless backhaul network connection with a second base station 740 configured by a second RAT.

Next, an access network connection between at least one access network interface and a second communication node is configured. Here, the second communication node may be a user terminal, a repeater, or a relay node.

For example, through a wired or wireless network, an access network connection may be established between at least one access network interface and at least one second communication node.

Figure 8:
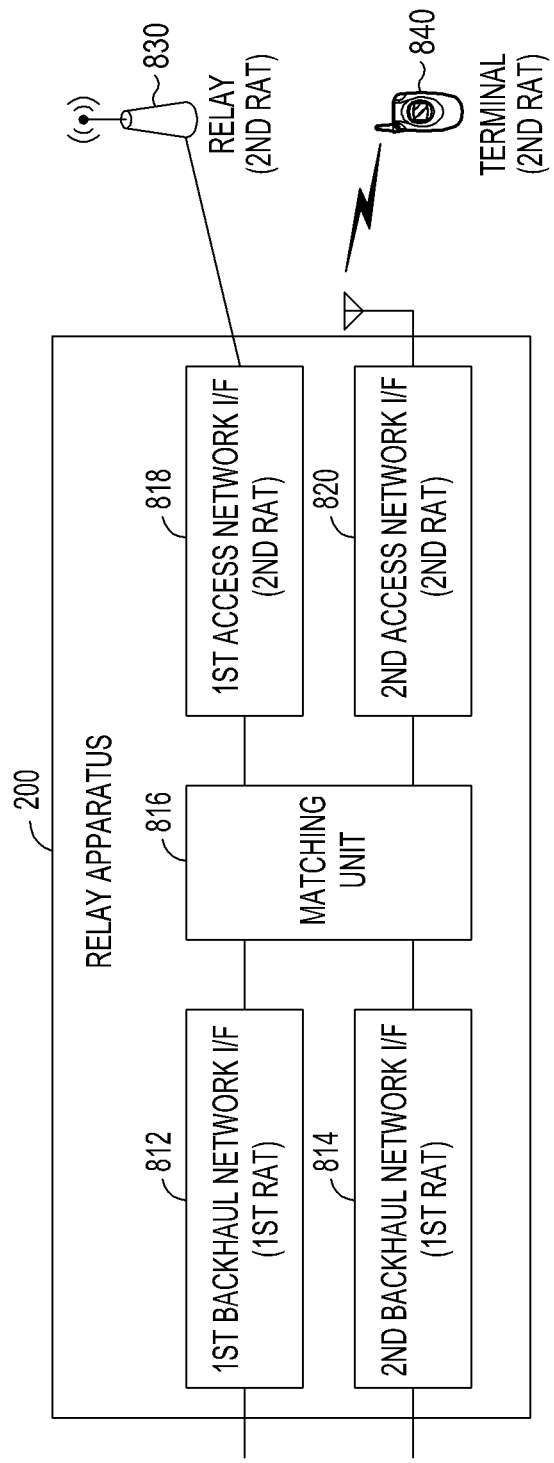
FIG. 8 illustrates an example of a backhaul network connection according to an embodiment of the present invention.

FIG. 8 illustrates an example of an access network connection according to an embodiment of the present invention.

Referring to FIG. 8, a first access network interface 818 of the relay node 200 configures a wired access network connection with a relay node 830 configured by a second RAT, and a second access network interface 820 configures a wireless access network connection with a user terminal 840 configured by the second RAT.

Meanwhile, the relay node 200 may include backhaul network interfaces configured by a plurality of different RATs. For example, the first backhaul network interface 712 of the relay node 200 may be configured by WCDMA and the second backhaul network interface 714 may be configured by WiBro.

Also, the relay node 200 may include access network interfaces configured by a plurality of different RATs. For example, the first access network interface 818 of the relay node 200 may be configured by LTE and the second access network interface 820 may be configured by WLAN.

C☐ Embodiment

Hereinafter, an operation for relay control by a relay apparatus proposed by an embodiment of the present invention will be described in detail.

C-1☐ Network access structure determining scheme A

A network access structure according to an embodiment of the present invention may be divided into an indirect link connection structure and a direct link connection structure.

The indirect link connection structure is a structure to interconnect at least one first communication node and at least one second communication node through a relay node, and includes a backhaul network connection configuration for interconnecting the at least one first communication node and the relay node and an access network connection configuration for interconnecting the relay node and the at least one second communication node. Although the indirect link connection structure may include an internal connection for interconnecting a backhaul network and an access network within a relay node, the internal connection will be described as a relay structure determining process corresponding to a separate relay control operation in an embodiment of the present invention.

The direct link connection structure refers to a structure to directly interconnect at least one first communication node and at least one second communication node without passing through a relay node.

Meanwhile, in the process of determining a network access structure, which will be described later, it is assumed that the first communication node is a base station and the second communication node is a user terminal. This assumption is only for a convenience of description and is not intended to limit the first communication node and the second communication node to the base station and the user terminal, respectively.

Further, the following description of a network access structure is based on an example in which the network access structure includes one or two backhaul network interfaces and one or two access network interfaces and each of the backhaul network interface and the access network interface is combination to one or two antennas.

However, this example is also only for a convenience of description and is not intended to limit the number of the first communication nodes and the second communication nodes to one or two or to limit the number of antennas combined to each of the first communication nodes and the second communication nodes to one or two. That is, it goes without saying that there may be three or more backhaul network interfaces or three or more access network interfaces or each of the backhaul network interfaces and the access network interfaces may be connected to three or more antennas.

Also, although the backhaul network interface and the access network interface have discriminated roles in the following description, a backhaul network interface may operate as an access network interface to connect with a user terminal or an access network interface may operate as a backhaul network interface to connect with a base station.

FIGS. 9 to 20 illustrate examples of determination of an indirect link connection structure according to embodiments of the present invention, and FIGS. 21 to 26 illustrate examples of determination of a direct link connection structure according to embodiments of the present invention.

Hereinafter, examples of determination of an indirect link connection structure will be described with reference to FIGS. 9 to 20.

Figure 9:
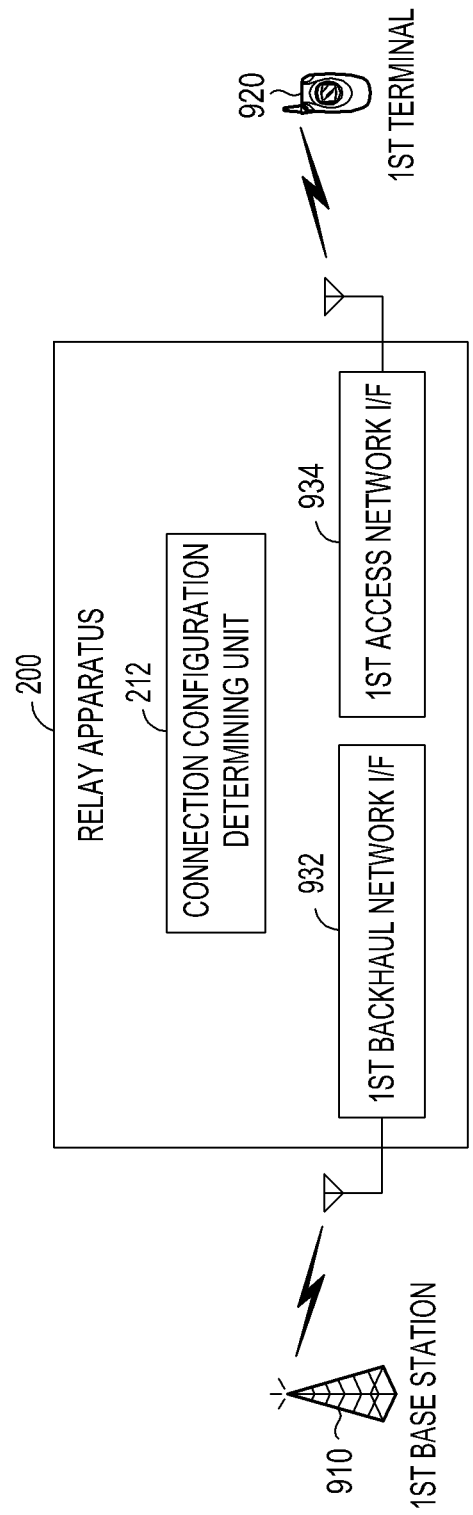
FIG. 9 illustrates an example of a network access structure configured by one backhaul network interface and one access network interface according to an embodiment of the present invention.

FIG. 9 illustrates an example of a network access structure configured by one backhaul network interface and one access network interface according to an embodiment of the present invention. The example illustrated in FIG. 9 is based on a case where each of one backhaul network interface and one access network interface is connected to one antenna.

Referring to FIG. 9, under the control of the connection configuration determining unit 212 of the relay node 200, a backhaul link connection between a first backhaul network interface 932 and a first base station 910 is configured through one antenna equipped with the relay node, and an access link connection between a first access network interface 934 and a first user terminal 920 is configured through one antenna equipped with the relay node.

To this end, the first backhaul network interface 932 can scan adjacent base stations and/or other relay nodes through a scanning process under the control of the connection configuration determining unit 212. To this end, the first access network interface 934 can scan adjacent user terminals and/or other relay nodes through a scanning process under the control of the connection configuration determining unit 212.

Figure 10:
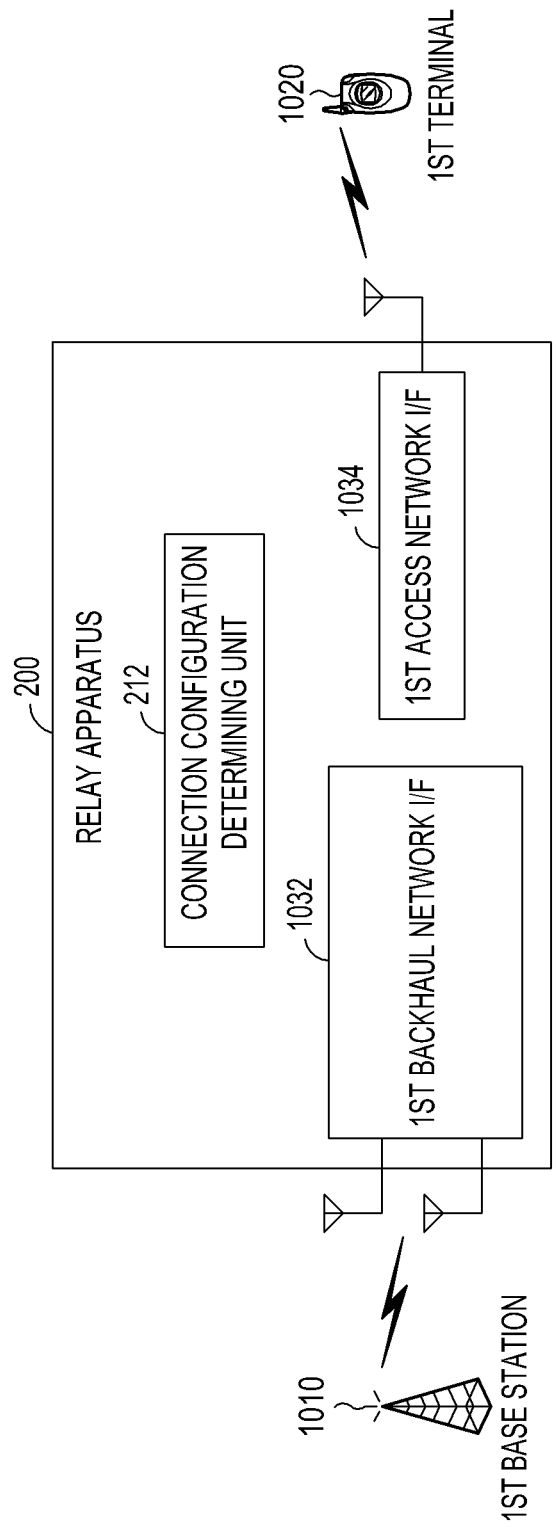
FIG. 10 illustrates an example of a network access structure configured by one backhaul network interface and one access network interface according to an embodiment of the present invention.

FIG. 10 illustrates another example of a network access structure configured by one backhaul network interface and one access network interface according to an embodiment of the present invention. Especially, the example illustrated in FIG. 10 is based on a case where one backhaul network interface is connected to two antennas and one access network interface is connected to one antenna.

Referring to FIG. 10, under the control of the connection configuration determining unit 212 of the relay node 200, a backhaul link connection between a first backhaul network interface 1032 and a first base station 1010 is configured through two antennas equipped with the relay node. In this event, it is possible to achieve a backhaul network link connection using a multi-antenna technology.

Further, under the control of the connection configuration determining unit 212, an access link connection between a first access network interface 1034 and a first user terminal 1020 is configured through one antenna equipped with the relay node.

To this end, the first backhaul network interface 1032 can scan adjacent base stations and/or other relay nodes through a scanning process under the control of the connection configuration determining unit 212. To this end, the first access network interface 1034 can scan adjacent user terminals and/or other relays node through a scanning process under the control of the connection configuration determining unit 212.

Figure 11:
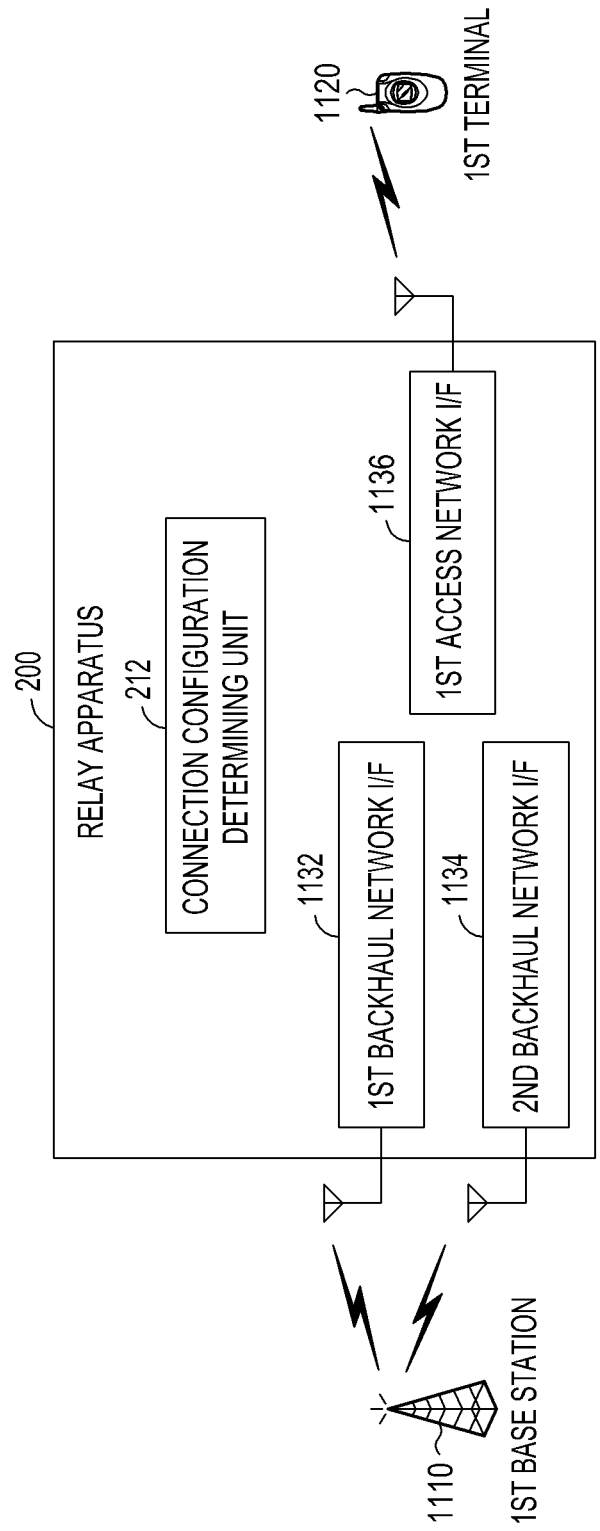
FIG. 11 illustrates an example of a network access structure configured by two backhaul network interfaces and one access network interface according to an embodiment of the present invention.

FIG. 11 illustrates an example of a network access structure configured by two backhaul network interfaces and one access network interface according to an embodiment of the present invention. Especially, the example illustrated in FIG. 11 is based on a case where one antenna is connected to each of two backhaul network interfaces and one access network interface is connected to one antenna.

Referring to FIG. 11, under the control of the connection configuration determining unit 212 of the relay node 200, a backhaul link connection between a plurality of backhaul network interfaces comprising of a first backhaul network interface 1132 and a second backhaul network interface 1134 and a first base station 1110 is configured through two respective sets of one antenna equipped with the relay node. In this event, it is possible to achieve a backhaul link connection between at least two backhaul network interfaces through cooperation.

Further, under the control of the connection configuration determining unit 212, an access link connection between a first access network interface 1136 and a first user terminal 1120 is configured through one antenna equipped with the relay node.

To this end, the first backhaul network interface 1132 or the second backhaul network interface 1134 can scan adjacent base stations and/or other relay nodes through a scanning process under the control of the connection configuration determining unit 212. To this end, the first access network interface 1136 can scan adjacent user terminals and/or other relay nodes through a scanning process under the control of the connection configuration determining unit 212.

Further, under the control of the connection configuration determining unit 212, it is possible to make an RAT of the first backhaul network interface 1132 and an RAT of the second backhaul network interface 1134 coincide with each other.

Figure 12:
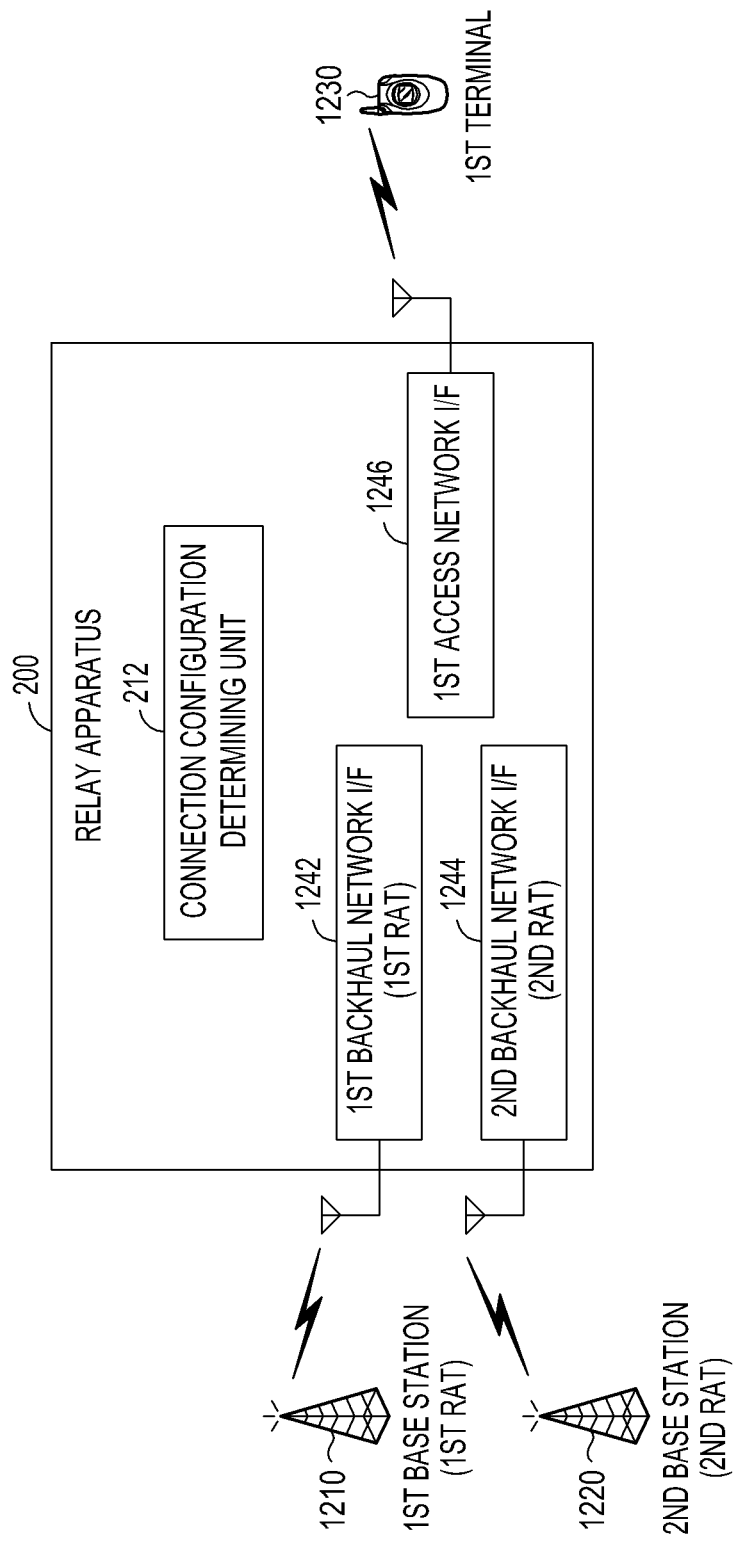
FIG. 12 illustrates another example of a network access structure configured by two backhaul network interfaces and one access network interface according to an embodiment of the present invention.

FIG. 12 illustrates another example of a network access structure configured by two backhaul network interfaces and one access network interface according to an embodiment of the present invention. Especially, the example illustrated in FIG. 12 is based on a case where one antenna is connected to each of two backhaul network interfaces and one access network interface is connected to one antenna.

Referring to FIG. 12, under the control of the connection configuration determining unit 212 of the relay node 200, a backhaul link connection between a first backhaul network interface 1242 and a first base station 1210 is configured through one antenna equipped with the relay node, and a backhaul link connection between a second backhaul network interface 1244 and a second base station 1220 is configured through one antenna equipped with the relay node. In this event, it is possible to achieve a backhaul link connection between at least two backhaul network interfaces through cooperation.

The connection configuration determining unit 212 may control the second backhaul network interface 1244 to configure a backhaul link with the second base station 1220 or perform a scanning process to scan adjacent base stations and/or other relay nodes, while the first backhaul network interface 1242 connects a backhaul link with the first base station 1210 through one antenna.

Further, under the control of the connection configuration determining unit 212, an access link connection between a first access network interface 1246 and a first user terminal 1230 is configured through one antenna equipped with the relay node.

To this end, the first backhaul network interface 1242 and the second backhaul network interface 1244 can scan adjacent base stations and/or other relay nodes through a scanning process under the control of the connection configuration determining unit 212. To this end, the first access network interface 1246 can scan adjacent user terminals and/or other relay nodes through a scanning process under the control of the connection configuration determining unit 212.

Further, under the control of the connection configuration determining unit 212, it is possible to make an RAT of the first backhaul network interface 1242 and an RAT of the second backhaul network interface 1244 be different from each other. For example, the first backhaul network interface 1242 may be configured by a first RAT and the second backhaul network interface 1244 may be configured by a second RAT.

Figure 13:
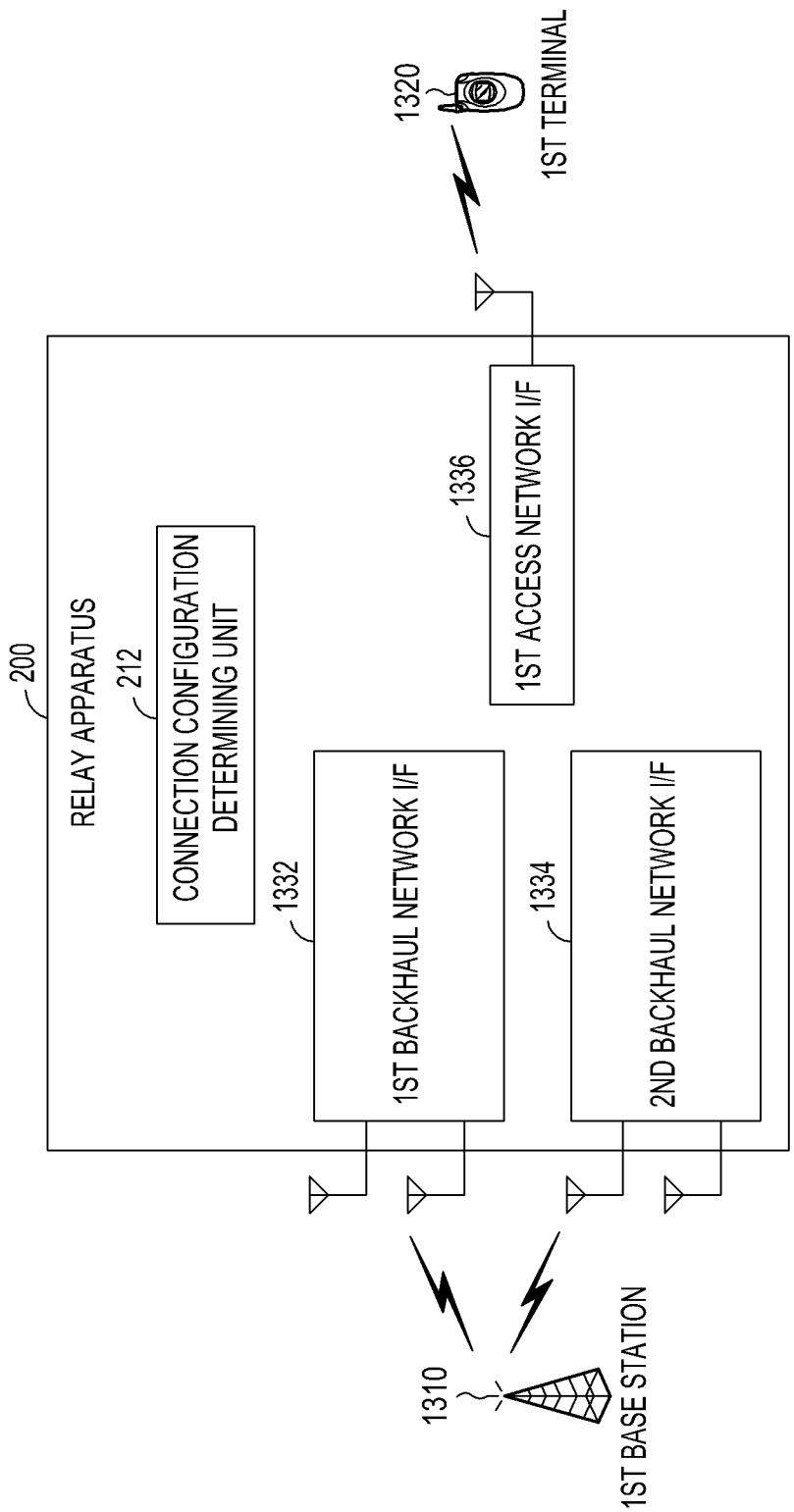
FIG. 13 illustrates another example of a network access structure configured by two backhaul network interfaces and one access network interface according to an embodiment of the present invention.

FIG. 13 illustrates another example of a network access structure configured by two backhaul network interfaces and one access network interface according to an embodiment of the present invention. Especially, the example illustrated in FIG. 13 is based on a case where two antennas are connected to each of two backhaul network interfaces and one antenna is connected to one access network interface.

Referring to FIG. 13, under the control of the connection configuration determining unit 212 of the relay node 200, a backhaul link connection between a plurality of backhaul network interfaces comprising of a first backhaul network interface 1342 and a second backhaul network interface 1344 and a first base station 1310 is configured through two respective sets of two antennas, equipped with the relay node. In this event, it is possible to achieve not only a backhaul link connection using a multi-antenna technology through each backhaul network interface but also a backhaul link connection through cooperation of at least two backhaul network interfaces.

Further, under the control of the connection configuration determining unit 212, an access link connection between a first access network interface 1336 and a first user terminal 1320 is configured through one antenna equipped with the relay node.

To this end, the first backhaul network interface 1332 or the second backhaul network interface 1334 can scan adjacent base stations and/or other relay nodes through a scanning process under the control of the connection configuration determining unit 212. To this end, the first access network interface 1336 can scan adjacent user terminals and/or other relay nodes through a scanning process under the control of the connection configuration determining unit 212.

Further, under the control of the connection configuration determining unit 212, it is possible to make an RAT of the first backhaul network interface 1332 and an RAT of the second backhaul network interface 1334 coincide with each other.

Figure 14:
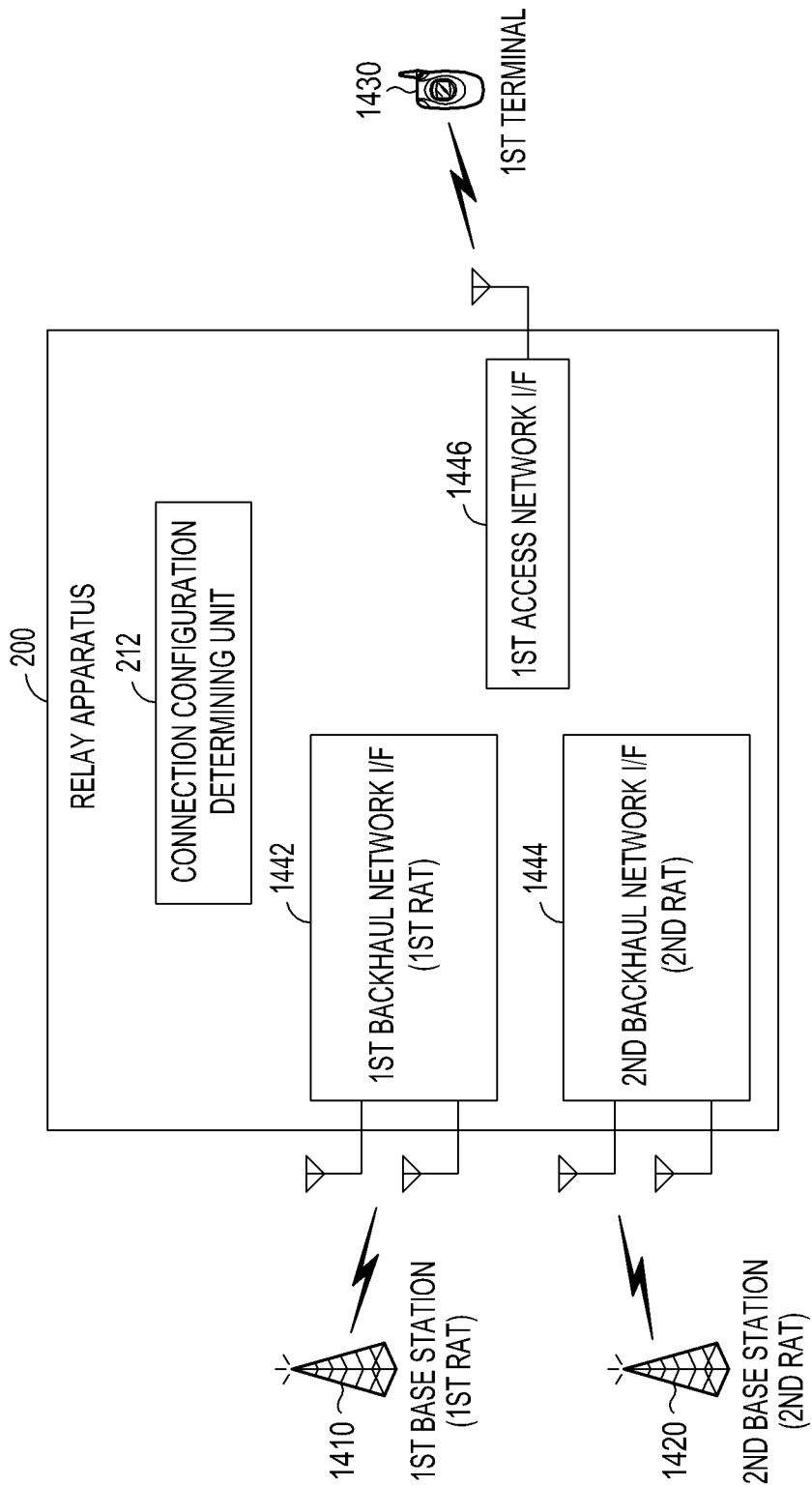
FIG. 14 illustrates another example of a network access structure configured by two backhaul network interfaces and one access network interface according to an embodiment of the present invention.

FIG. 14 illustrates another example of a network access structure configured by two backhaul network interfaces and one access network interface according to an embodiment of the present invention. Especially, the example illustrated in FIG. 14 is based on a case where two antennas are connected to each of two backhaul network interfaces and one antenna is connected to one access network interface.

Referring to FIG. 14, under the control of the connection configuration determining unit 212 of the relay node 200, a backhaul link connection between a first backhaul network interface 1442 and a first base station 1410 is configured through two antennas equipped with the relay node, and a backhaul link connection between a second backhaul network interface 1444 and a second base station 1420 is configured through two antennas equipped with the relay node. In this event, it is possible to achieve not only a backhaul link connection using a multi-antenna technology through each backhaul network interface but also a backhaul link connection through cooperation of at least two backhaul network interfaces.

The connection configuration determining unit 212 may control the second backhaul network interface 1444 to configure a backhaul link with the second base station or perform a scanning process to scan adjacent base stations and/or other relay nodes, while the first backhaul network interface 1442 connects a backhaul link with the first base station 1410 through two antennas.

Further, under the control of the connection configuration determining unit 212, an access link connection between a first access network interface 1446 and a first user terminal 1430 is configured through one antenna equipped with the relay node.

To this end, the first backhaul network interface 1442 and the second backhaul network interface 1444 can scan adjacent base stations and/or other relay nodes through a scanning process under the control of the connection configuration determining unit 212. To this end, the first access network interface 1446 can scan adjacent user terminals and/or other relay nodes through a scanning process under the control of the connection configuration determining unit 212.

Further, under the control of the connection configuration determining unit 212, it is possible to make an RAT of the first backhaul network interface 1442 and an RAT of the second backhaul network interface 1444 be different from each other. For example, the first backhaul network interface 1442 may be configured by a first RAT and the second backhaul network interface 1444 may be configured by a second RAT.

Figure 15:
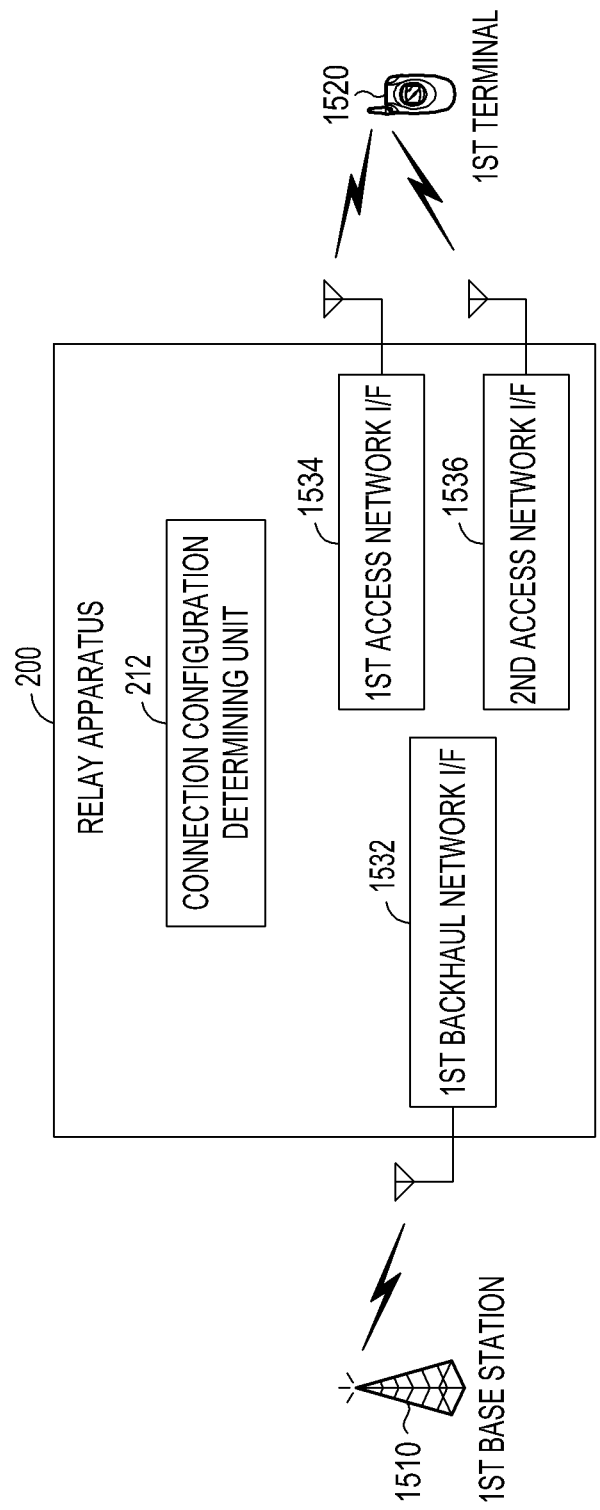
FIG. 15 illustrates an example of a network access structure configured by one backhaul network interface and two access network interfaces according to an embodiment of the present invention.

FIG. 15 illustrates an example of a network access structure configured by one backhaul network interface and two access network interfaces according to an embodiment of the present invention. Especially, the example illustrated in FIG. 15 is based on a case where one antenna is connected to one backhaul network interface and one antenna is connected to each of two access network interfaces.

Referring to FIG. 15, under the control of the connection configuration determining unit 212 of the relay node 200, a first backhaul network interface 1532 configures an back-haul (국문 오류) link connection between a first backhaul network interface 1532 and a first base station 1510 is configured through one antenna equipped with the relay node.

Further, under the control of the connection configuration determining unit 212, a access (국문 오류) link connection between a plurality of access network interfaces comprising of a first access network interface 1534 and a second access network interface 1536 and a first user terminal 1520 is configured through two respective sets of one antenna equipped with the relay node. In this event, it is possible to achieve an access link connection between at least two access network interfaces through cooperation.

To this end, the first backhaul network interface 1532 can scan adjacent base stations and/or other relay nodes through a scanning process under the control of the connection configuration determining unit 212. Further, the first access network interface 1534 or the second access network interface 1536 can scan adjacent user terminals and/or other relay nodes through a scanning process under the control of the connection configuration determining unit 212.

Meanwhile, under the control of the connection configuration determining unit 212, it is possible to make an RAT of the first access network interface 1534 and an RAT of the second access network interface 1536 coincide with each other.

Although not shown in FIG. 15, the connection configuration determining unit 212 may control the second access network interface 1536 to configure an access link with another user terminal through one antenna or perform a scanning process to scan adjacent user terminals and/or other relay nodes, while the first access network interface 1534 connects an access link with the first base station 1520 through one antenna.

To this end, under the control of the connection configuration determining unit 212, it is possible to make an RAT of the first access network interface 1534 and an RAT of the second access network interface 1536 different from each other. For example, the first access network interface 1534 may be configured by a first RAT and the second access network interface 1536 may be configured by a second RAT.

Figure 16:
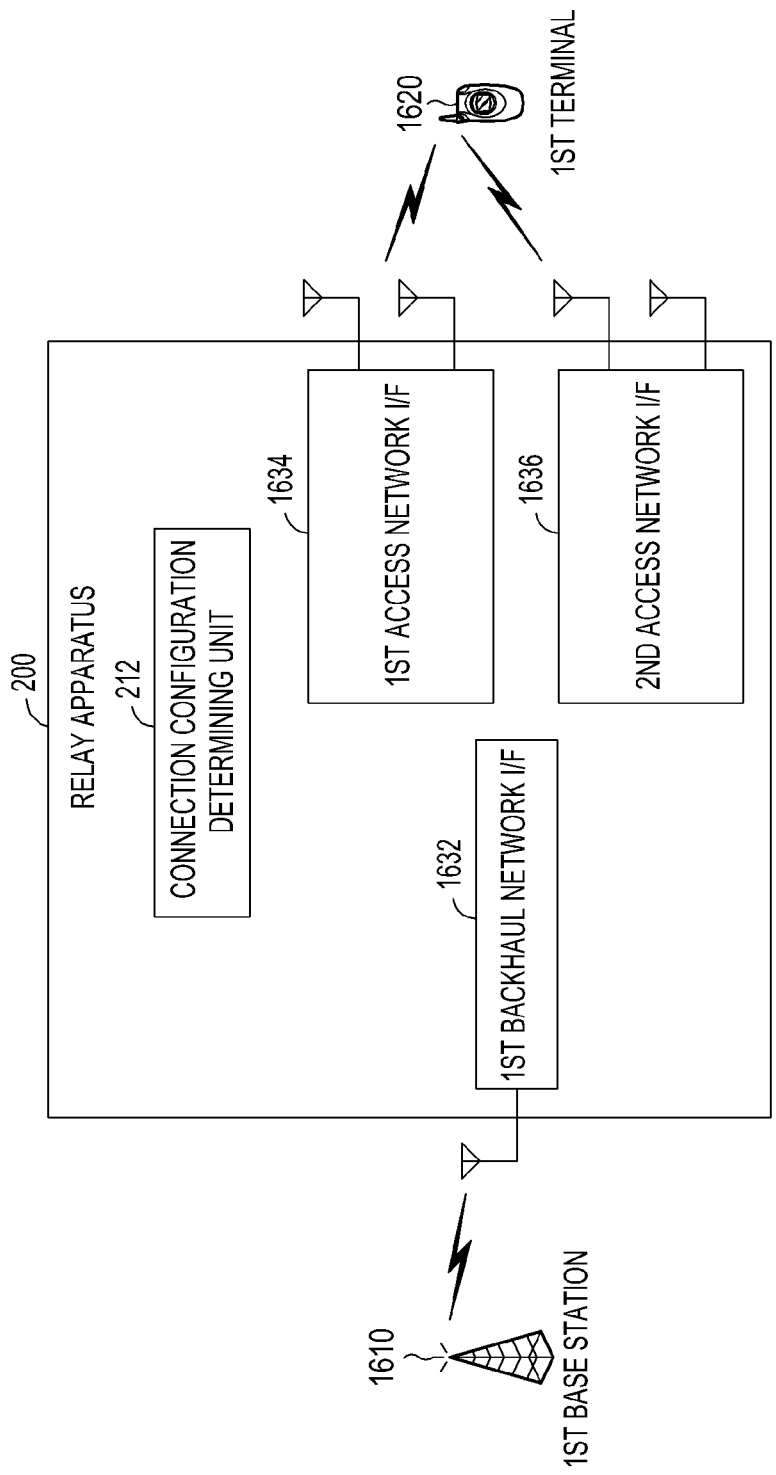
FIG. 16 illustrates another example of a network access structure configured by one backhaul network interface and two access network interfaces according to an embodiment of the present invention.

FIG. 16 illustrates another example of a network access structure configured by one backhaul network interface and two access network interfaces according to an embodiment of the present invention. Especially, the example illustrated in FIG. 16 is based on a case where one antenna is connected to one backhaul network interface and two antennas are connected to each of two access network interfaces.

Referring to FIG. 16, under the control of the connection configuration determining unit 212 of the relay node 200, a first backhaul network interface 1632 configures a backhaul link connection with a first base station 1610 through one antenna.

Further, under the control of the connection configuration determining unit 212, an access link connection between a first access network interface 1634 and a first user terminal 1620 is configured through two antennas equipped with the relay node, and an access link connection between a second access network interface 1636 and the first user terminal 1620 is configured through two antennas equipped with the relay node. In this event, it is possible to achieve not only an access link connection using a multi-antenna technology through each access network interface but also an access link connection through cooperation of at least two access network interfaces.

To this end, the first backhaul network interface 1632 can scan adjacent base stations and/or other relay nodes through a scanning process under the control of the connection configuration determining unit 212. Further, the first access network interface 1634 or the second access network interface 1636 can scan adjacent user terminals and/or other relay nodes through a scanning process under the control of the connection configuration determining unit 212.

Meanwhile, under the control of the connection configuration determining unit 212, it is possible to make an RAT of the first access network interface 1634 and an RAT of the second access network interface 1636 coincide with each other.

Although not shown in FIG. 16, the connection configuration determining unit 212 may control the second access network interface 1636 to configure an access link with another user terminal through two antennas or perform a scanning process to scan adjacent user terminals and/or other relay nodes, while the first access network interface 1634 connects an access link with the first base station 1620 through two antennas. In this case also, it is possible to achieve an access link connection using a multi-antenna technology.

To this end, under the control of the connection configuration determining unit 212, it is possible to make an RAT of the first access network interface 1634 and an RAT of the second access network interface 1636 different from each other. For example, the first access network interface 1634 may be configured by a first RAT and the second access network interface 1636 may be configured by a second RAT.

Figure 17:
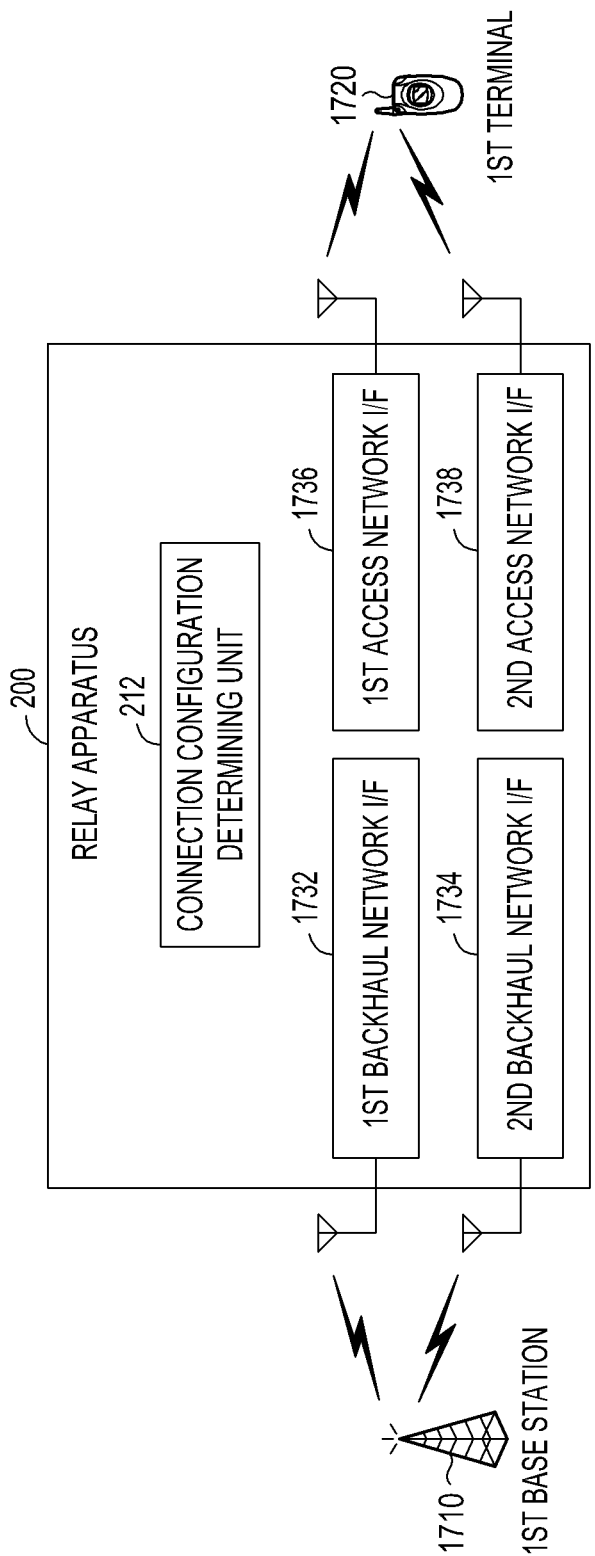
FIG. 17 illustrates an example of a network access structure configured by two backhaul network interfaces and two access network interfaces according to an embodiment of the present invention.

FIG. 17 illustrates an example of a network access structure configured by two backhaul network interfaces and two access network interfaces according to an embodiment of the present invention. Especially, the example illustrated in FIG. 17 is based on a case where each of two backhaul network interfaces is connected to the same base station through one antenna and each of two access network interfaces is connected to the same user terminal through one antenna.

Referring to FIG. 17, under the control of the connection configuration determining unit 212 of the relay node 200, a backhaul link connection between a plurality of backhaul network interfaces comprising of a first backhaul network interface 1732 and a second backhaul network interface 1734 and a first base station 1710 is configured through two respective sets of one antenna, equipped with the relay node. In this event, it is possible to achieve a backhaul link connection between at least two backhaul network interfaces through cooperation.

The connection configuration determining unit 212 may control the second backhaul network interface 1734 to configure a backhaul link with another base station or another relay node or perform a scanning process to scan adjacent base stations and/or other relay nodes, while the first backhaul network interface 1732 connects a backhaul link with the first base station 1710 through one antenna.

Under the control of the connection configuration determining unit 212, an access link connection between a plurality of access network interfaces comprising of a first access network interface 1736 and a second access network interface 1738 and a first user terminal 1720 is configured through two respective sets of one antenna, equipped with the relay node. In this event, it is possible to achieve an access link connection between at least two access network interfaces through cooperation.

The connection configuration determining unit 212 may control the second access network interface 1738 to configure an access link with another user terminal or another relay node or perform a scanning process to scan adjacent base stations and/or other relay nodes, while the first access network interface 1736 connects an access link with the first base station 1720 through one antenna.

To this end, the first backhaul network interface 1732 and the second backhaul network interface 1734 can scan adjacent base stations and/or other relay nodes through a scanning process under the control of the connection configuration determining unit 212. Further, the first access network interface 1736 or the second access network interface 1738 can scan adjacent user terminals and/or other relay nodes through a scanning process under the control of the connection configuration determining unit 212.

Figure 18:
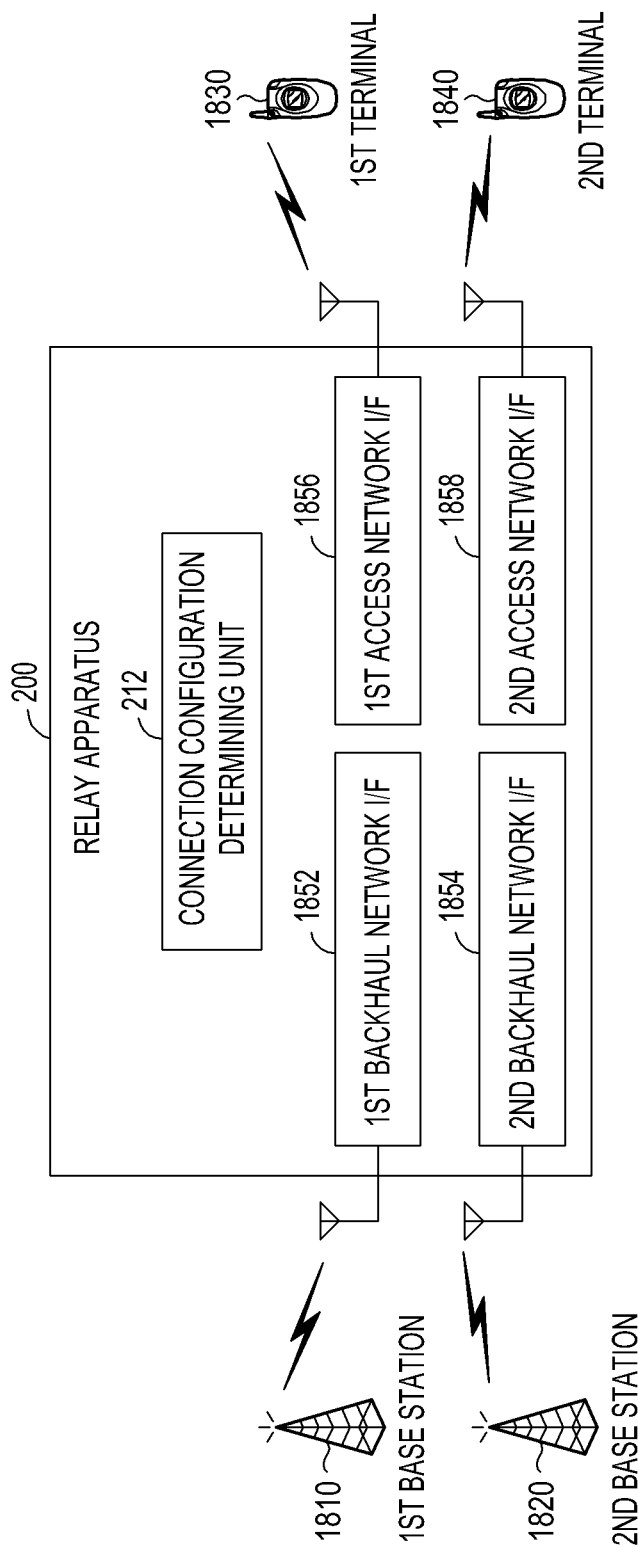
FIG. 18 illustrates an example of a network access structure configured by two backhaul network interfaces and two access network interfaces according to an embodiment of the present invention.

FIG. 18 illustrates another example of a network access structure configured by two backhaul network interfaces and two access network interfaces according to an embodiment of the present invention. Especially, the example illustrated in FIG. 18 is based on a case where two backhaul network interfaces are connected to different base stations individually through a single antenna and two access network interfaces are connected to different user terminals individually through a single antenna.

Referring to FIG. 18, under the control of the connection configuration determining unit 212 of the relay node 200, a backhaul link connection between a first backhaul network interface 1852 and a first base station 1810 is configured through one antenna equipped with the relay node, and a backhaul link connection between a second backhaul network interface 1854 and a second base station 1820 is configured through one antenna equipped with the relay node.

Under the control of the connection configuration determining unit 212, an access link connection between a first access network interface 1856 and a first user terminal 1830 is configured through one antenna equipped with the relay node, and an access link connection between a second access network interface 1858 and a second user terminal 1840 through one antenna equipped with the relay node.

To this end, under the control of the connection configuration determining unit 212, it is possible to make an RAT of the first backhaul network interface 1852 and an RAT of the second backhaul network interface 1854 be different from each other. Further, it is possible to make an RAT of the first access network interface 1856 and an RAT of the second access network interface 1858 be different from each other.

For example, the first backhaul network interface 1852 may be configured by a first RAT, the second backhaul network interface 1854 may be configured by a second RAT, the first access network interface 1856 may be configured by a third RAT, and the second access network interface 1858 may be configured by a fourth RAT. In this event, the third RAT may be the first or second RAT, and the fourth RAT may also be the first or second RAT. However, the third RAT is different from the fourth RAT.

Figure 19:
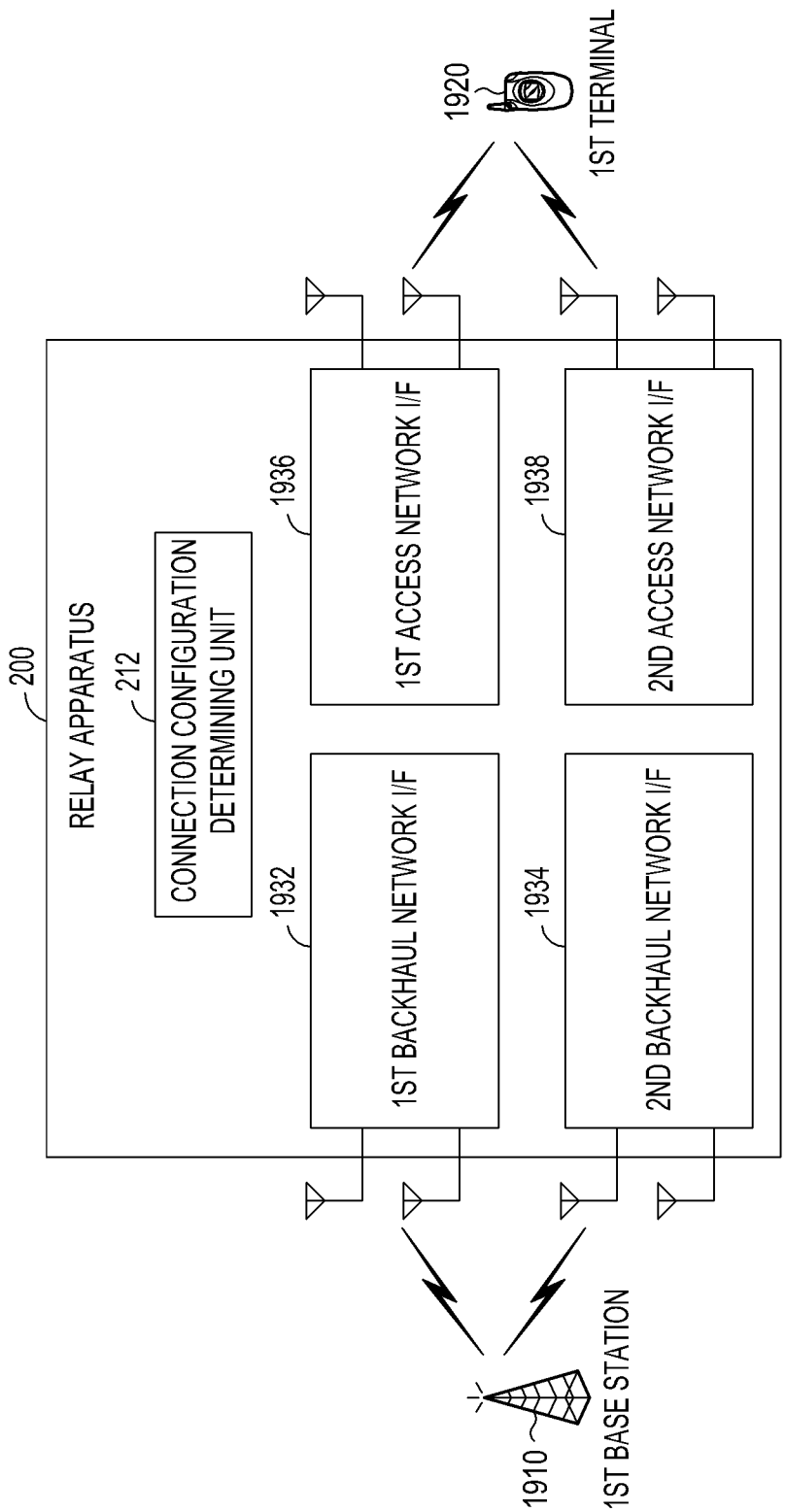
FIG. 19 illustrates an example of a network access structure configured by two backhaul network interfaces and two access network interfaces according to an embodiment of the present invention.

FIG. 19 illustrates another example of a network access structure configured by two backhaul network interfaces and two access network interfaces according to an embodiment of the present invention. Especially, the example illustrated in FIG. 19 is based on a case where each of two backhaul network interfaces is connected to one base station through two antennas and two access network interfaces are respectively connected to the same user terminal through two antennas.

Referring to FIG. 19, under the control of the connection configuration determining unit 212 of the relay node 200, a backhaul link connection between a first backhaul network interface 1932 and a first base station 1910 is configured through two antennas equipped with the relay node, and a backhaul link connection between a second backhaul network interface 1934 and the first base station 1910 is configured through two antennas equipped with the relay node. In this event, it is possible to achieve not only a backhaul link connection using a multi-antenna technology through each backhaul network interface but also a backhaul link connection through cooperation of at least two backhaul network interfaces.

Under the control of the connection configuration determining unit 212, an access link connection between a first access network interface 1936 and a first user terminal 1920 is configured through two antennas equipped with the relay node, and an access link connection between a second access network interface 1938 and the first user terminal 1920 is configured through two antennas equipped with the relay node. In this event, it is possible to achieve not only an access link connection using a multi-antenna technology through each access network interface but also an access link connection through cooperation of at least two access network interfaces.

To this end, a first backhaul network interface 1932 or a second backhaul network interface 1934 can scan adjacent base stations and/or other relay nodes through a scanning process under the control of the connection configuration determining unit 212. Further, the first access network interface 1936 or the second access network interface 1938 can scan adjacent user terminals and/or other relay nodes through a scanning process under the control of the connection configuration determining unit 212.

Although not shown in FIG. 19, under the control of the connection configuration determining unit 212, while a backhaul link connection between a first backhaul network interface 1932 and a first base station 1910 is configured, a backhaul link connection between a second backhaul network interface 1934 and another base station or another relay node can be configured. Further, under the control of the connection configuration determining unit 212, while a backhaul link connection between the first backhaul network interface 1932 and the first base station 1910 is configured, the second backhaul network interface 1934 scans adjacent base stations and/or other relay nodes through a scanning process. In both cases described above, it is possible to achieve a backhaul link connection using a multi-antenna technology.

Moreover, under the control of the connection configuration determining unit 212, while an access link connection between a first access network interface 1936 and a first user terminal 1920 is configured, an access link connection between a second access network interface 1938 and another base station or another relay node can be configured. Further, under the control of the connection configuration determining unit 212, while an access link connection between the first access network interface 1936 and the first user terminal 1920 is configured, the second access network interface 1938 scans adjacent user terminals and/or other relay nodes through a scanning process. In both cases described above, it is possible to achieve an access link connection using a multi-antenna technology.

Figure 20:
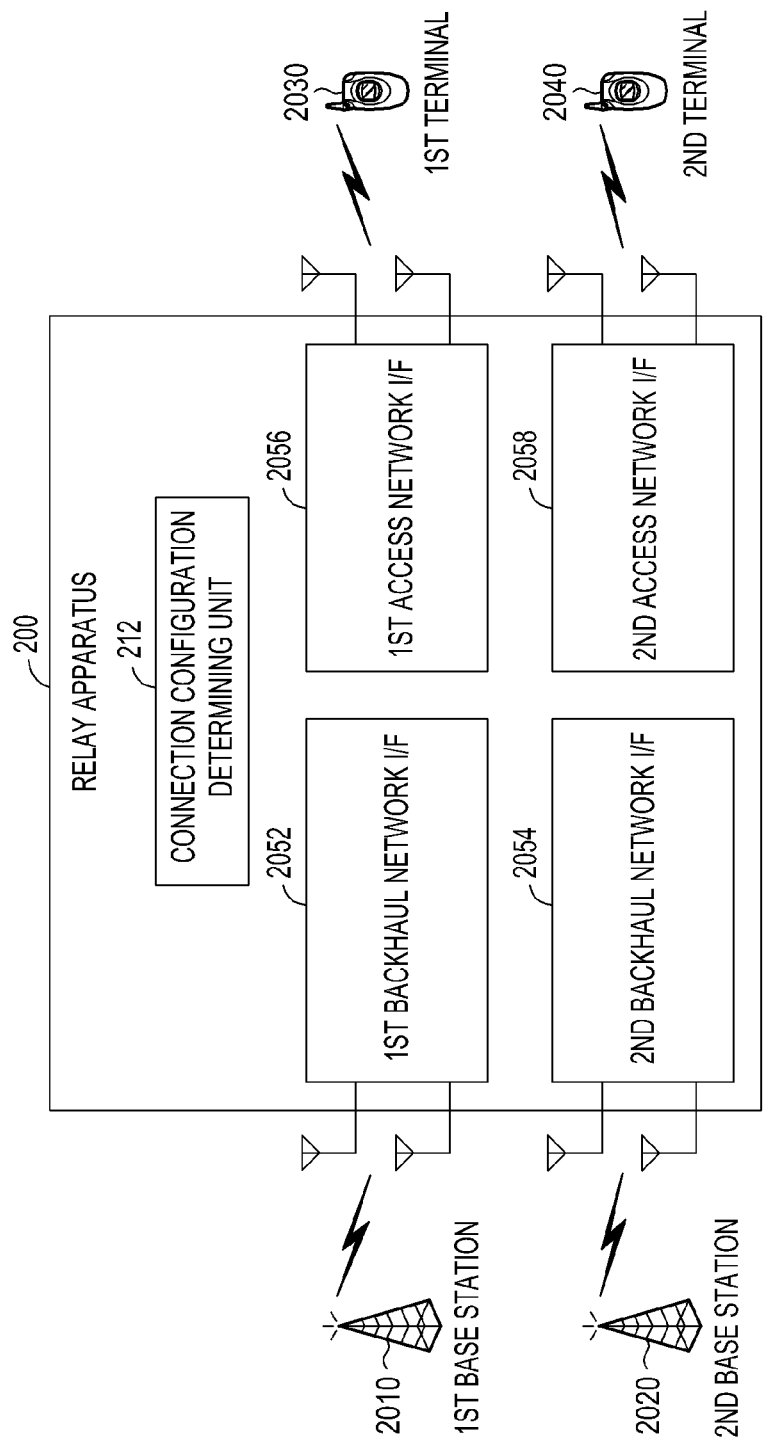
FIG. 20 illustrates an example of a network access structure configured by two backhaul network interfaces and two access network interfaces according to an embodiment of the present invention.

FIG. 20 illustrates another example of a network access structure configured by two backhaul network interfaces and two access network interfaces according to an embodiment of the present invention. Especially, the example illustrated in FIG. 20 is based on a case where two backhaul network interfaces are connected to different base stations through two antennas and two access network interfaces are respectively connected to different user terminals through two antennas.

Referring to FIG. 20, under the control of the connection configuration determining unit 212 of the relay node 200, a backhaul link connection between a first backhaul network interface 2052 and a first base station 2010 is configured through two antennas equipped with the relay node, and a backhaul link connection a second backhaul network interface 2054 and a second base station 2020 is configured through two antennas equipped with the relay node. In this event, it is possible to achieve a backhaul network link connection using a multi-antenna technology through each backhaul network interface.

Under the control of the connection configuration determining unit 212, an access link connection between a first access network interface 2056 and a first user terminal 2030 is configured through two antennas equipped with the relay node, and an access link connection between a second access network interface 2058 and the second user terminal 2040 is configured through two antennas equipped with the relay node. In this event, it is possible to achieve an access network link connection using a multi-antenna technology through each access network interface.

To this end, a first backhaul network interface 2052 or a second backhaul network interface 2054 can scan adjacent base stations and/or other relay nodes through a scanning process under the control of the connection configuration determining unit 212. Further, the first access network interface 2056 or the second access network interface 2058 can scan adjacent user terminals and/or other relay nodes through a scanning process under the control of the connection configuration determining unit 212.

For example, under the control of the connection configuration determining unit 212, simultaneously while a backhaul link connection between a first backhaul network interface 2052 and a first base station 2010 is configured, a backhaul link connection between a second backhaul network interface 2054 and a second base station 2020 can be configured. Further, under the control of the connection configuration determining unit 212, while a backhaul link connection between the first backhaul network interface 2052 and the first base station 2010 is configured, the second backhaul network interface 2054 scans the second base station 2020 through a scanning process.

Moreover, under the control of the connection configuration determining unit 212, while an access link connection between a first access network interface 2056 and a first user terminal 2030 is configured, an access link connection between a second access network interface 2058 and a second user terminal 2040 can be configured. Further, under the control of the connection configuration determining unit 212, while an access link connection between the first access network interface 2056 and the first user terminal 2030 is configured, the second access network interface 2058 scans the second user terminal 2040 through a scanning process.

Further, under the control of the connection configuration determining unit 212, it is possible to make an RAT of the first backhaul network interface 2052 and an RAT of the second backhaul network interface 2054 be different from each other. Further, it is possible to make an RAT of the first access network interface 2056 and an RAT of the second access network interface 2058 be different from each other.

For example, the first backhaul network interface 2052 may be configured by a first RAT, the second backhaul network interface 2054 may be configured by a second RAT, the first access network interface 2056 may be configured by a third RAT, and the second access network interface 2058 may be configured by a fourth RAT. In this event, the third RAT may be the first or second RAT, and the fourth RAT may also be the first or second RAT. However, the third RAT is different from the fourth RAT.

Hereinafter, examples of determination of a direct link connection structure will be described with reference to FIGS. 21 to 26.

The relay node can determine a network access structure by a direct link connection between at least one first communication node and at least one second communication node. Here, the at least one first communication node corresponds to at least one base station, at least another one relay node, and a plurality of nodes including at least one base station and at least another one relay node. Further, the at least one second communication node corresponds to at least one user terminal, at least another one relay node, and a plurality of nodes including at least one user terminal and at least another one relay node.

Further, the determination of a network access structure by the direct link connection can be performed by a connection configuration determining unit of a relay node, like the determination of a network access structure by the indirect link connection as described above.

The embodiment described below is based on a case where a backhaul network interface and an access network interface use different Radio Frequencies (RFs), there are only one backhaul network interface and only one access network interface, and each of the backhaul network interface and the access network interface is configured by one antenna. However, the embodiment described below is also applicable to cases where a backhaul network interface and an access network interface use the same Radio Frequency (RF), there are a plurality of backhaul network interfaces or a plurality of access network interfaces, or each of the backhaul network interface and the access network interface is configured by a plurality of antennas.

Although the backhaul network interface and the access network interface have discriminated roles in the following description, a backhaul network interface may operate as an access network interface to connect with a user terminal or an access network interface may operate as a backhaul network interface to connect with a base station.

Figure 21:
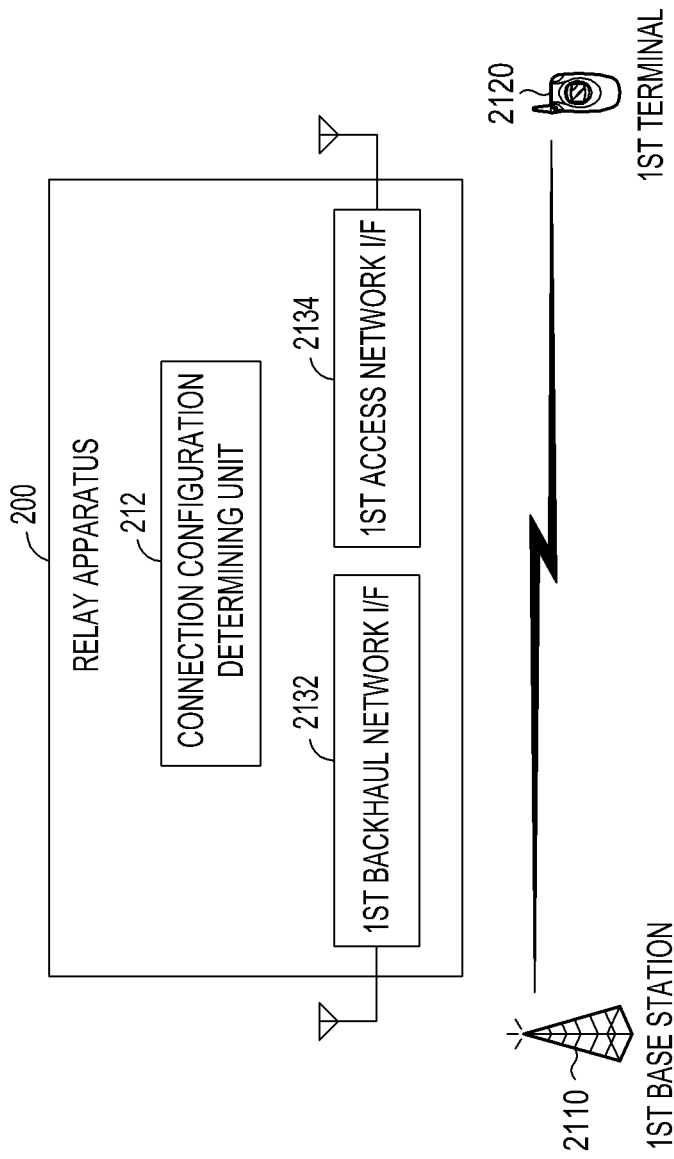
FIG. 21 illustrates an example of a network access structure interconnecting one base station and one user terminal through a direct access link according to an embodiment of the present invention.

FIG. 21 illustrates an example of a network access structure interconnecting one base station and one user terminal through a direct access link according to an embodiment of the present invention.

Referring to FIG. 21, under the control of the connection configuration determining unit 212 of the relay node 200, a direct access link connection between a first base station 2110 and a first user terminal 2120 is configured for direct communication.

Figure 22:
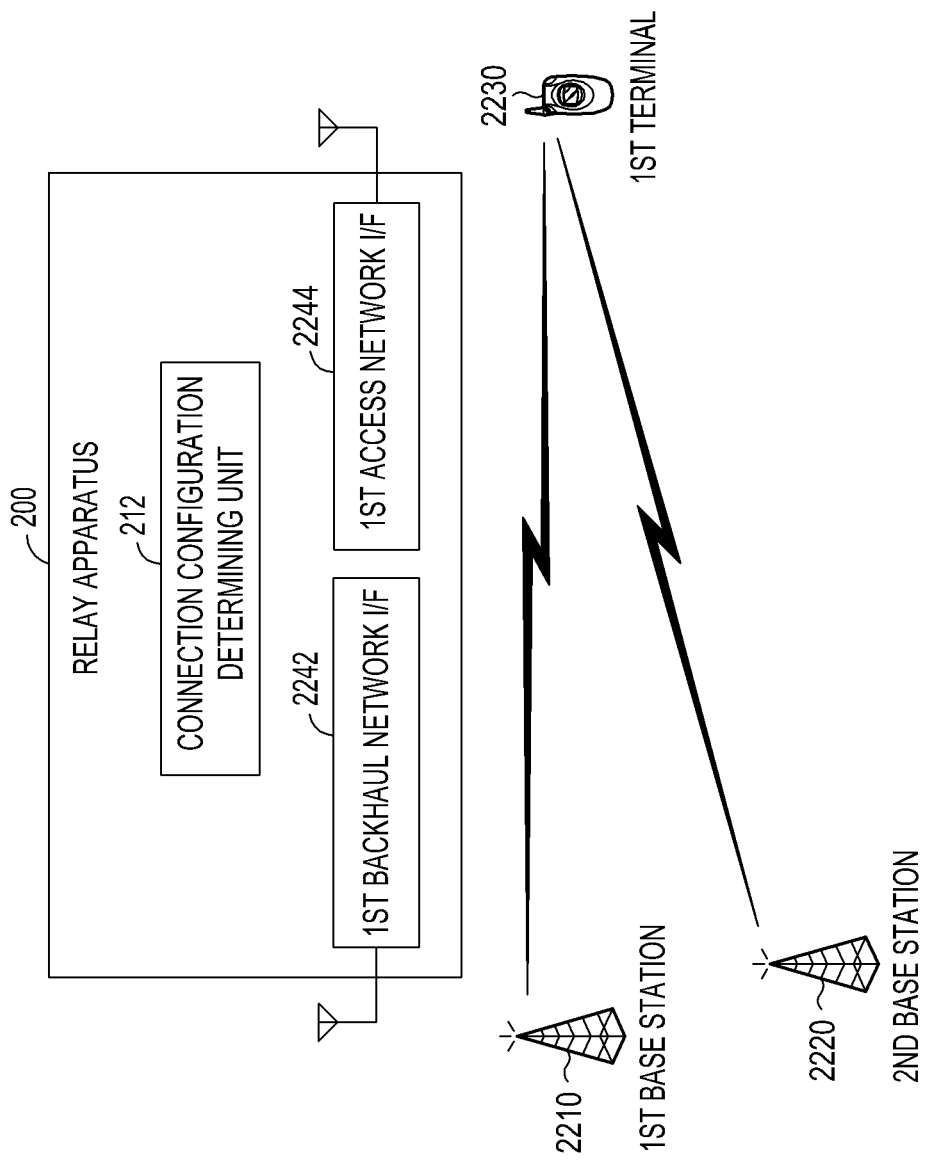
FIG. 22 illustrates an example of a network access structure interconnecting two base stations and one user terminal through a direct access link according to an embodiment of the present invention.

FIG. 22 illustrates an example of a network access structure interconnecting two base stations and one user terminal through a direct access link according to an embodiment of the present invention.

Referring to FIG. 22, under the control of the connection configuration determining unit 212 of the relay node 200, a direct access link connection between a plurality of first communication nodes comprising of a first base station 2210 and a second base station 2220 and a first user terminal 2230 is configured for direct communication.

Figure 23:
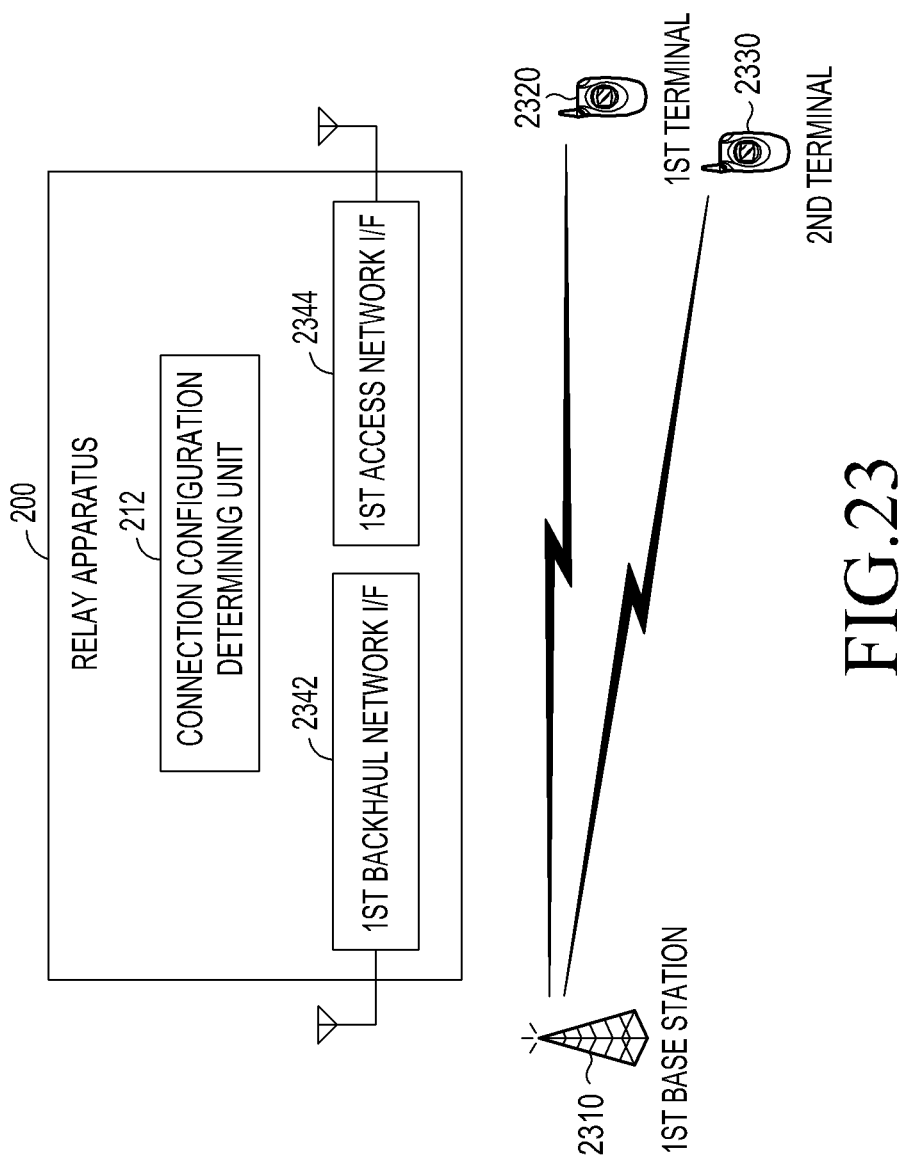
FIG. 23 illustrates an example of a network access structure interconnecting one base station and two user terminals through a direct access link according to an embodiment of the present invention.

FIG. 23 illustrates an example of a network access structure interconnecting one base station and two user terminals through a direct access link according to an embodiment of the present invention.

Referring to FIG. 23, under the control of the connection configuration determining unit 212 of the relay node 200, a direct access link connection between a first base station 2310 and a first user terminal 2320 and a second user terminal 2330 is configured for direct communication.

Figure 24:
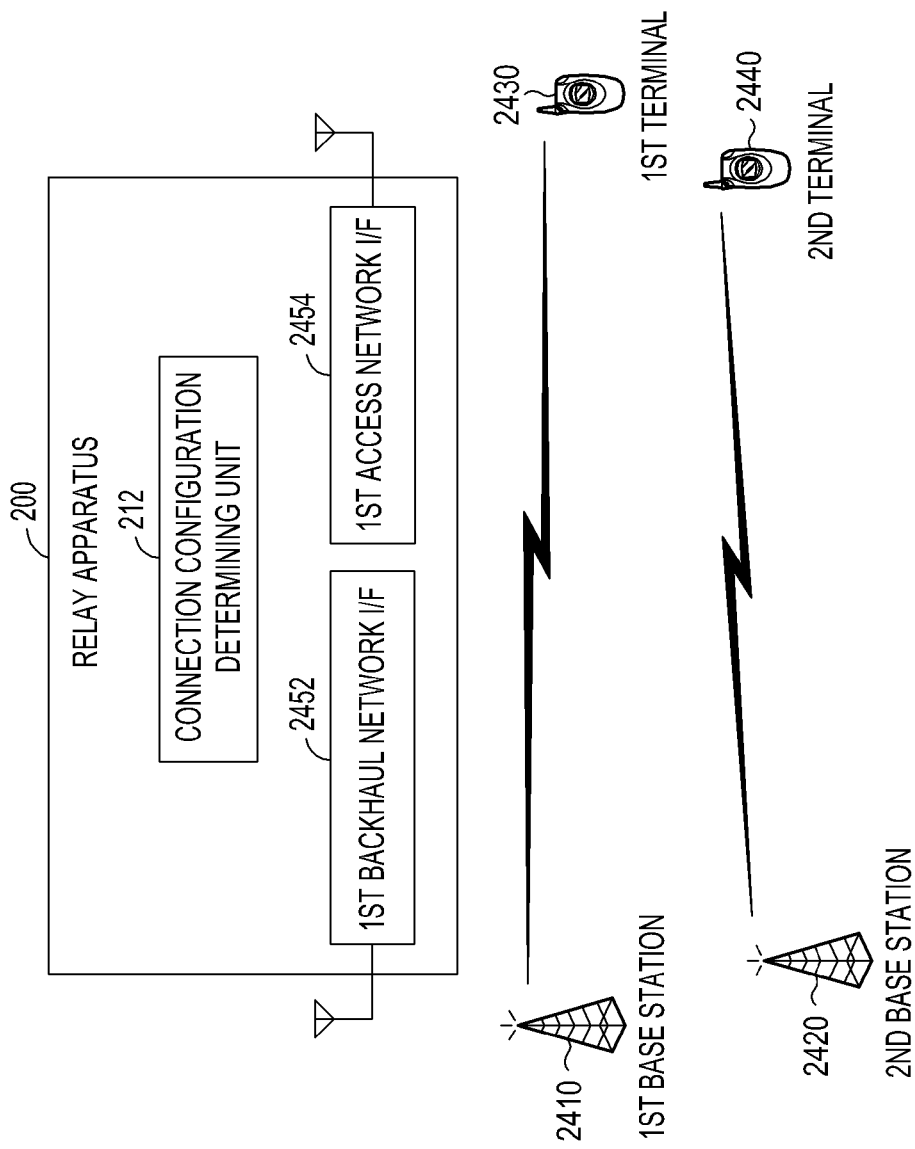
FIG. 24 illustrates an example of a network access structure interconnecting two base stations and two user terminals through a direct access link according to an embodiment of the present invention.

FIG. 24 illustrates an example of a network access structure interconnecting two base stations and two user terminals through a direct access link according to an embodiment of the present invention.

Referring to FIG. 24, under the control of the connection configuration determining unit 212 of the relay node 200, a direct access link connection between a first base station 2410 and a first user terminal 2430 is configured for direct communication, and a direct access link connection between a second base station 2420 and a second user terminal 2440 is configured for direct communication.

Figure 25:
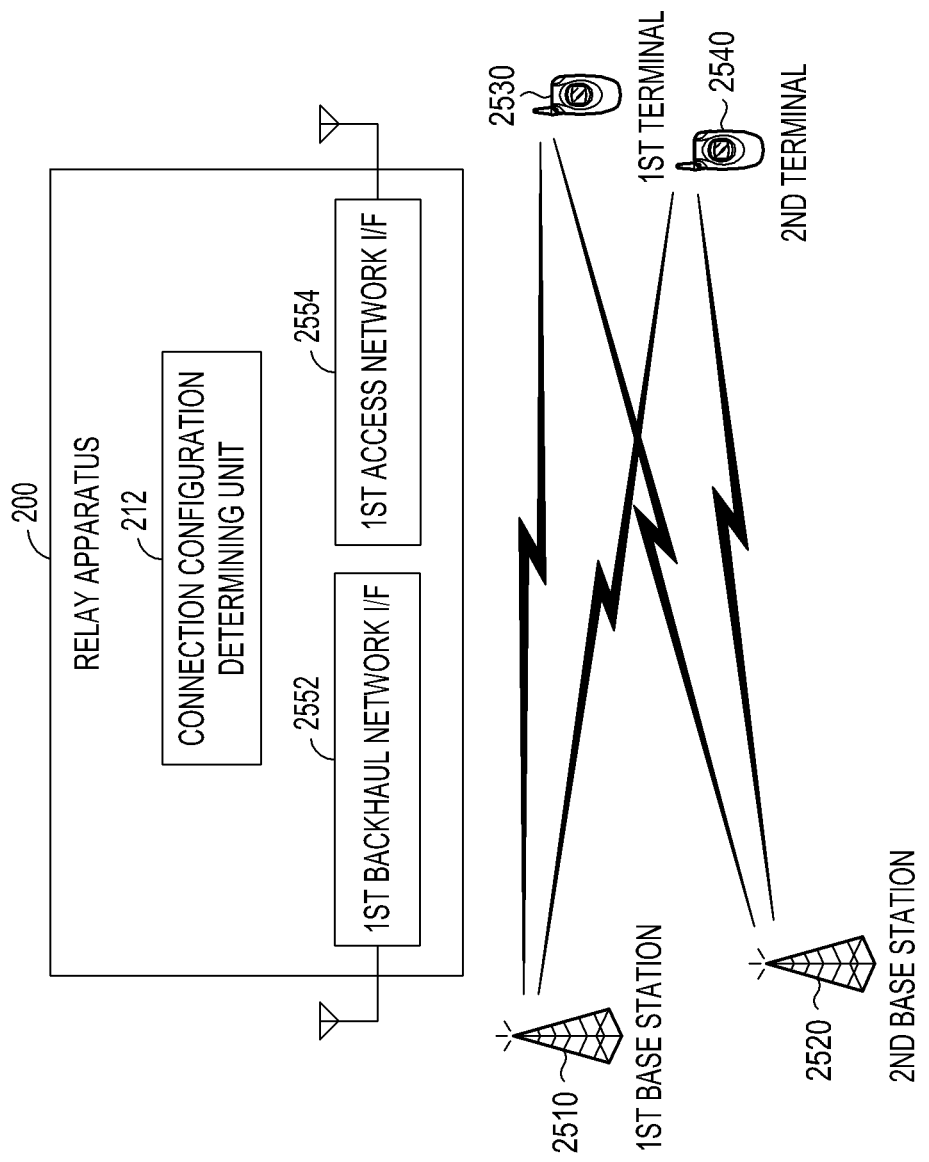
FIG. 25 illustrates an example of a network access structure interconnecting two base stations and two user terminals through a direct access link according to an embodiment of the present invention.

FIG. 25 illustrates another example of a network access structure interconnecting two base stations and two user terminals through a direct access link according to an embodiment of the present invention.

Referring to FIG. 25, under the control of the connection configuration determining unit 212 of the relay node 200, a direct access link connection between a first base station 2510 and a plurality of second communication nodes comprising of a first user terminal 2530 and a second user terminal 2540 is configured for direct communication, and a direct access link connection between a second base station 2520 and a plurality of second communication nodes comprising of a first user terminal 2530 and a second user terminal 2540 is configured for direct communication.

Figure 26:
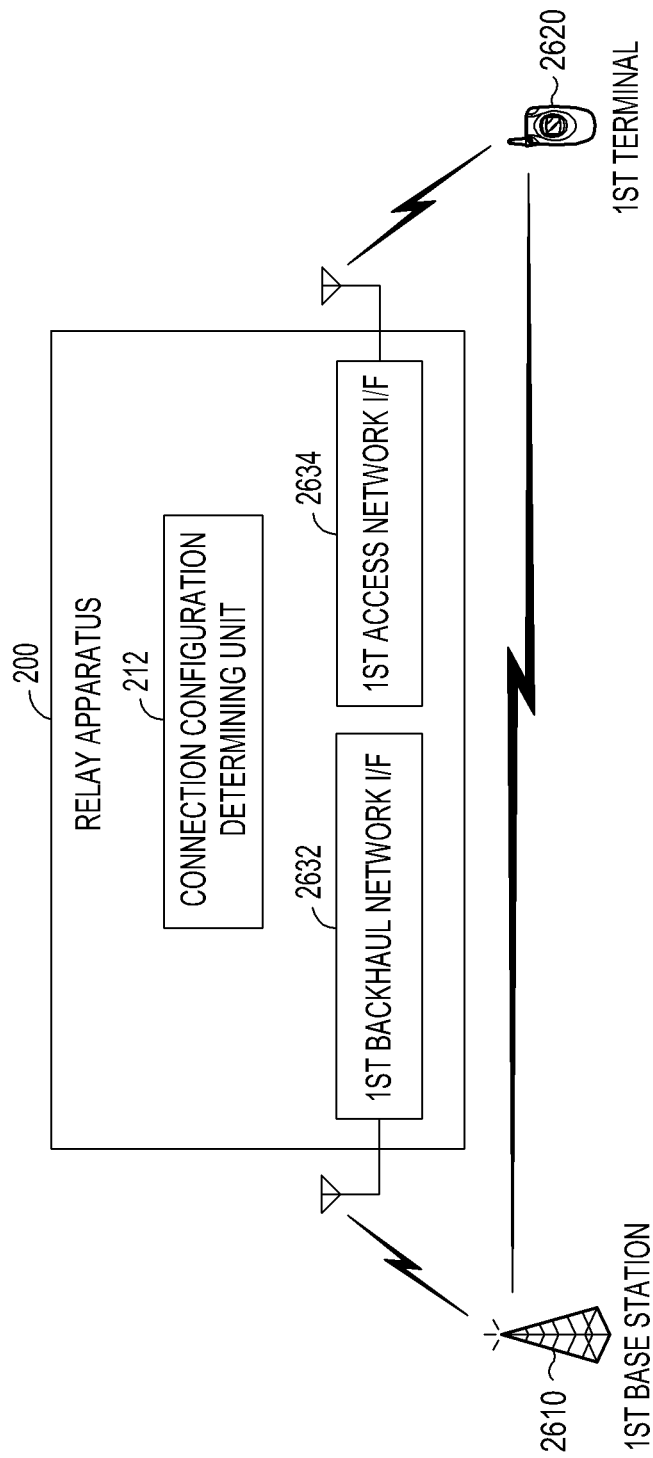
FIG. 26 illustrates an example of a network access structure in which a direct link connection and an indirect link connection coexist according to an embodiment of the present invention.

FIG. 26 illustrates an example of a network access structure in which a direct link connection and an indirect link connection coexist according to an embodiment of the present invention. Especially, the example illustrated in FIG. 26 corresponds to a case wherein one base station and one user terminal are interconnected through an indirect link connection and a direct link connection. In this case, the indirect link connection includes a backhaul link connection between one base station and one relay node and an access link connection between the relay node and one user terminal.

Referring to FIG. 26, under the control of the connection configuration determining unit 212 of the relay node 200, a backhaul link connection between a first backhaul network interface 2632 and a first base station 2610 is configured, and an access link connection between a first access network interface 2634 and a first user terminal 2620 is configured.

Further, under the control of the connection configuration determining unit 212, a direct access link connection between a first base station 2610 and the first user terminal 2620 is configured for direct communication.

C-2□ Relay Structure Determining Scheme

The relay structure according to an embodiment of the present invention refers to a connection structure within a relay node for interconnecting at least one first communication node and at least one second communication node through an indirect link.

To this end, the connection configuration determining unit of the relay node can determine an internal connection structure for an indirect link connection between at least one first communication node and at least one second communication node. Here, the at least one first communication node corresponds to at least one base station, at least another one relay node, and a plurality of nodes including at least one base station and at least another one relay node. Further, the at least one second communication node corresponds to at least one user terminal, at least another one relay node, and a plurality of nodes including at least one user terminal and at least another one relay node.

The embodiment described below is based on a case where one or two backhaul network interfaces and one or two access network interfaces exist and each of the backhaul network interface and the access network interface is configured by one antenna. Further, a relay structure of a relay node which includes different RATs to support heterogeneous network environments and configures a connection between at least one base station and at least one user terminal will be described.

When the backhaul network interface and the access network interface are configured by different RATs as described above, a connection configuration between a backhaul network interface and an access network interface for relay within a relay node is determined for a connection configuration between an interface of the relay node, a base station, a user terminal, and another relay node.

However, it goes without saying that the embodiments to be described below are also applicable to cases where there are three or more backhaul network interfaces or three or more access network interfaces or each of the backhaul network interfaces and the access network interfaces is connected to three or more antennas.

Figure 27:
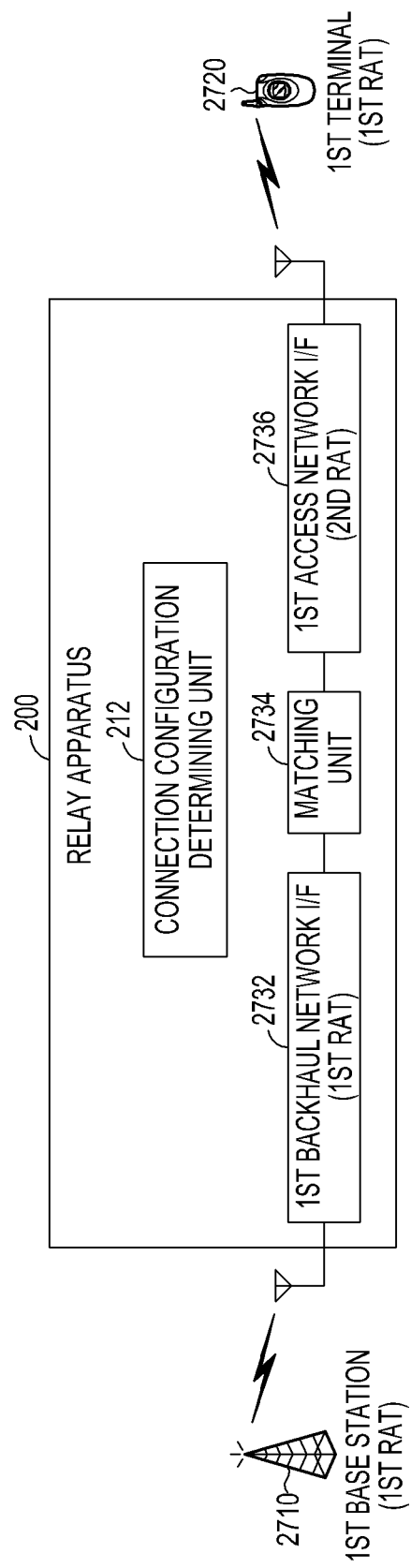
FIG. 27 illustrates an example of a relay structure interconnecting one base station and one user terminal through an indirect access link according to an embodiment of the present invention.

FIG. 27 illustrates an example of a relay structure interconnecting one base station and one user terminal through an indirect access link according to an embodiment of the present invention. Especially, the example illustrated in FIG. 27 is based on a case where each of one backhaul network interface and one access network interface is connected to one antenna and the backhaul network interface and the access network interface are configured by the same RAT.

Referring to FIG. 27, relaying between the first base station 2710 configured by a first RAT and a first user terminal 2720 configured by the first RAT includes a downlink transmission and an uplink transmission.

At the time of the downlink transmission, the relay node 200 forwards a first RAT signal, which has been received through a first backhaul network interface 2732 from the first base station 2710, to the first user terminal 2720 through a first access network interface 2736.

In this event, since the first base station 2710 and the first user terminal 2720 are configured by the same RAT, a matching unit 2734 of the relay node 200 transfers the first RAT signal provided by the first backhaul network interface 2732 to the first access network interface 2736 without an RAT conversion.

At the time of the uplink transmission, the relay node 200 forwards a first RAT signal, which has been received through the first access network interface 2736 from the first user terminal 2720, to the first base station 2710 through the first backhaul network interface 2732.

In this event also, since the first base station 2710 and the first user terminal 2720 are configured by the same RAT, the matching unit 2734 transfers the first RAT signal provided by the first access network interface 2736 to the first backhaul network interface 2732 without an RAT conversion.

Figure 28:
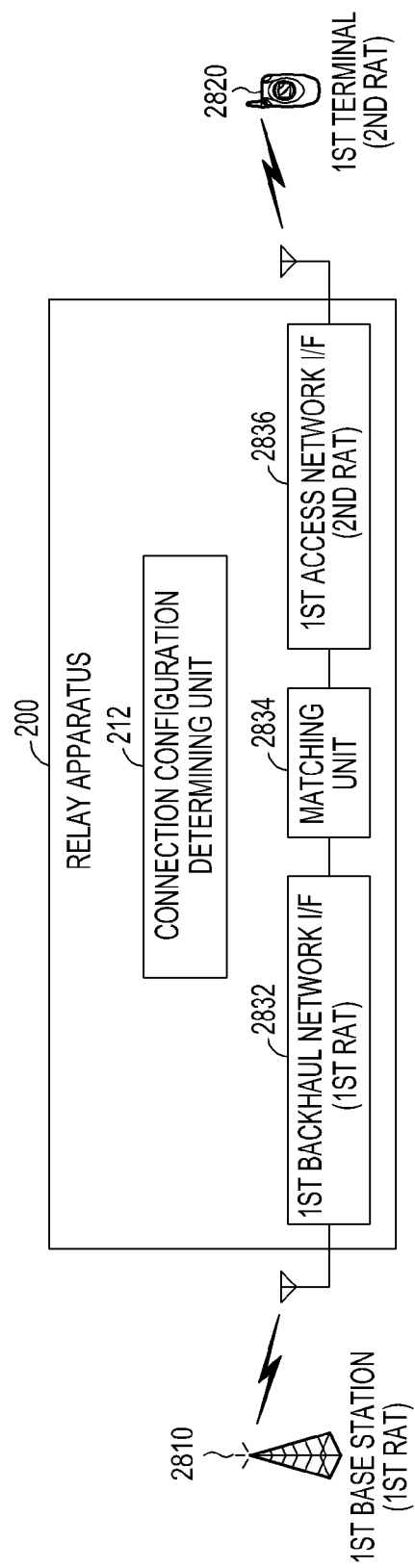
FIG. 28 illustrates an example of a relay structure interconnecting one base station and one user terminal through an indirect access link according to an embodiment of the present invention.

FIG. 28 illustrates another example of a relay structure interconnecting one base station and one user terminal through an indirect access link according to an embodiment of the present invention. Especially, the example illustrated in FIG. 28 is based on a case where each of one backhaul network interface and one access network interface is connected to one antenna and the backhaul network interface and the access network interface are configured by different RATs.

Referring to FIG. 28, relaying between the first base station 2810 configured by a first RAT and a first user terminal 2820 configured by a second RAT includes a downlink transmission and an uplink transmission.

At the time of the downlink transmission, the relay node 200 forwards a first RAT signal, which has been received through a first backhaul network interface 2810 from the first base station 2832, to the first user terminal 2820 through a first access network interface 2836.

In this event, since the first base station 2810 and the first user terminal 2820 are configured by different RATs, a matching unit 2834 of the relay node 200 converts a first RAT signal provided by the first backhaul network interface 2832 into a second RAT signal and then transfers the converted second RAT signal to the first access network interface 2836.

At the time of the uplink transmission, the relay node 200 forwards a second RAT signal, which has been received through the first access network interface 2836 from the first user terminal 2820, to the first base station 2810 through the first backhaul network interface 2832.

In this event also, since the first base station 2810 and the first user terminal 2820 are configured by different RATs, the matching unit 2834 converts a second RAT signal provided by the first access network interface 2836 into a first RAT signal and then transfers the converted first RAT signal to the first backhaul network interface 2832.

Figure 29:
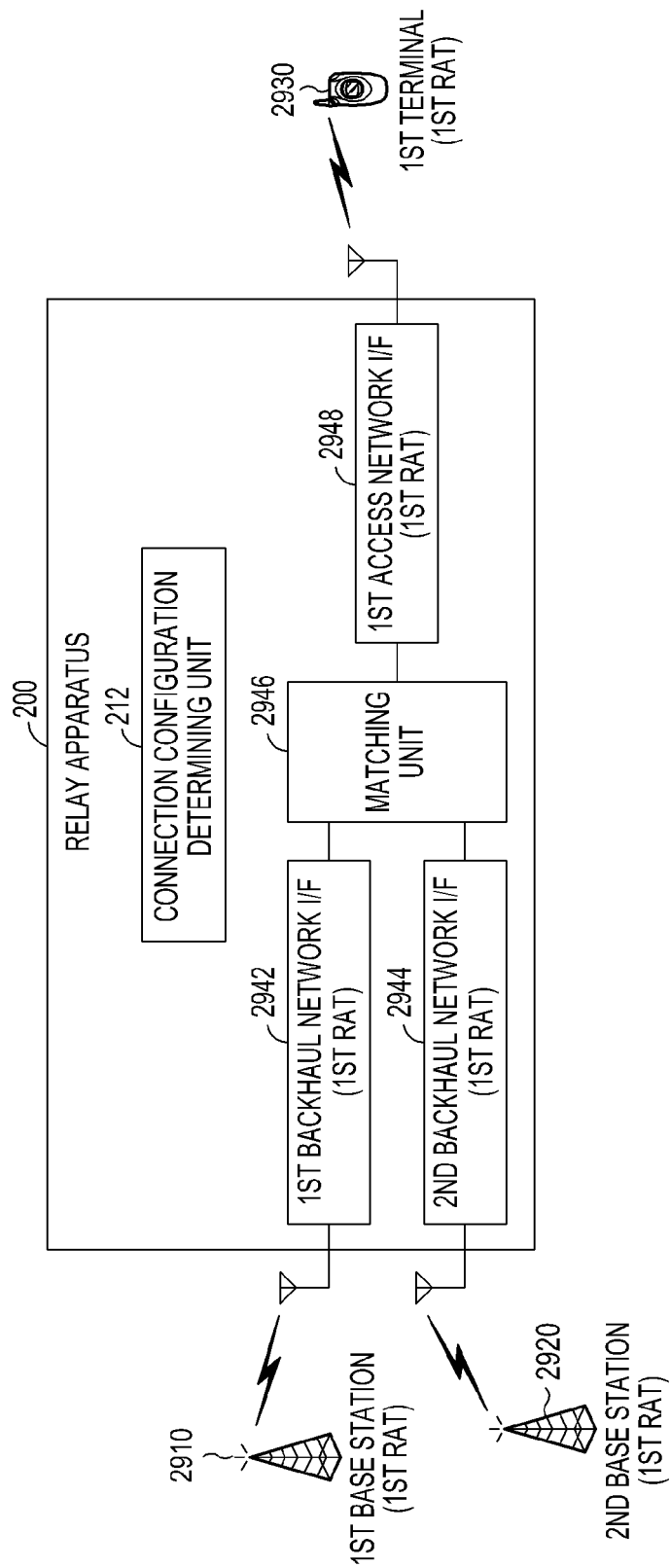
FIG. 29 illustrates an example of a relay structure interconnecting two base stations and one user terminal through an indirect access link according to an embodiment of the present invention.

FIG. 29 illustrates an example of a relay structure interconnecting two base stations and one user terminal through an indirect access link according to an embodiment of the present invention. Especially, the example illustrated in FIG. 29 is based on a case where two backhaul network interfaces are connected to different base stations individually through a single antenna, and one access network interface is connected to one user terminal through one antenna. Further, the example illustrated in FIG. 29 is limited to a case where the two backhaul network interfaces and the single access network interface are configured by the same RAT.

Referring to FIG. 29, relaying between a first base station 2910 and a second base station 2920 configured by a first RAT and a first user terminal 2930 configured by the first RAT includes a downlink transmission and an uplink transmission.

At the time of the downlink transmission, the relay node 200 combines a first RAT signal, which has been received through a first backhaul network interface 2942 from the first base station 2910, and a first RAT signal, which has been received through a second backhaul network interface 2944 from the second base station 2920. Then, the relay node 200 forwards the combined signal through the first access network interface 2948 to the first user terminal 2930.

In this event, since the first base station 2910, the second base station 2920, and the first user terminal 2930 are configured by the same RAT, a matching unit 2946 of the relay node 200 transfers the first RAT signals provided by the first backhaul network interface 2942 and the second backhaul network interface 2944 to the first access network interface 2948 without an RAT conversion.

At the time of the uplink transmission, the relay node 200 distributes the first RAT signal, which has been received through the first access network interface 2948 from the first user terminal 2930, and then forwards the distributed signal to the first base station 2910 and the second base station 2920 through the first backhaul network interface 2942 and the second backhaul network interface 2944.

In this event also, since the first base station 2910, the second base station 2920, and the first user terminal 2930 are configured by the same RAT, the matching unit 2946 distributes the first RAT signals provided by the first access network interface 2948 without conversion, and then transfers the distributed signal to the first backhaul network interface 2942 and the second backhaul network interface 2944.

Figure 30:
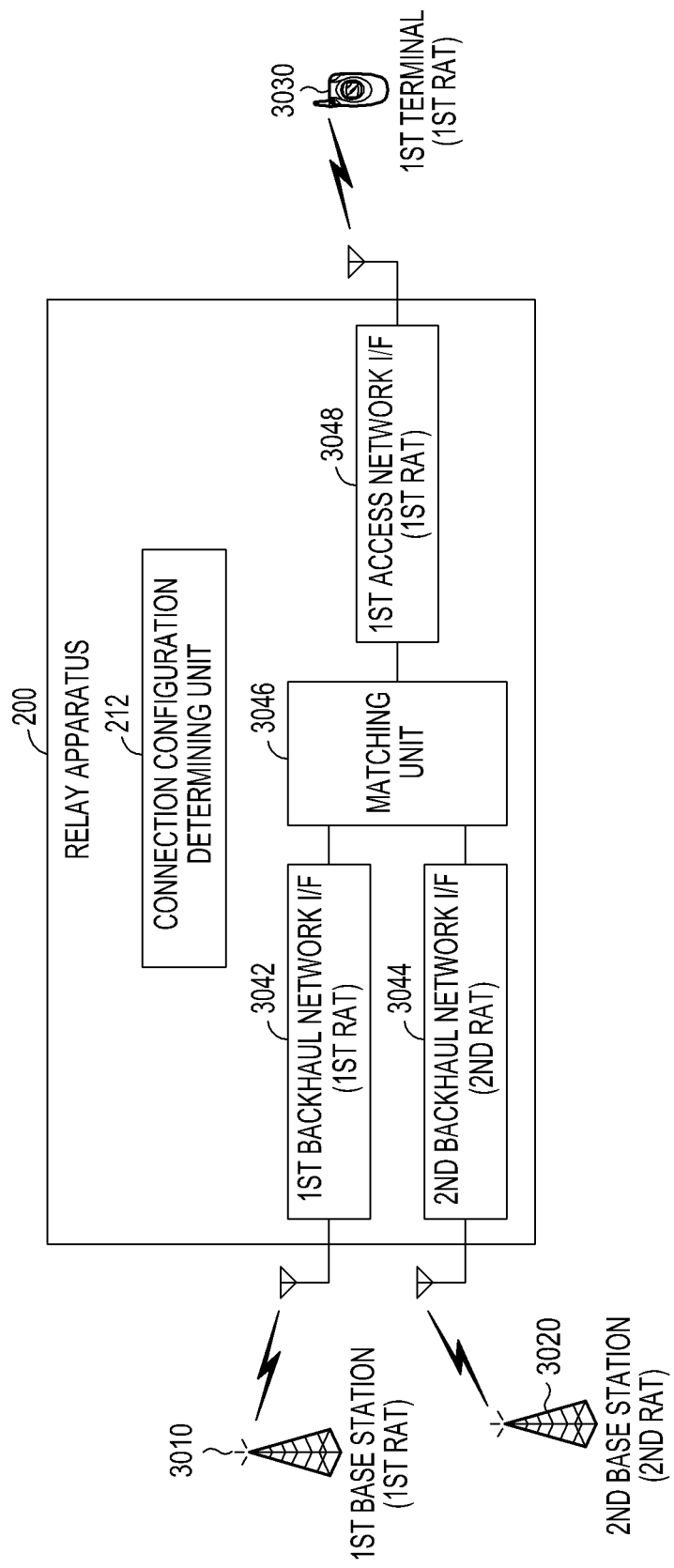
FIG. 30 illustrates another example of a relay structure interconnecting two base stations and one user terminal through an indirect access link according to an embodiment of the present invention.

FIG. 30 illustrates another example of a relay structure interconnecting two base stations and one user terminal through an indirect access link according to an embodiment of the present invention. Especially, the example illustrated in FIG. 30 is based on a case where two backhaul network interfaces are connected to different base stations individually through a single antenna, and one access network interface is connected to one user terminal through one antenna. Further, the example illustrated in FIG. 30 is based on a case where the two backhaul network interfaces are configured by different RATs and the access network interface and one of the backhaul network interfaces are configured by the same RAT.

Referring to FIG. 30, relaying between a first base station 3010 and a second base station 3020 configured by a first RAT and a first user terminal 3030 configured by the first RAT includes a downlink transmission and an uplink transmission.

At the time of the downlink transmission, the relay node 200 converts a second RAT signal, which has been received through the second backhaul network interface 3044 from the second base station 3020, to a first RAT signal. Then, the relay node 200 combines the converted first RAT signal with the first RAT signal, which has been received through the first backhaul network interface 3042 from the first base station 3010. Then, the relay node 200 forwards the combined signal through the first access network interface 3048 to the first user terminal 3030.

In this event, since the first base station 3010 and the second base station 3020 are configured by different RATs, a matching unit 3046 of the relay node 200 converts the second RAT signal provided by the second backhaul network interface 3044 into a first RAT signal, combines the converted first RAT signal with the first RAT signal provided by the first backhaul network interface 3042, and then transfers the combined signal to the first access network interface 3048. The reason why the second RAT signal provided by the second backhaul network interface 3044 is converted into the first RAT signal is that the first user terminal 3030 is configured by the first RAT.

At the time of the uplink transmission, the relay node 200 distributes the first RAT signal, which has been received through the first access network interface 3048 from the first user terminal 3030, into two first RAT signals. Then, the relay node 200 forwards one first RAT signal among the distributed two first RAT signals through the first backhaul network interface 3042 to the first base station 3010. Then, the relay node 200 converts one first RAT signal among the distributed two first RAT signals into a second RAT signal, and then forwards the converted second RAT signal through the second backhaul network interface 3044 to the second base station 3020.

To this end, the matching unit 3046 of the relay node 200 distributes the first RAT signal provided by the first access network interface 3048 and then converts one of the distributed first RAT signals into a second RAT signal.

Figure 31:
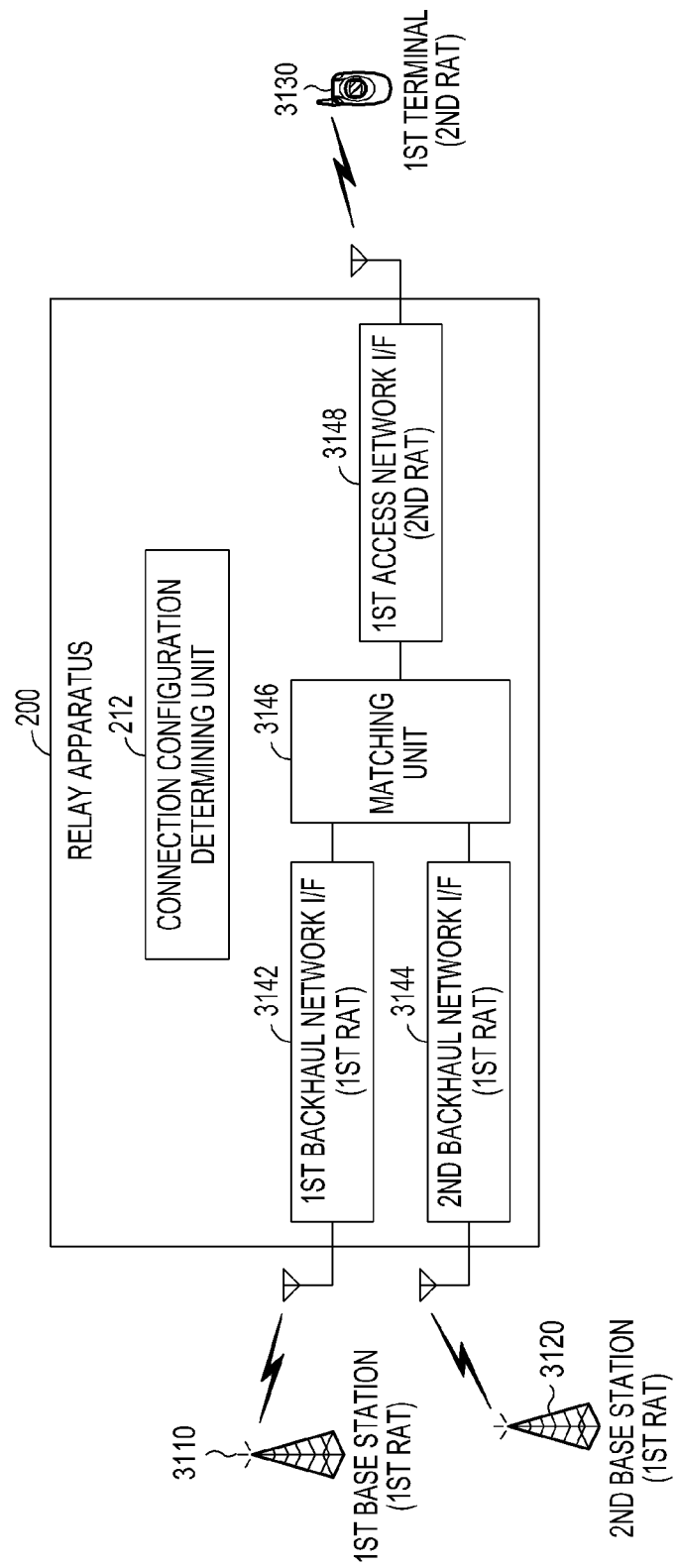
FIG. 31 illustrates another example of a relay structure interconnecting two base stations and one user terminal through an indirect access link according to an embodiment of the present invention.

FIG. 31 illustrates another example of a relay structure interconnecting two base stations and one user terminal through an indirect access link according to an embodiment of the present invention. Especially, the example illustrated in FIG. 31 is based on a case where two backhaul network interfaces are connected to different base stations individually through a single antenna, and one access network interface is connected to one user terminal through one antenna. Further, the example illustrated in FIG. 31 is based on a case where the two backhaul network interfaces are configured by the same RAT and the access network interface and the backhaul network interfaces are configured by different RATs.

Referring to FIG. 31, relaying between a first base station 3110 and a second base station 3120 configured by a first RAT and a first user terminal 3130 configured by a second RAT includes a downlink transmission and an uplink transmission.

At the time of the downlink transmission, the relay node 200 combines a first RAT signal, which has been received through a first backhaul network interface 3142 from the first base station 3110, and a first RAT signal, which has been received through a second backhaul network interface 3144 from the second base station 3120, and then converts the combined signal into a second RAT signal. Of course, the relay node 200 may convert a first RAT signal received through a first backhaul network interface 3142 into a second RAT signal and convert a first RAT signal received through a second backhaul network interface 3144 into a second RAT signal, and then combine the converted two second RAT signals. Then, the relay node 200 forwards the second RAT signal obtained through the combination and conversion through the first access network interface 3148 to the first user terminal 3130.

To this end, the matching unit 3146 of the relay node 200 performs an operation for converting the first RAT signal provided by each of the first and second backhaul network interfaces 3142 and 3144 into a second RAT signal or combining them.

At the time of the uplink transmission, the relay node 200 converts the second RAT signal, which has been received through the first access network interface 3148 from the first user terminal 3130, into a first RAT signal, and then distributes the converted first RAT signal into two first RAT signals. Of course, the relay node 200 may first distribute the second RAT signal received through the first access network interface 3148 into two second RAT signals and then convert each of the distributed two second RAT signals into a first RAT signal.

The relay node 200 forwards one first RAT signal among the two first RAT signals obtained by the distribution or conversion through the first backhaul network interface 3142 to the first base station 3110 and forwards the other first RAT signal through the second backhaul network interface 3144 to the second base station 3120.

To this end, the matching unit 3146 performs distribution and conversion in order to obtain two first RAT signals from the second RAT signal provided by the first access network interface 3148.

Figure 32:
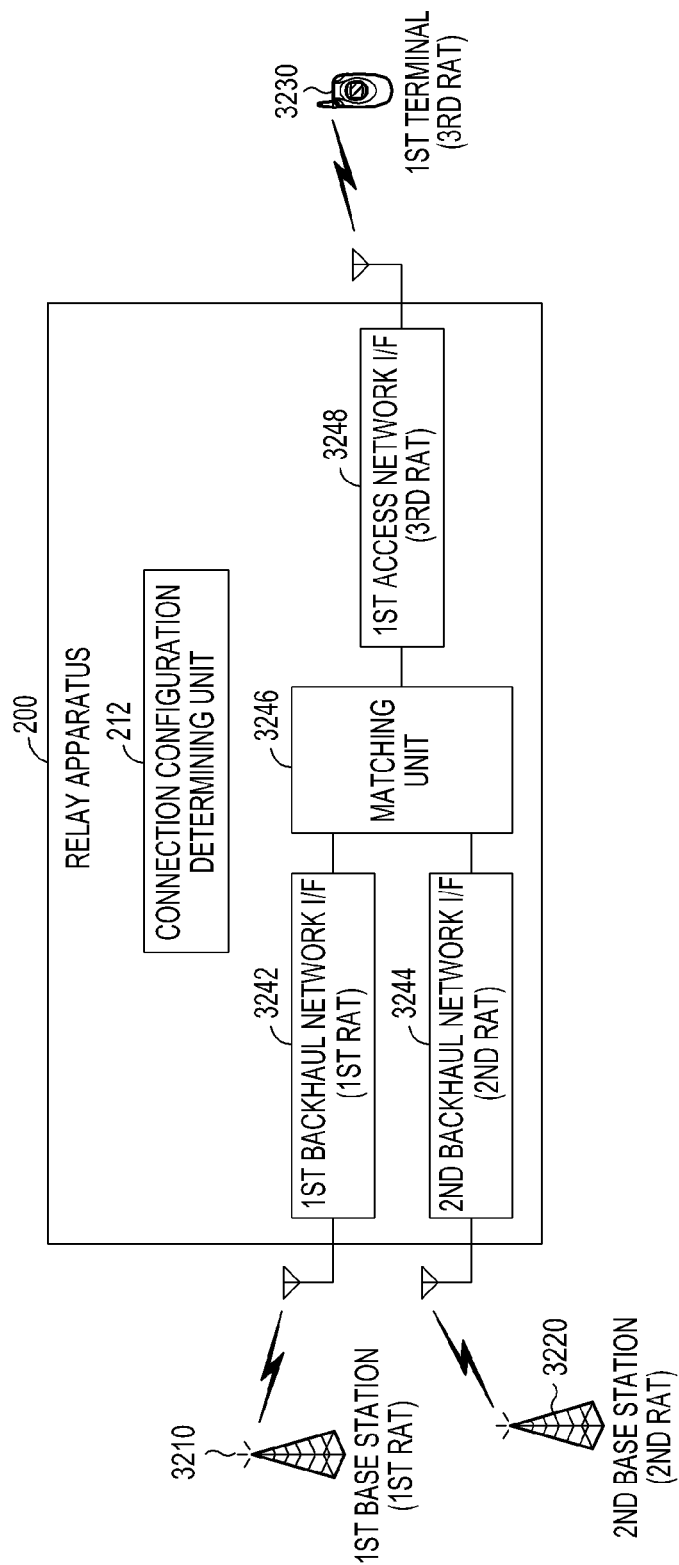
FIG. 32 illustrates another example of a relay structure interconnecting two base stations and one user terminal through an indirect access link according to an embodiment of the present invention.

FIG. 32 illustrates another example of a relay structure interconnecting two base stations and one user terminal through an indirect access link according to an embodiment of the present invention. Especially, the example illustrated in FIG. 32 is based on a case where two backhaul network interfaces are connected to different base stations individually through a single antenna, and one access network interface is connected to one user terminal through one antenna. Further, the example illustrated in FIG. 32 is limited to a case where the two backhaul network interfaces and the single access network interface are configured by different RATs.

Referring to FIG. 32, relaying from the first base station 3210 and the second base station 3220 to the first user terminal 3130 includes a downlink transmission and an uplink transmission.

At the time of the downlink transmission, the relay node 200 converts each of a first RAT signal, which has been received through a first backhaul network interface 3242 from the first base station 3210, and a second RAT signal, which has been received through a second backhaul network interface 3244 from the second base station 3220, into a third RAT signal, and then combines the converted third RAT signals. Of course, the relay node 200 may convert the first RAT signal received through the first backhaul network interface 3242 into a third RAT signal and convert the second RAT signal received through the second backhaul network interface 3244 into a third RAT signal, and then combine the converted two third RAT signals.

The relay node 200 forwards the third RAT signal obtained through the combination or conversion through the first access network interface 3248 to the first user terminal 3230.

To this end, the matching unit 3246 of the relay node 200 performs an operation for converting the first RAT signal and the second RAT signal respectively provided by the first and second backhaul network interfaces 3142 and 3144 into third RAT signals or combining them.

At the time of the uplink transmission, the relay node 200 distributes the third RAT signal, which has been received through the first access network interface 3248 from the first user terminal 3230, into two third RAT signals, converts one of the distributed two third RAT signals into a first RAT signal, and converts the other third RAT signal into a second RAT signal. The relay node 200 forwards the first RAT signal obtained by the conversion through the first backhaul network interface 3242 to the first base station 3210 and forwards the second RAT signal obtained by the conversion through the second backhaul network interface 3244 to the second base station 3220.

To this end, the matching unit 3246 performs distribution and conversion in order to obtain one first RAT signal and one second RAT signal from the third RAT signal provided by the first access network interface 3248.

Figure 33:
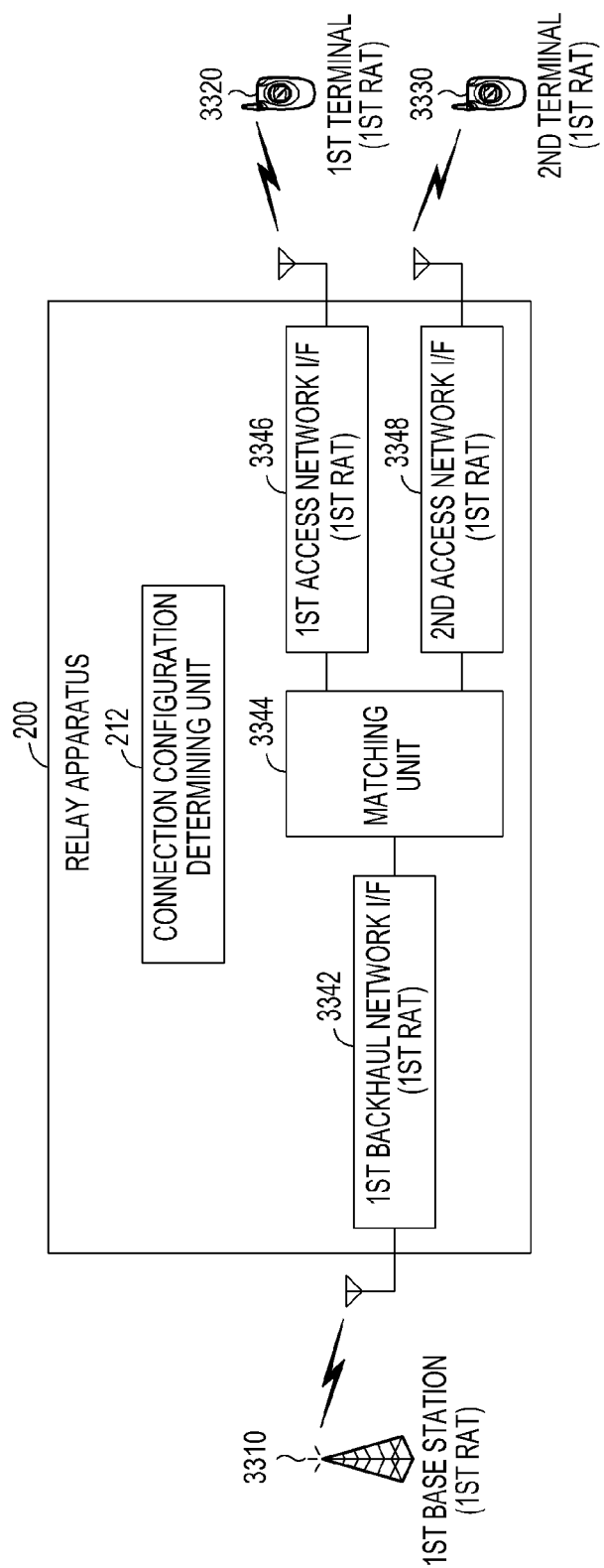
FIG. 33 illustrates an example of a relay structure interconnecting one base station and one user terminal through an indirect access link according to an embodiment of the present invention.

FIG. 33 illustrates an example of a relay structure interconnecting one base station and two user terminals through an indirect access link according to an embodiment of the present invention. Especially, the example illustrated in FIG. 33 is based on a case where one backhaul network interface is connected to one base station through one antenna and two access network interfaces are connected to different user terminals individually through one antenna. Further, the example illustrated in FIG. 33 is limited to a case where the single backhaul network interface and the two access network interfaces are configured by the same RAT.

Referring to FIG. 33, relaying between the first base station 3310, the first user terminal 3320, and the second user terminal 3330 includes a downlink transmission and an uplink transmission.

At the time of the downlink transmission, the relay node 200 distributes the first RAT signal, which has been received through the first backhaul network interface 3342 from the first base station 3310, and then forwards two first RAT signals obtained by the distribution to the user terminal 3320 and the second user terminal 3320 through the first access network interface 3346 and the second access network interface 3348, respectively.

To this end, the matching unit 3344 of the relay node 200 distributes the first RAT signal provided by the first backhaul network interface 3342 without RAT conversion and then transfers the distributed first RAT signals to a first access network interface 3346 and a second access network interface 3348.

At the time of the uplink transmission, the relay node 200 combines a first RAT signal, which has been received through a first access network interface 3346 from the first user terminal 3320, and a first RAT signal, which has been received through a second access network interface 3348 from the second user terminal 3330. The relay node 200 forwards a signal obtained by the combination through the first backhaul network interface 3342 to the first base station 3310.

To this end, the matching unit 3344 combines the first RAT signals provided by the first access network interface 3346 and the second access network interface 3348 without RAT conversion and then transfers the signal obtained through the combination to the first backhaul network interface 3342.

Figure 34:
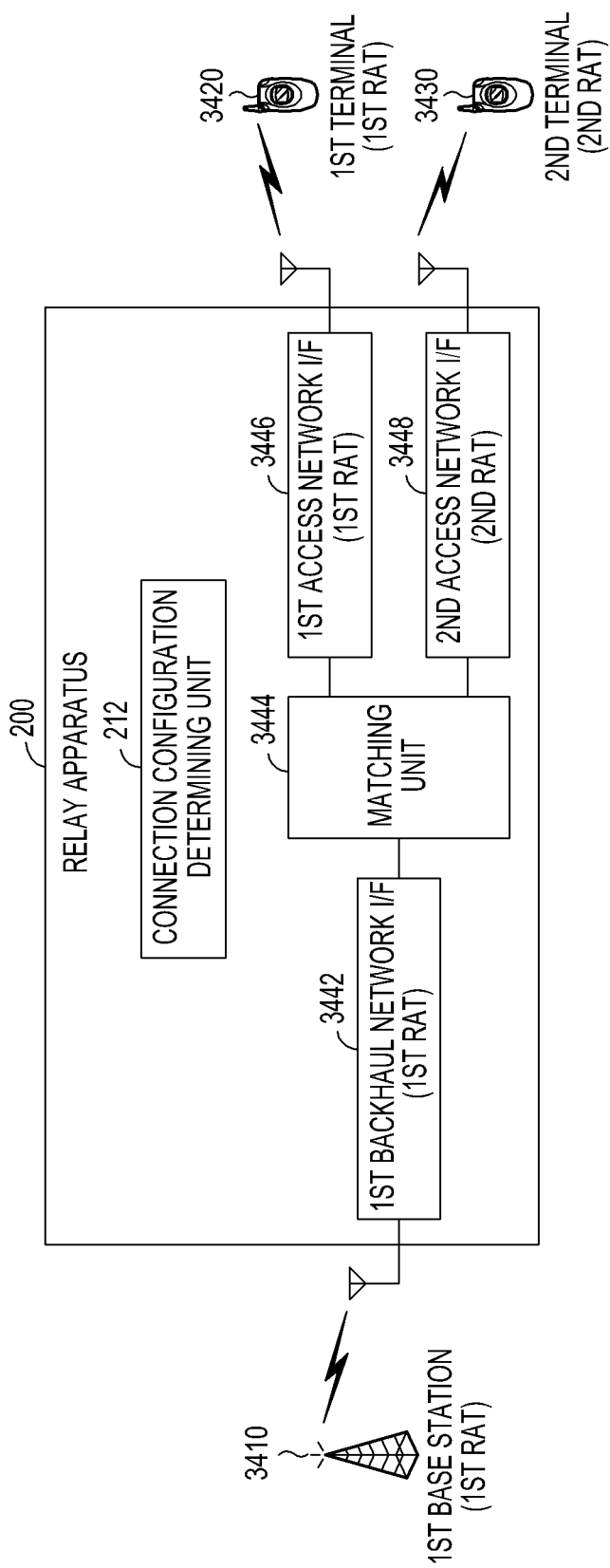
FIG. 34 illustrates another example of a relay structure interconnecting one base station and two user terminals through an indirect access link according to an embodiment of the present invention.

FIG. 34 illustrates another example of a relay structure interconnecting one base station and two user terminals through an indirect access link according to an embodiment of the present invention. Especially, the example illustrated in FIG. 34 is based on a case where one backhaul network interface is connected to one base station through one antenna and two access network interfaces are connected to different user terminals individually through one antenna. Further, the example illustrated in FIG. 34 is based on a case where the two access network interfaces are configured by different RATs and the backhaul network interface and one of the two access network interfaces are configured by the same RAT.

Referring to FIG. 34, relaying between a first base station 3410 configured by a first RAT, a first user terminal 3420 2 configured by the first RAT, and a second user terminal 3030 configured by a second RAT includes a downlink transmission and an uplink transmission.

At the time of the downlink transmission, the relay node 200 distributes the first RAT signal, which has been received through the first backhaul network interface 3442 from the first base station 3410, and then forwards one first RAT signal among the two first RAT signals obtained by the distribution to the first user terminal 3420 through the first access network interface 3446. Then, the relay node 200 converts the other first RAT signal among the two first RAT signals obtained by the distribution into a second RAT signal, and then forwards the second RAT signal obtained by the conversion through the second access network interface 3448 to the second user terminal 3430.

To this end, the matching unit 3444 of the relay node 200 distributes the first RAT signal provided by the first backhaul network interface 3442, and then converts one first RAT signal among the two first RAT signals obtained by the distribution into a second RAT signal in order to transfer the second RAT signal to the second access network interface 3430.

At the time of the uplink transmission, the relay node 200 converts a second RAT signal, which has been received through the second access network interface 3448 from the second user terminal 3430, to a first RAT signal. The relay node 200 combines the first RAT signal obtained by the conversion with a first RAT signal which has been received through the first access network interface 3446 from the first user terminal 3420.

The relay node 200 forwards the signal obtained by the combination through the first backhaul network interface 3442 to the first base station 3410.

To this end, the matching unit 3444 converts the second RAT signal provided by the second access network interface 3448 into a first RAT signal, combines the converted first RAT signal with a first RAT signal provided by the first access network interface 3446, and then transfers the signal obtained through the combination to the first backhaul network interface 3442. The reason why the second RAT signal provided by the second access network interface 3448 is converted into the first RAT signal is that the first base station 3410 is configured by the first RAT.

Figure 35:
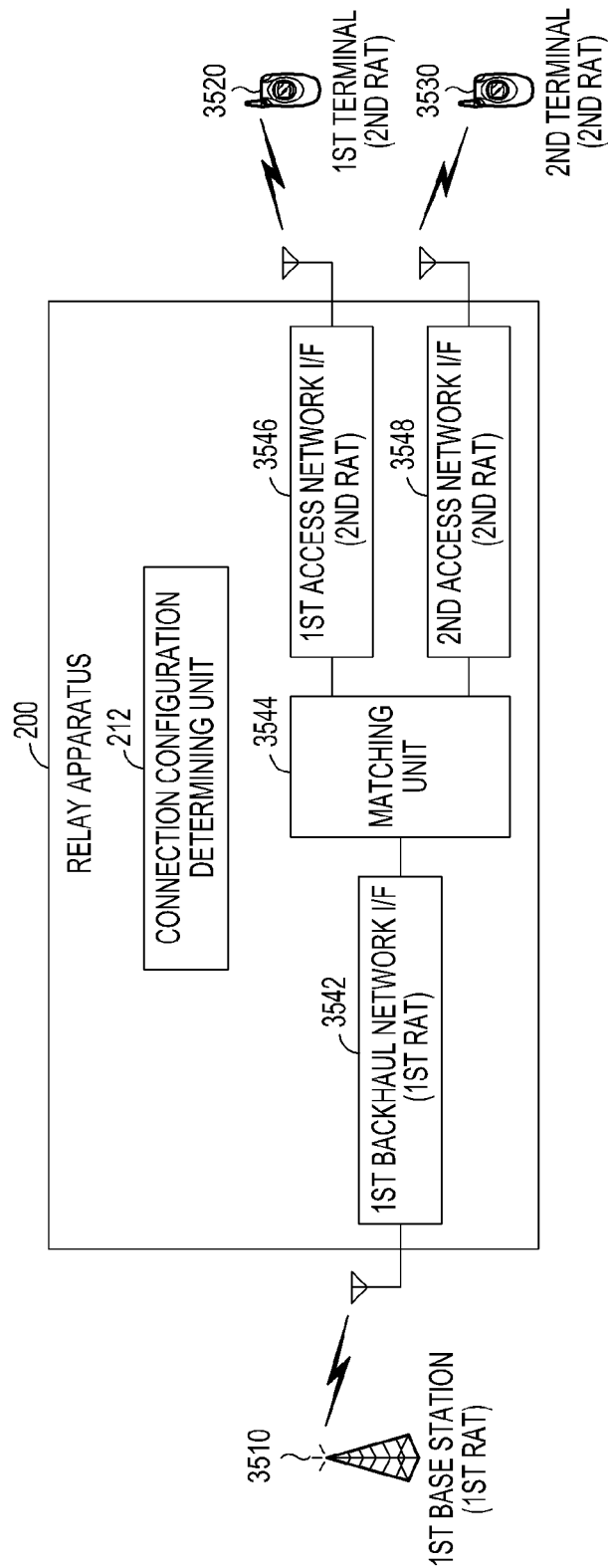
FIG. 35 illustrates another example of a relay structure interconnecting two base stations and one user terminal through an indirect access link according to an embodiment of the present invention.

FIG. 35 illustrates another example of a relay structure interconnecting one base station and two user terminals through an indirect access link according to an embodiment of the present invention. Especially, the example illustrated in FIG. 35 is based on a case where one backhaul network interface is connected to one base station through one antenna and two access network interfaces are connected to different user terminals individually through one antenna. Further, the example illustrated in FIG. 35 is based on a case where the two access network interfaces are configured by the same RAT and the backhaul network interface and the two access network interfaces are configured by different RATs.

Referring to FIG. 35, relaying between a first base station 3510 configured by a first RAT, a first user terminal 3520 2 configured by a second RAT, and a second user terminal 3530 configured by the second RAT includes a downlink transmission and an uplink transmission.

At the time of the downlink transmission, the relay node converts a first RAT signal, which has been received through the first backhaul network interface 3542 from the first base station 3510, into a second RAT signal, and then distributes the converted second RAT signal into two second RAT signals. Of course, the relay node 200 may first distribute the first RAT signal received through the first backhaul network interface 3542 into two first RAT signals and then convert each of the distributed two first RAT signals into a second RAT signal.

The relay node 200 forwards one second RAT signal among the two second RAT signals obtained by the distribution or conversion through the first access network interface 3546 to the first user terminal 3520 and forwards the other second RAT signal through the second access network interface 3548 to the second user terminal 3530.

To this end, the matching unit 3544 of the relay node 200 performs distribution and conversion in order to obtain two second RAT signals from the first RAT signal provided by the first backhaul network interface 3542.

At the time of the uplink transmission, the relay node 200 combines a second RAT signal, which has been received through a first access network interface 3546 from the first user terminal 3520, and a second RAT signal, which has been received through a second access network interface 3548 from the second user terminal 3530, and then converts the signal obtained by the combination into a first RAT signal. Of course, the relay node 200 may convert a second RAT signal received through the first access network interface 3546 into a first RAT signal and convert a second RAT signal received through the second access network interface 3548 into a first RAT signal, and then combine the converted two first RAT signals.

The relay node 200 forwards the signal obtained by the combination or conversion through the first backhaul network interface 3542 to the first base station 3510.

To this end, the matching unit 3544 of the relay node 200 performs an operation to convert the second RAT signal provided by each of the first and second access network interfaces 3546 and 3548 into a first RAT signal or to combine them.

Figure 36:
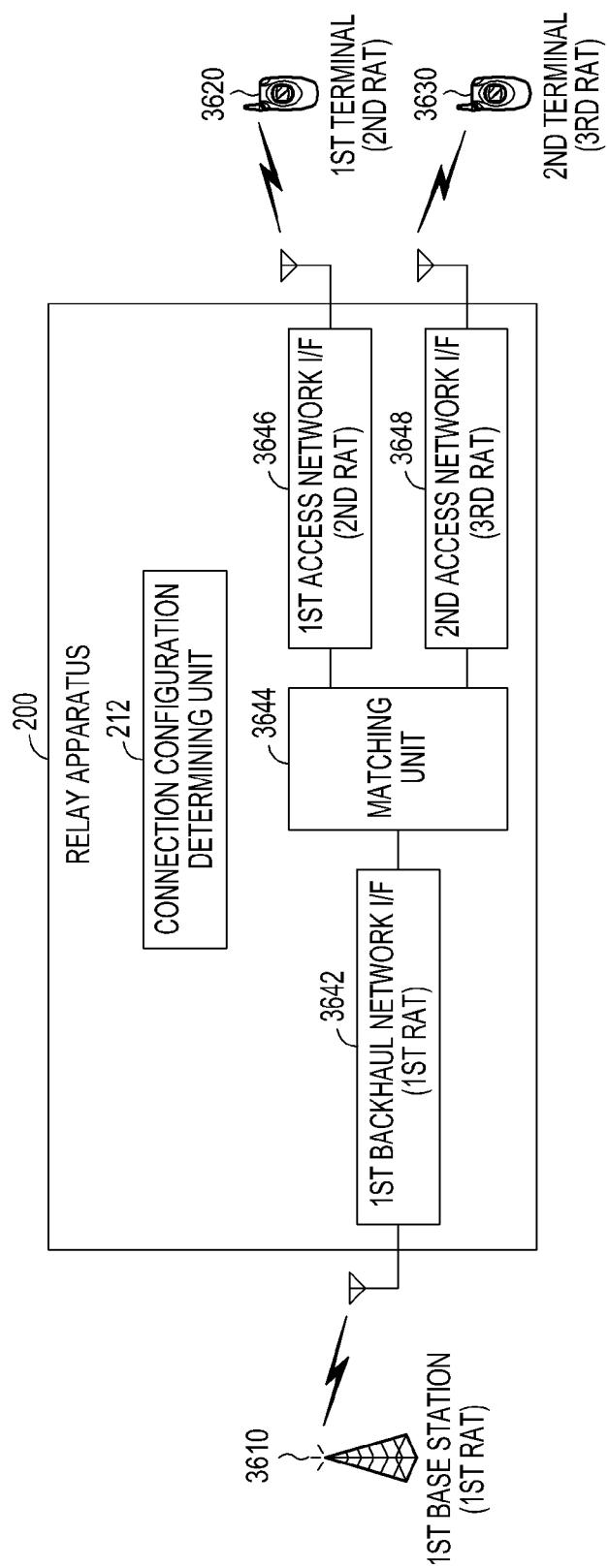
FIG. 36 illustrates another example of a relay structure interconnecting two base stations and one user terminal through an indirect access link according to an embodiment of the present invention.

FIG. 36 illustrates another example of a relay structure interconnecting one base station and two user terminals through an indirect access link according to an embodiment of the present invention. Especially, the example illustrated in FIG. 36 is based on a case where one backhaul network interface is connected to one base station through one antenna and two access network interfaces are connected to different user terminals individually through one antenna. Further, the example illustrated in FIG. 36 is limited to a case where the backhaul network interface and the two single access network interfaces are configured by different RATs.

Referring to FIG. 36, relaying from the first base station 3610 to the first user terminal 3620 and the second user terminal 3630 includes a downlink transmission and an uplink transmission.

At the time of the downlink transmission, the relay node 200 distributes the first RAT signal, which has been received through the backhaul network interface 3642 from the first base station 3610, into two first RAT signals, converts one of the distributed two first RAT signals into a second RAT signal, and converts the other first RAT signal into a third RAT signal.

The relay node 200 forwards the second RAT signal obtained by the conversion through the first access network interface 3646 to the first user terminal 3620 and forwards the third RAT signal obtained by the conversion through the second access network interface 3648 to the second user terminal 3630.

To this end, the matching unit 3644 of the relay node 200 performs distribution and conversion in order to obtain one second RAT signal and one third RAT signal from the first RAT signal provided by the first backhaul network interface 3642.

At the time of the uplink transmission, the relay node 200 converts each of a second RAT signal, which has been received through the first access network interface 3646 from the first user terminal 3620, and a third RAT signal, which has been received through the second access network interface 3648 from the second user terminal 3630, into a first RAT signal, and then combines the converted first RAT signals. Of course, the relay node 200 may convert the second RAT signal received through the first access network interface 3620 into a first RAT signal and convert the third RAT signal received through the second access network interface 3648 into a first RAT signal, and then combine the converted two first RAT signals.

The relay node 200 forwards the signal obtained by the combination or conversion through the first backhaul network interface 3642 to the first base station 3610.

To this end, the matching unit 3644 performs an operation to convert the second RAT signal and the third RAT signal respectively provided by the first and second access network interfaces 3646 and 3648 into first RAT signals or to combine them.

Figure 37:
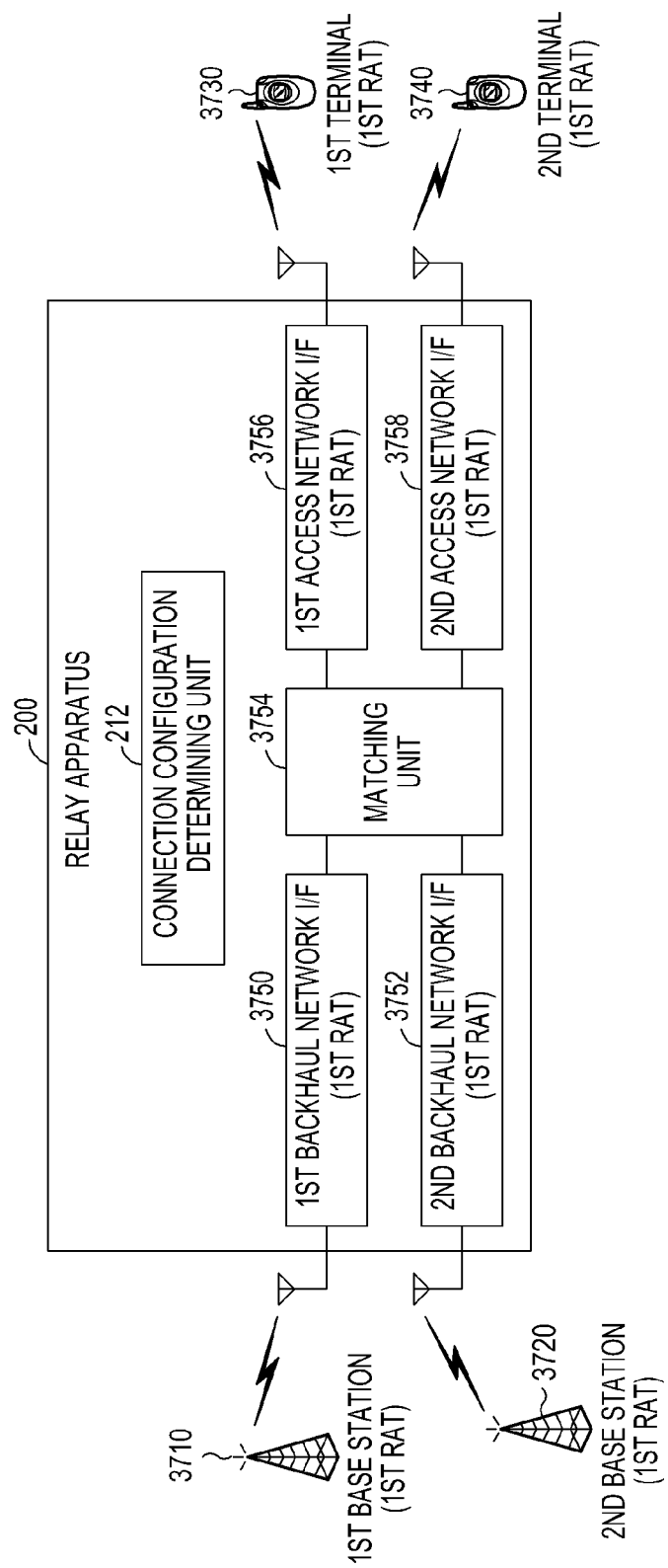
FIG. 37 illustrates an example of a relay structure interconnecting two base stations and two user terminals through an indirect access link according to an embodiment of the present invention.

FIG. 37 illustrates an example of a relay structure interconnecting two base stations and two user terminals through an indirect access link according to an embodiment of the present invention. Especially, the example illustrated in FIG. 37 is based on a case where two backhaul network interfaces are connected to different base stations individually through one antenna, and two access network interfaces are connected to different user terminals individually through one antenna. Further, the example illustrated in FIG. 29 is limited to a case where the two backhaul network interfaces and the two access network interfaces are configured by the same RAT.

Referring to FIG. 37, relaying between a first base station 3710 and a second base station 3720 configured by a first RAT and a first user terminal 3730 and a second user terminal 3740 configured by the first RAT includes a downlink transmission and an uplink transmission.

At the time of the downlink transmission, the relay node 200 combines a first RAT signal, which has been received through a first backhaul network interface 3750 from the first base station 3710, and a first RAT signal, which has been received through a second backhaul network interface 3752 from the second base station 3720. The relay node 200 distributes the combined signal into two first RAT signals, and forwards one first RAT signal among the distributed two first RAT signals through the first access network interface 3756 to the first user terminal 3730. The relay node 200 forwards the other first RAT signal among the distributed two first RAT signals through the second access network interface 3758 to the second user terminal 3740.

To this end, the matching unit 3754 of the relay node 200 combines and distributes the first RAT signals provided by the first backhaul network interface 3750 and the second backhaul network interface 3752 without RAT conversion and then transfers the distributed first RAT signals to the first and second access network interfaces 3756 and 3758.

At the time of the uplink transmission, the relay node 200 combines a first RAT signal, which has been received through a first access network interface 3756 from the first user terminal 3730, and a first RAT signal, which has been received through a second access network interface 3758 from the second user terminal 3740. The relay node 200 distributes the combined signal into two first RAT signals, and then forwards one first RAT signal among the distributed two first RAT signals through the first backhaul network interface 3750 to the first base station 3710. The relay node 200 forwards the other first RAT signal among the distributed two first RAT signals through the second backhaul network interface 3752 to the second base station 3720.

To this end, the matching unit 3754 combines and distributes the first RAT signals provided by the first access network interface 3756 and the second access network interface 3758 without RAT conversion and then transfers the signals obtained through the combination and distribution to the first and second backhaul network interfaces 3750 and 3752.

As another example, the received RAT signal may be forwarded without being combined and converted by the matching unit 3754.

For example, at the time of the downlink transmission, the relay node 200 forwards a first RAT signal, which has been received through the first backhaul network interface 3750 from the first base station 3710, to the first user terminal 3730 through the first access network interface 3756. The relay node 200 forwards a first RAT signal, which has been received through the second backhaul network interface 3752 from the second base station 3720, to the second user terminal 3740 through the second access network interface 3758. In this event, the received RAT signal is not required to be converted.

At the time of the uplink transmission, the relay node 200 forwards a first RAT signal, which has been received through the first access network interface 3756 from the first user terminal 3730, to the first base station 3710 through the first backhaul network interface 3750. The relay node 200 forwards a first RAT signal, which has been received through the second access network interface 3758 from the second user terminal 3740, to the second base station 3720 through the second backhaul network interface 3752. In this event also, the received RAT signal is not required to be converted.

Figure 38:
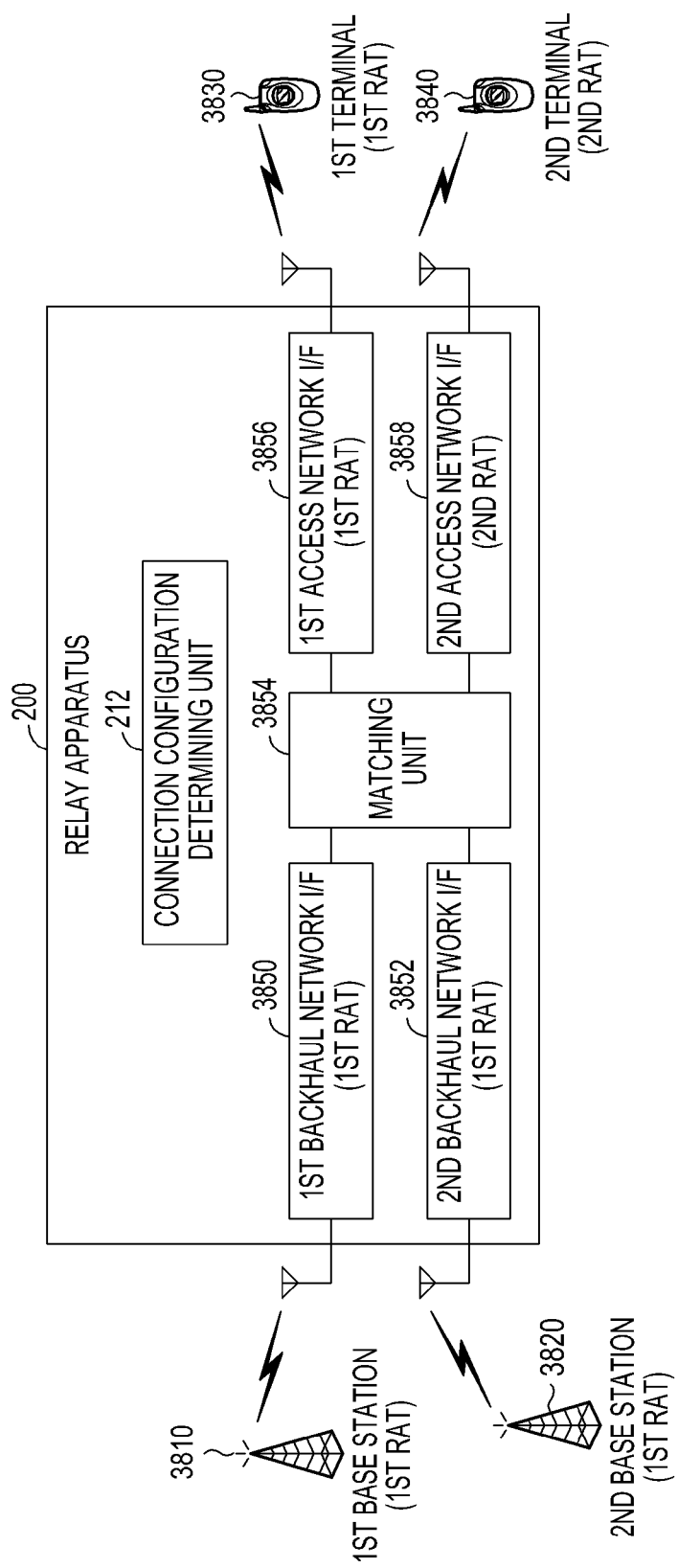
FIG. 38 illustrates another example of a relay structure interconnecting two base stations and two user terminals through an indirect access link according to an embodiment of the present invention.

FIG. 38 illustrates another example of a relay structure interconnecting two base stations and two user terminals through an indirect access link according to an embodiment of the present invention. Especially, the example illustrated in FIG. 38 is based on a case where two backhaul network interfaces are connected to different base stations individually through one antenna, and two access network interfaces are connected to different user terminals individually through one antenna. Further, the example illustrated in FIG. 38 is based on a case where the two backhaul network interfaces and one of the two access network interfaces are configured by the same RAT and the other of the two access network interfaces is configured by a different RAT.

Referring to FIG. 38, relaying between a first base station 3810 and a second base station 3820 configured by a first RAT, a first user terminal 3830 configured by the first RAT, and a second user terminal 3840 configured by a second RAT includes a downlink transmission and an uplink transmission.

At the time of the downlink transmission, the relay node 200 combines a first RAT signal, which has been received through a first backhaul network interface 3850 from the first base station 3810, and a first RAT signal, which has been received through a second backhaul network interface 3852 from the second base station 3820.

The relay node 200 distributes the combined signal into two first RAT signals, and forwards one first RAT signal among the distributed two first RAT signals through the first access network interface 3856 to the first user terminal 3830. Then, the relay node converts the other first RAT signal among the two first RAT signals obtained by the distribution into a second RAT signal, and then forwards the second RAT signal obtained by the conversion through the second access network interface 3858 to the second user terminal 3840.

To this end, the matching unit 3854 of the relay node 200 combines and distributes the first RAT signals provided by the first backhaul network interface 3850 and the second backhaul network interface 3852, and converts only one of the two first RAT signals obtained by the distribution into a second RAT signal without converting the other first RAT signal.

At the time of the uplink transmission, the relay node 200 converts a second RAT signal, which has been received through the second access network interface 3858 from the second user terminal 3840, to a first RAT signal. The relay node 200 combines the first RAT signal obtained by the conversion with a first RAT signal which has been received through the first access network interface 3856 from the first user terminal 3830. Then, the relay node 200 distributes the first RAT signal obtained through the combination into two first RAT signals, and then forwards one first RAT signal among the two first RAT signals obtained by the distribution through the first backhaul network interface 3850 to the first base station 3810. The relay node 200 forwards the other first RAT signal among the two first RAT signals obtained by the distribution through the second backhaul network interface 3852 to the second base station 3820.

As another example, one-to-one relaying may be performed between the base station and the user terminal.

For example, at the time of the downlink transmission, the relay node 200 forwards a first RAT signal, which has been received through the first backhaul network interface 3850 from the first base station 3810, to the first user terminal 3830 through the first access network interface 3856 without RAT conversion. The relay node 200 converts a first RAT signal, which has been received through the second backhaul network interface 3852 from the second base station 3820, into a second RAT signal, and then forwards the converted second RAT signal to the second user terminal 3840 through the second access network interface 3858.

At the time of the uplink transmission, the relay node 200 forwards a first RAT signal, which has been received through the first access network interface 3856 from the first user terminal 3830, to the first base station 3810 through the first backhaul network interface 3850. The relay node 200 converts a second RAT signal, which has been received through the second access network interface 3858 from the second user terminal 3840, into a first RAT signal, and then forwards the converted first RAT signal to the second user terminal 3820 through the second backhaul network interface 3852.

Figure 39:
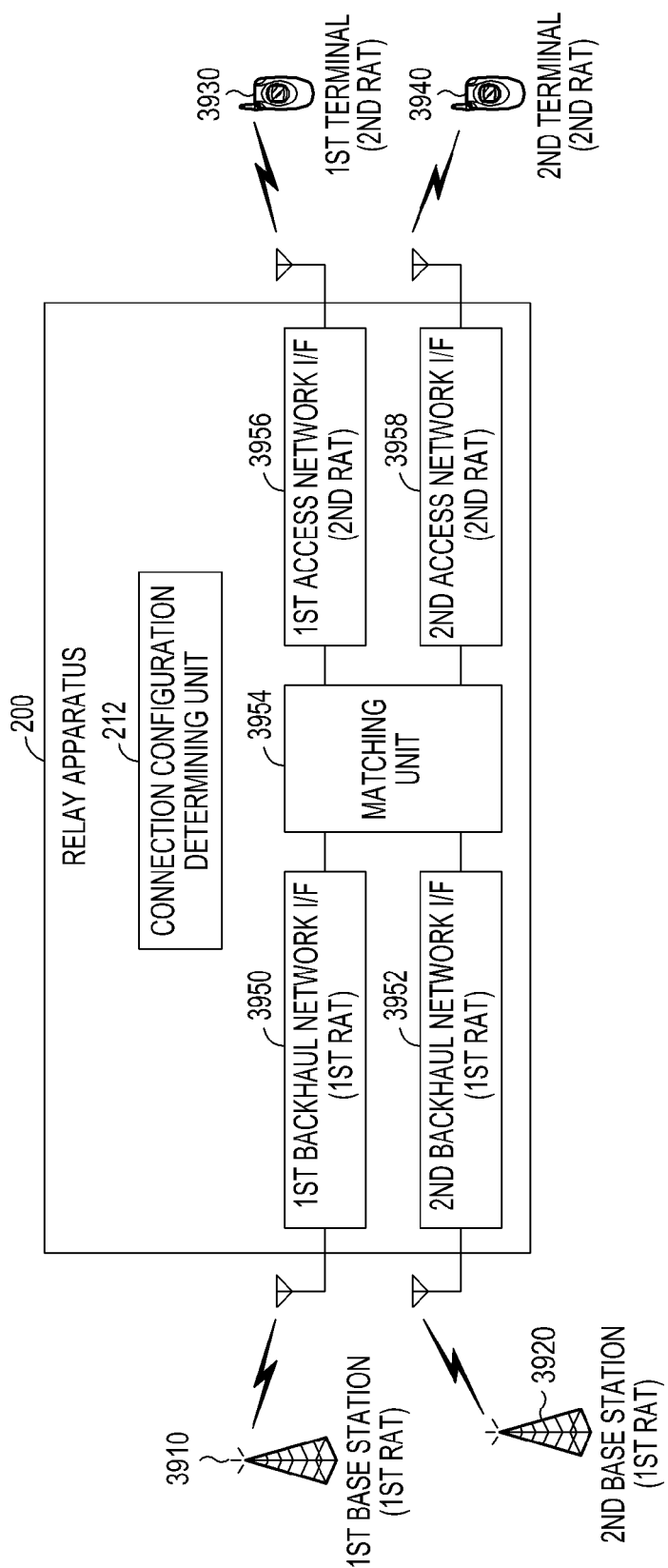
FIG. 39 illustrates another example of a relay structure interconnecting two base stations and one user terminal through an indirect access link according to an embodiment of the present invention.

FIG. 39 illustrates another example of a relay structure interconnecting two base stations and two user terminals through an indirect access link according to an embodiment of the present invention. Especially, the example illustrated in FIG. 39 is based on a case where two backhaul network interfaces are connected to different base stations individually through one antenna, and two access network interfaces are connected to different user terminals individually through one antenna. Further, the example illustrated in FIG. 39 is based on a case where the two backhaul network interfaces are configured by the same RAT, the two access network interfaces are configured by the same RAT, and the backhaul network interface and the access network interface are configured by different RATs.

Referring to FIG. 39, relaying between a first base station 3910 and a second base station 3910 configured by a first RAT and a first user terminal 3930 and a second user terminal 3940 configured by a second RAT includes a downlink transmission and an uplink transmission.

At the time of the downlink transmission, the relay node 200 combines a first RAT signal, which has been received through a first backhaul network interface 3950 from the first base station 3910, and a first RAT signal, which has been received through a second backhaul network interface 3952 from the second base station 3920, and then distributes the combined signal into two first RAT signals. The relay node 200 converts the two first RAT signals obtained by the distribution into second RAT signals, respectively. The relay node 200 forwards one signal among the two second RAT signals obtained by the conversion through the first access network interface 3956 to the first user terminal 3930 and forwards the other signal among the two second RAT signals through the second access network interface 3958 to the second user terminal 3940.

At the time of the uplink transmission, the relay node 200 combines a second RAT signal, which has been received through the first access network interface 3956 from the first user terminal 3930, and a second RAT signal, which has been received through the second access network interface 3958 from the second user terminal 3940, and then distributes the combined signal into two second RAT signals. The relay node 200 converts the two second RAT signals obtained by the distribution into first RAT signals, respectively. The relay node 200 forwards one first RAT signal among the two first RAT signals obtained by the conversion through the first backhaul network interface 3950 to the first base station 3910 and forwards the other first RAT signal among the two first RAT signals obtained by the conversion through the second backhaul network interface 3952 to the second base station 3920.

As another example, one-to-one relaying may be performed between the base station and the user terminal.

For example, at the time of the downlink transmission, the relay node 200 forwards a first RAT signal, which has been received through the first backhaul network interface 3950 from the first base station 3910, to the first user terminal 3930 through the first access network interface 3956. The relay node 200 converts a first RAT signal, which has been received through the second backhaul network interface 3952 from the second base station 3920, into a second RAT signal, and then forwards the converted second RAT signal to the second user terminal 3940 through the second access network interface 3958.

At the time of the uplink transmission, the relay node 200 forwards a second RAT signal, which has been received through the first access network interface 3956 from the first user terminal 3930, to the first base station 3910 through the first backhaul network interface 3950. The relay node 200 converts a second RAT signal, which has been received through the second access network interface 3958 from the second user terminal 3940, into a first RAT signal, and then forwards the converted first RAT signal to the second user terminal 3920 through the second backhaul network interface 3952.

Figure 40:
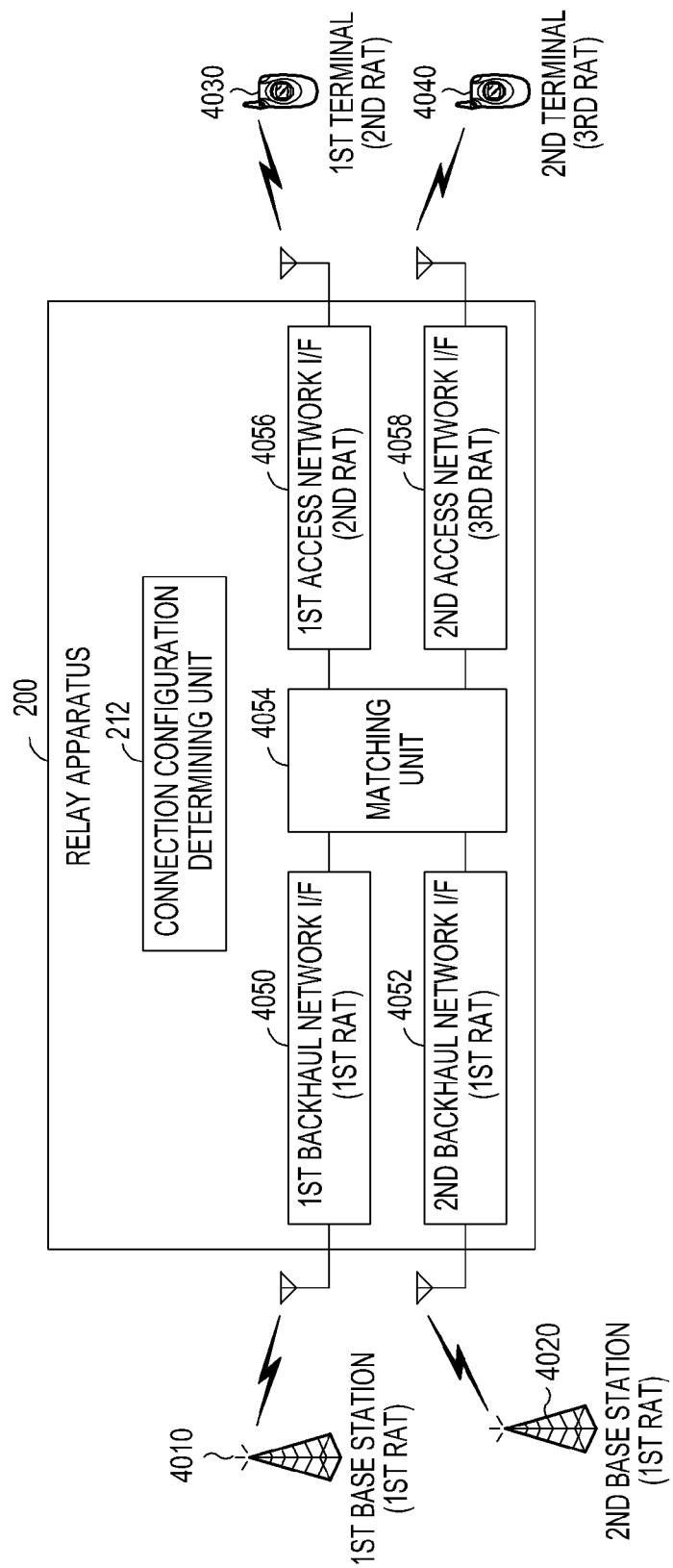
FIG. 40 illustrates another example of a relay structure interconnecting two base stations and one user terminal through an indirect access link according to an embodiment of the present invention.

FIG. 40 illustrates another example of a relay structure interconnecting two base stations and two user terminals through an indirect access link according to an embodiment of the present invention. Especially, the example illustrated in FIG. 40 is based on a case where two backhaul network interfaces are connected to different base stations individually through one antenna, and two access network interfaces are connected to different user terminals individually through one antenna. Further, the example illustrated in FIG. 40 is based on a case where the two backhaul network interfaces are configured by the same RAT, the two access network interfaces are configured by different RATs, and the two backhaul network interfaces and the two access network interfaces are configured by different RATs.

Referring to FIG. 40, relaying between a first base station 4010 and a second base station 4020 configured by a first RAT, a first user terminal 4030 configured by a second RAT, and a second user terminal 4040 configured by a third RAT includes a downlink transmission and an uplink transmission.

At the time of the downlink transmission, the relay node 200 combines a first RAT signal, which has been received through a first backhaul network interface 4050 from the first base station 4010, and a first RAT signal, which has been received through a second backhaul network interface 4052 from the second base station 4020, and then distributes the combined signal into two first RAT signals. The relay node 200 converts one first RAT signal among the two first RAT signals obtained by the distribution into a second RAT signal, and forwards the converted second RAT signal through the first access network interface 4056 to the first user terminal 4030. The relay node 200 converts the other first RAT signal among the two first RAT signals obtained by the distribution into a third RAT signal, and forwards the converted third RAT signal through the second access network interface 4058 to the second user terminal 4040.

At the time of the uplink transmission, the relay node 200 converts a second RAT signal, which has been received through the first access network interface 4056 from the first user terminal 4030, into a first RAT signal, and converts a third RAT signal, which has been received through the second access network interface 4058 from the second user terminal 4040, into a first RAT signal. The relay node 200 combines the two first RAT signals obtained by the conversion to generate one first RAT signal, and then distributes the generated first RAT signal back into two first RAT signals.

Then, the relay node 200 forwards one first RAT signal among the distributed two first RAT signals through the first backhaul network interface 4050 to the first base station 4010. The relay node 200 forwards the other first RAT signal among the two first RAT signals obtained by the distribution through the second backhaul network interface 4052 to the second base station 4020.

As another example, one-to-one relaying may be performed between the base station and the user terminal.

For example, at the time of the downlink transmission, the relay node 200 converts a first RAT signal, which has been received through the first backhaul network interface 4050 from the first base station 4010, into a second RAT signal, and then forwards the converted second RAT signal to the first user terminal 4030 through the first access network interface 4056. The relay node 200 converts a first RAT signal, which has been received through the second backhaul network interface 4052 from the second base station 4020, into a third RAT signal, and then forwards the converted third RAT signal to the second user terminal 4040 through the second access network interface 4058.

At the time of the uplink transmission, the relay node 200 forwards a second RAT signal, which has been received through the first access network interface 4056 from the first user terminal 4030, to the first base station 4010 through the first backhaul network interface 4050. The relay node 200 converts a third RAT signal, which has been received through the second access network interface 4058 from the second user terminal 4040, into a first RAT signal, and then forwards the converted first RAT signal to the second user terminal 4020 through the second backhaul network interface 4052.

Figure 41:
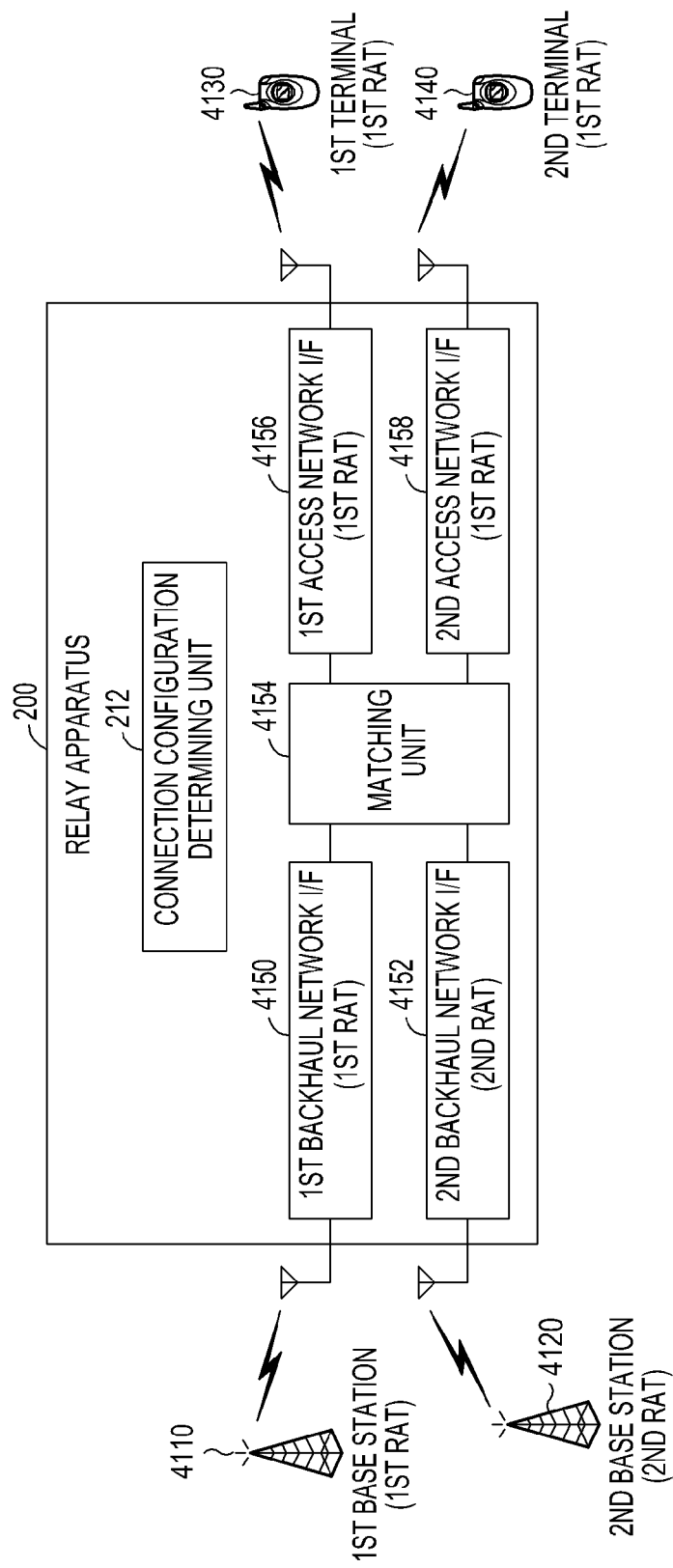
FIG. 41 illustrates another example of a relay structure interconnecting two base stations and one user terminal through an indirect access link according to an embodiment of the present invention.

FIG. 41 illustrates another example of a relay structure interconnecting two base stations and two user terminals through an indirect access link according to an embodiment of the present invention. Especially, the example illustrated in FIG. 41 is based on a case where two backhaul network interfaces are connected to different base stations individually through one antenna, and two access network interfaces are connected to different user terminals individually through one antenna. Further, the example illustrated in FIG. 41 is based on a case where the two backhaul network interfaces are configured by different RATs, the two access network interfaces are configured by the same RAT, and the two access network interfaces and one of the two backhaul network interfaces are configured by the same RAT.

Referring to FIG. 41, relaying between a first base station 4110 configured by a first RAT, a second base station 4120 configured by a second RAT, and a first user terminal 4130 and a second user terminal 4140 configured by the first RAT includes a downlink transmission and an uplink transmission.

At the time of the downlink transmission, the relay node 200 converts a second RAT signal, which has been received through the second backhaul network interface 4152 from the second base station, to a first RAT signal. The relay node 200 combines the converted first RAT signal with the first RAT signal, which has been received through the first backhaul network interface 4150 from the first base station 4110, and distributes the first RAT signal obtained by the combination into two first RAT signals. Then, the relay node 200 forwards one first RAT signal among the two first RAT signals obtained by the distribution through the first access network interface 4156 to the first base station 4130. The relay node 200 forwards the other first RAT signal among the two first RAT signals obtained by the distribution through the second access network interface 4158 to the second user terminal 4140.

At the time of the uplink transmission, the relay node 200 combines a first RAT signal, which has been received through the first access network interface 4156 from the first user terminal 4130, and a first RAT signal, which has been received through the second access network interface 4158 from the second user terminal 4140, and then distributes the first RAT signal obtained by the combination into two first RAT signals. The relay node 200 forwards one first RAT signal among the distributed two first RAT signals through the first backhaul network interface 4150 to the first base station 4110 without RAT conversion. The relay node 200 forwards the other first RAT signal among the two first RAT signals obtained by the distribution through the second backhaul network interface 4152 to the second base station 4120.

As another example, one-to-one relaying may be performed between the base station and the user terminal.

For example, at the time of the downlink transmission, the relay node 200 forwards a first RAT signal, which has been received through the first backhaul network interface 4150 from the first base station 4110, to the first user terminal 4130 through the first access network interface 4156 without RAT conversion. The relay node 200 converts a second RAT signal, which has been received through the second backhaul network interface 4152 from the second base station 4120, into a first RAT signal, and then forwards the converted first RAT signal to the second user terminal 4140 through the second access network interface 4158.

At the time of the uplink transmission, the relay node 200 forwards a first RAT signal, which has been received through the first access network interface 4156 from the first user terminal 4130, to the first base station 4110 through the first backhaul network interface 4150. The relay node 200 converts a first RAT signal, which has been received through the second access network interface 4158 from the second user terminal 4140, into a second RAT signal, and then forwards the converted second RAT signal to the second base station 4120 through the second backhaul network interface 4152.

Figure 42:
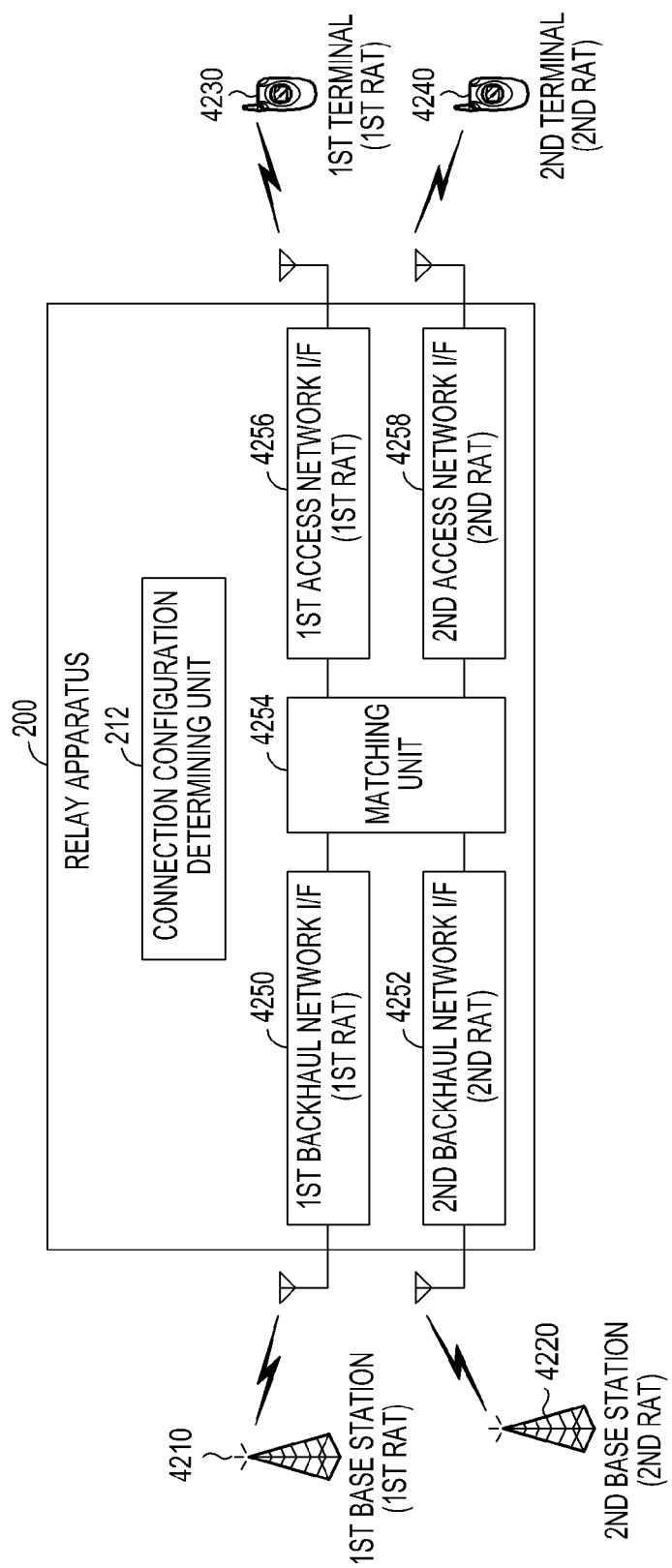
FIG. 42 illustrates another example of a relay structure interconnecting two base stations and one user terminal through an indirect access link according to an embodiment of the present invention.

FIG. 42 illustrates another example of a relay structure interconnecting two base stations and two user terminals through an indirect access link according to an embodiment of the present invention. Especially, the example illustrated in FIG. 42 is based on a case where two backhaul network interfaces are connected to different base stations individually through one antenna, and two access network interfaces are connected to different user terminals individually through one antenna. Further, the example illustrated in FIG. 42 is based on a case where the two backhaul network interfaces are configured by different RATs, the two access network interfaces are configured by different RATs, and the two RATs of the two backhaul network interfaces are the same as the two RATs of the two access network interfaces, respectively.

Referring to FIG. 42, relaying between a first base station 4210 configured by a first RAT, a second base station 4220 configured by a second RAT, a first user terminal 4230 configured by the first RAT, and a second user terminal 4240 configured by the second RAT includes a downlink transmission and an uplink transmission.

At the time of the downlink transmission, the relay node 200 converts a second RAT signal, which has been received through the second backhaul network interface 4252 from the second base station 4220, to a first RAT signal. The relay node 200 combines the converted first RAT signal with a first RAT signal, which has been received through the first backhaul network interface 4250 from the first base station 4210, and then distributes the first RAT signal obtained by the combination into two first RAT signals.

The relay node 200 forwards one first RAT signal among the distributed two first RAT signals through the first access network interface 5256 to the first base station 4230 without RAT conversion. The relay node 200 converts the other first RAT signal among the two first RAT signals obtained by the distribution into a second RAT signal, and forwards the converted second RAT signal through the second access network interface 4258 to the second user terminal 4240.

At the time of the uplink transmission, the relay node 200 converts a second RAT signal, which has been received through the second access network interface 4258 from the second user terminal 4240, to a first RAT signal. The relay node 200 combines the converted first RAT signal with a first RAT signal, which has been received through the first access network interface 4256 from the first user terminal 4230, and then distributes the first RAT signal obtained by the combination into two first RAT signals.

The relay node 200 forwards one first RAT signal among the distributed two first RAT signals through the first backhaul network interface 4250 to the first base station 4210 without RAT conversion. Then, the relay node 200 converts one first RAT signal among the distributed two first RAT signals into a second RAT signal, and then forwards the converted second RAT signal through the second backhaul network interface 4252 to the second base station 4220.

At the time of the uplink transmission, the present invention proposes conversion of a second RAT signal received from the second user terminal 4240 into a first RAT signal. However, it is also possible to convert a first RAT signal received from the first user terminal 4230 into a second RAT signal.

As another example, one-to-one relaying may be performed between the base station and the user terminal.

For example, at the time of the downlink transmission, the relay node 200 forwards a first RAT signal, which has been received through the first backhaul network interface 4250 from the first base station 4210, to the first user terminal 4230 through the first access network interface 4256 without RAT conversion. The relay node 200 forwards a second RAT signal, which has been received through the second backhaul network interface 4252 from the second base station 4220, to the second user terminal 4240 through the second access network interface 4258 without RAT conversion.

At the time of the uplink transmission, the relay node 200 forwards a first RAT signal, which has been received through the first access network interface 4256 from the first user terminal 4230, to the first base station 4210 through the first backhaul network interface 4250. The relay node 200 forwards a second RAT signal, which has been received through the second access network interface 4258 from the second base station 4240, to the second base station 4220 through the second backhaul network interface 4252 without RAT conversion.

Figure 43:
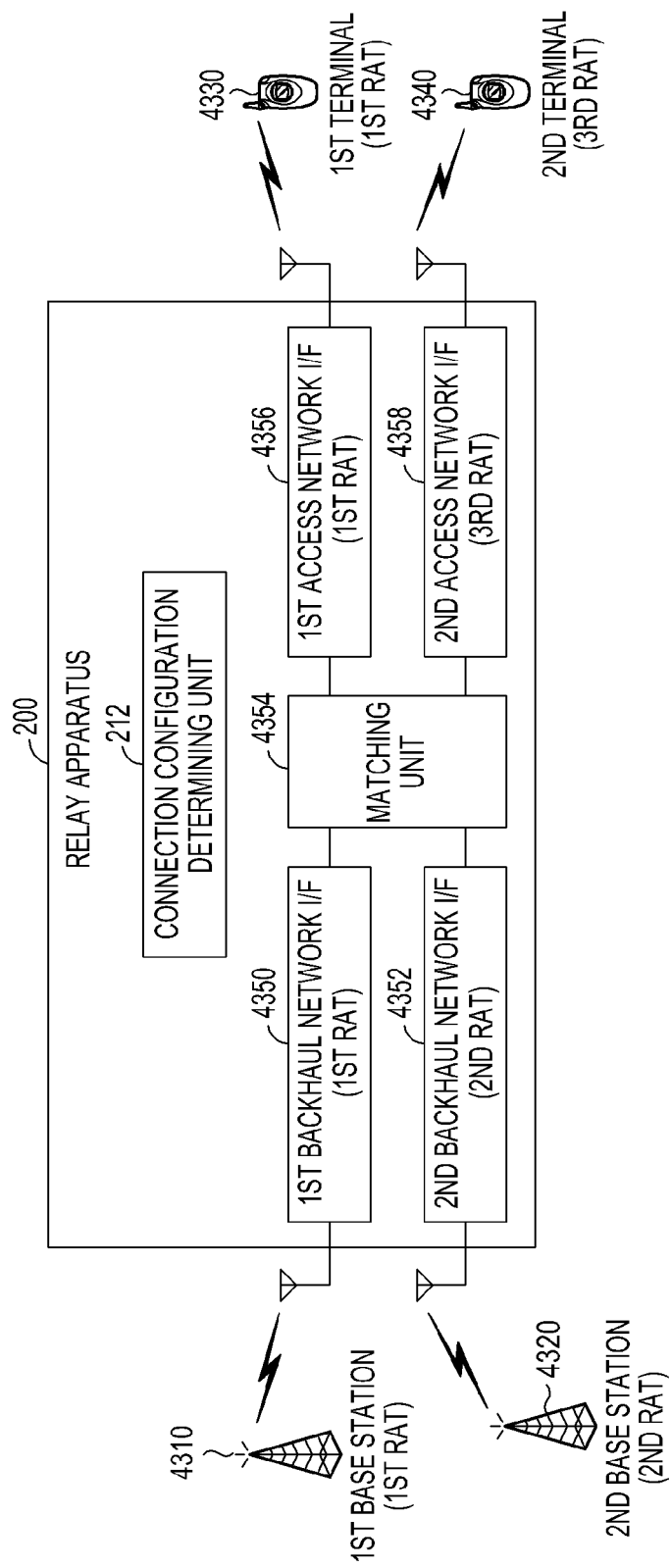
FIG. 43 illustrates another example of a relay structure interconnecting two base stations and one user terminal through an indirect access link according to an embodiment of the present invention.

FIG. 43 illustrates another example of a relay structure interconnecting two base stations and two user terminals through an indirect access link according to an embodiment of the present invention. Especially, the example illustrated in FIG. 43 is based on a case where two backhaul network interfaces are connected to different base stations individually through one antenna, and two access network interfaces are connected to different user terminals individually through one antenna. Further, the example illustrated in FIG. 42 is based on a case where the two backhaul network interfaces are configured by different RATs, the two access network interfaces are configured by different RATs, and only one of the two backhaul network interfaces and only one of the two access network interfaces are configured by the same RAT.

Referring to FIG. 43, relaying between a first base station 4310 configured by a first RAT, a second base station 4320 configured by a second RAT, a first user terminal 4330 configured by the first RAT, and a second user terminal 4340 configured by a third RAT includes a downlink transmission and an uplink transmission.

At the time of the downlink transmission, the relay node 200 converts a second RAT signal, which has been received through the second backhaul network interface 4352 from the second base station 4320, to a first RAT signal. The relay node 200 combines the converted first RAT signal with a first RAT signal, which has been received through the first backhaul network interface 4350 from the first base station 4310, and then distributes the first RAT signal obtained by the combination into two first RAT signals.

The relay node 200 forwards one first RAT signal among the distributed two first RAT signals through the first access network interface 4356 to the first base station 4330 without RAT conversion. Then, the relay node 200 converts the other first RAT signal among the two first RAT signals obtained by the distribution into a third RAT signal, and then forwards the third RAT signal obtained by the conversion through the second access network interface 4358 to the second user terminal 4340.

At the time of the uplink transmission, the relay node 200 converts a third RAT signal, which has been received through the second access network interface 4358 from the second user terminal 4340, to a first RAT signal. The relay node 200 combines the converted first RAT signal with the first RAT signal, which has been received through the first access network interface 4356 from the first user terminal 4330, and distributes the first RAT signal obtained by the combination into two first RAT signals.

The relay node 200 forwards one first RAT signal among the distributed two first RAT signals through the first backhaul network interface 4350 to the first base station 4310 without RAT conversion. Then, the relay node 200 converts the other first RAT signal among the distributed two first RAT signals into a second RAT signal, and then forwards the converted second RAT signal through the second backhaul network interface 4352 to the second base station 4320.

As another example, one-to-one relaying may be performed between the base station and the user terminal.

For example, at the time of the downlink transmission, the relay node 200 forwards a first RAT signal, which has been received through the first backhaul network interface 4350 from the first base station 4310, to the first user terminal 4330 through the first access network interface 4356 without RAT conversion. The relay node 200 converts a second RAT signal, which has been received through the second backhaul network interface 4352 from the second base station 4320, into a third RAT signal, and then forwards the converted third RAT signal to the second user terminal 4320 through the second access network interface 4358.

At the time of the uplink transmission, the relay node 200 forwards a first RAT signal, which has been received through the first access network interface 4356 from the first user terminal 4330, to the first base station 4310 through the first backhaul network interface 4350. The relay node 200 converts a third RAT signal, which has been received through the second access network interface 4358 from the second user terminal 4340, into a second RAT signal, and then forwards the converted second RAT signal to the second user terminal 4320 through the second backhaul network interface 4352.

Figure 44:
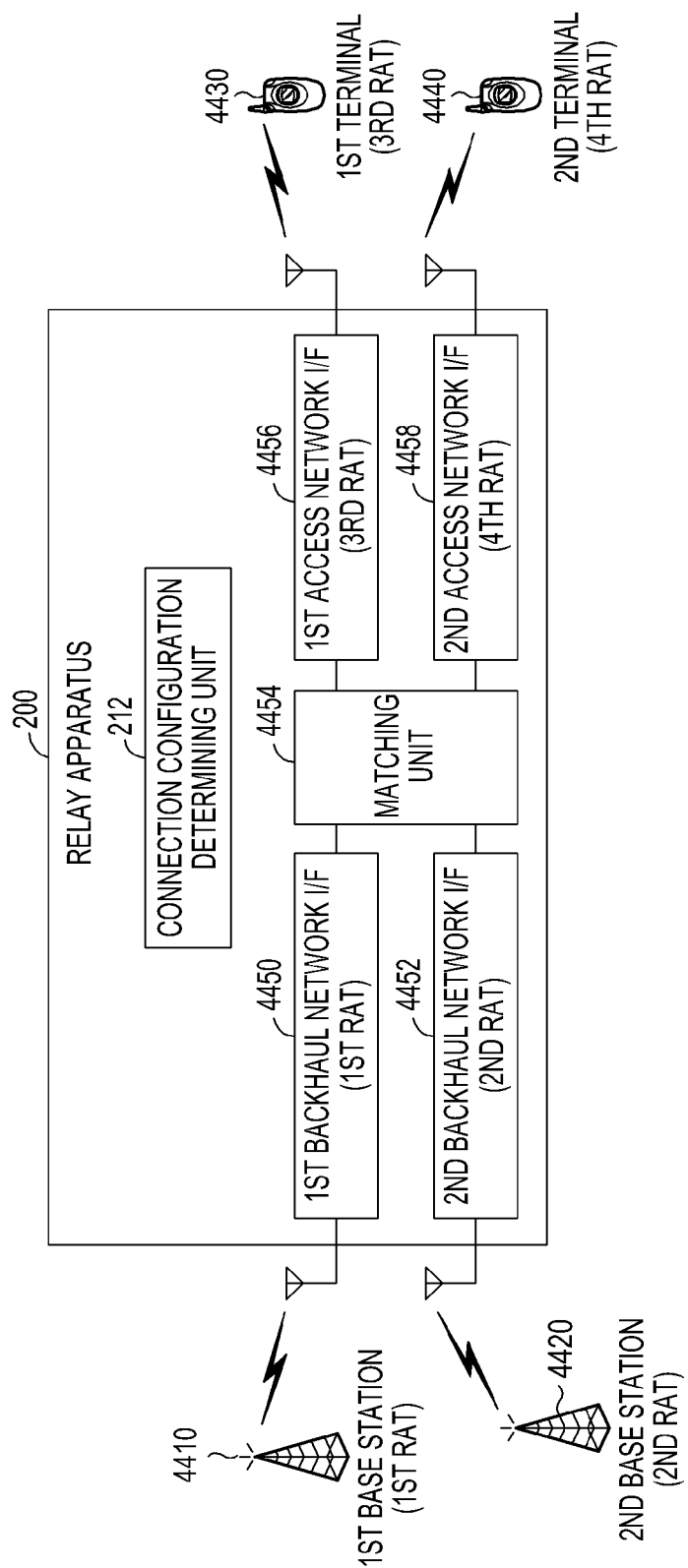
FIG. 44 illustrates another example of a relay structure interconnecting two base stations and one user terminal through an indirect access link according to an embodiment of the present invention.

FIG. 44 illustrates another example of a relay structure interconnecting two base stations and two user terminals through an indirect access link according to an embodiment of the present invention. Especially, the example illustrated in FIG. 44 is based on a case where two backhaul network interfaces are connected to different base stations individually through one antenna, and two access network interfaces are connected to different user terminals individually through one antenna. Further, the example illustrated in FIG. 44 is limited to a case where all of the two backhaul network interfaces and the two access network interfaces are configured by different RATs.

Referring to FIG. 44, relaying between a first base station 4410 configured by a first RAT, a second base station 4420 configured by a second RAT, a first user terminal 4430 configured by a third RAT, and a second user terminal 4440 configured by a fourth RAT includes a downlink transmission and an uplink transmission.

At the time of the downlink transmission, the relay node 200 converts a first RAT signal, which has been received through a first backhaul network interface 4450 from the first base station 4410, into a third RAT signal, and converts a second RAT signal, which has been received through a second backhaul network interface 4452 from the second base station 4420, into a third RAT signal. The relay node 200 combines the two third RAT signals obtained by the conversion, and then distributes a third RAT signal obtained by the combination into two third RAT signals.

The relay node 200 forwards one third RAT signal among the two third RAT signals obtained by the distribution through the first access network interface 4456 to the first base station 4430 without RAT conversion. The relay node 200 converts the other third RAT signal among the two third RAT signals obtained by the distribution into a fourth RAT signal, and then forwards the fourth RAT signal obtained by the conversion through the second access network interface 4458 to the second user terminal 4440.

At the time of the uplink transmission, the present invention proposes conversion of a first RAT signal and a second RAT signal received from the first base station 4410 and the second user terminal 4420 into a third RAT signal. However, it is also possible to convert the first RAT signal and the second RAT signal received from the first base station 4410 and the second user terminal 4420 into a fourth RAT signal.

At the time of the uplink transmission, the relay node 200 converts a third RAT signal, which has been received through the first access network interface 4456 from the first user terminal 4430, into a first RAT signal, and converts a fourth RAT signal, which has been received through the second access network interface 4458 from the second user terminal 4440, into a first RAT signal. The relay node 200 combines the two first RAT signals obtained by the conversion into one first RAT signal, and then distributes the first RAT signal obtained by the combination into two first RAT signals.

Then, the relay node 200 forwards one first RAT signal among the distributed two first RAT signals through the first backhaul network interface 4450 to the first base station 4410. Then, the relay node 200 converts the other first RAT signal among the distributed two first RAT signals into a second RAT signal, and then forwards the converted second RAT signal through the second backhaul network interface 4452 to the second base station 4420.

At the time of the uplink transmission, the present invention proposes conversion of a third RAT signal and a fourth RAT signal received from the first user terminal 4430 and the second user terminal 4440 into a first RAT signal. However, it is also possible to convert the third RAT signal and the fourth RAT signal received from the first user terminal 4430 and the second user terminal 4440 into a second RAT signal.

As another example, one-to-one relaying may be performed between the base station and the user terminal.

For example, at the time of downlink transmission, the relay node 200 converts a first RAT signal, which has been received through the first backhaul network interface 4450 from the second base station 4410, into a third RAT signal, and then forwards the converted third RAT signal to the first user terminal 4430 through the first access network interface 4456. The relay node 200 converts a second RAT signal, which has been received through the second backhaul network interface 4452 from the second base station 4420, into a fourth RAT signal, and then forwards the converted fourth RAT signal to the second user terminal 4440 through the second access network interface 4458.

At the time of uplink transmission, the relay node 200 converts a third RAT signal, which has been received through the first access network interface 4456 from the first user terminal 4430, into a first RAT signal, and then forwards the converted first RAT signal to the first base station 4410 through the first backhaul network interface 4450. The relay node 200 converts a fourth RAT signal, which has been received through the second access network interface 4458 from the second user terminal 4440, into a second RAT signal, and then forwards the converted second RAT signal to the second base station 4420 through the second backhaul network interface 4452.

Based on the scheme described above, it is obvious to one skilled in the art that it is possible to achieve a construction for relaying through matching matrix setting, link matching, etc. under the control of a connection configuration determining unit even in the case where the backhaul network interfaces and the access network interfaces are configured by different RAT configurations in a relay node including a plurality of backhaul network interfaces each having at least one antenna and a plurality of access network interfaces each having at least one antenna.

C-3□ Cooperation Scheme Determining Scheme

A cooperation scheme in a relay network refers to a scheme in which a relay node cooperates for communication between at least one first communication node and at least one second communication node. The cooperation scheme includes a cooperation transmission scheme and a cooperation structure.

The cooperation transmission scheme includes a non-cooperation scheme, a diversity cooperation scheme, and a multiplexing cooperation scheme, and the cooperation structure includes a base station-relay node cooperation structure, a relay node-relay node cooperation structure, and a relay node-user terminal cooperation structure.

First, the cooperation transmission scheme including a non-cooperation scheme, a diversity cooperation scheme, and a multiplexing cooperation scheme will be described.

The non-cooperation scheme refers to a scheme in which a relay node having received a signal from at least one first communication node does not transmit the signal to at least one second communication node.

The diversity cooperation scheme refers to a scheme in which a relay node having received a signal from at least one first communication node forwards the signal to at least one second communication node so as to provide a diversity gain.

The diversity cooperation scheme refers to a scheme in which a relay node having received a signal from at least one first communication node forwards the signal to at least one second communication node so as to provide a diversity gain.

Figure 45:
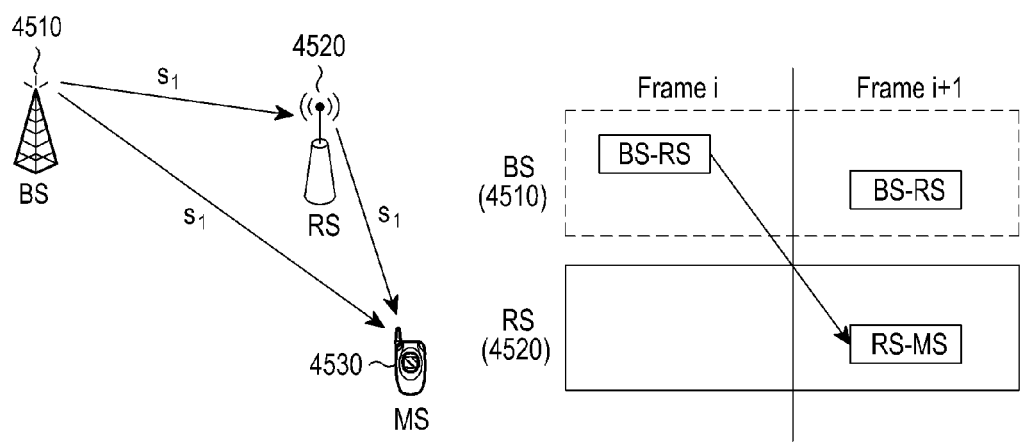
FIG. 45 illustrates an example of a diversity cooperation scheme through base station-relay node cooperation as a cooperation transmission scheme according to an embodiment of the present invention.

FIG. 45 illustrates an example of a diversity cooperation scheme through base station-relay node cooperation as a cooperation transmission scheme according to an embodiment of the present invention.

Referring to FIG. 45, a base station 4510 transmits a signal $s_1$ to a relay node 4520 during an $i^{th}$ frame, and the base station 4510 and the relay node 4520 transmit the same signal $s_1$ to a user terminal 4530 during an $(i+1)^{th}$ frame. As a result, it is possible to achieve a cooperation scheme capable of providing a diversity gain to the user terminal 4530.

Figure 46:
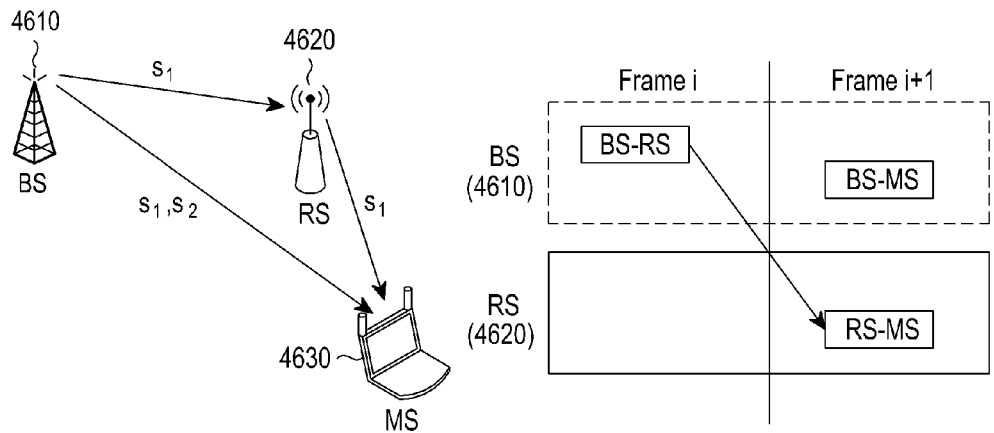
FIG. 46 illustrates an example of a diversity cooperation scheme through base station-relay node cooperation as a cooperation transmission scheme according to an embodiment of the present invention.

FIG. 46 illustrates an example of a multiplexing cooperation scheme through base station-relay node cooperation as a cooperation transmission scheme according to an embodiment of the present invention.

Referring to FIG. 46, a base station 4610 transmits a signal $s_1$ to a relay node 4620 during an $i^{th}$ frame. During an $(i+1)^{th}$ frame, the base station 4610 transmits a signal $s_2$ to a user terminal 4630 and the relay node 4620 transmits the signal $s_1$ to the user terminal 4630. As a result, it is possible to achieve a cooperation scheme capable of providing a multiplexing gain to the user terminal 4630.

Next, the cooperation structure including a base station-relay node cooperation structure, a relay node-relay node cooperation structure, and a relay node-user terminal cooperation structure will be discussed.

The base station-relay node cooperation structure refers to a structure in which a relay node forwards, in cooperation with a base station, a signal to a user terminal.

The relay node-relay node cooperation structure refers to a structure in which a relay node forwards, in cooperation with another relay node, a signal to a base station or a user terminal.

The relay node-user terminal cooperation structure refers to a structure in which a relay node forwards, in cooperation with a user terminal, a signal to a base station.

FIGS. 45 and 46 described above illustrate examples of a base station-relay node cooperation structure as a cooperation structure according to an embodiment of the present invention.

The example illustrated in FIG. 45 corresponds to a case in which the base station 4510 and the relay node 4520 transmit, in cooperation with each other, the signal $s_1$ in the $(i+1)^{th}$ frame in order to obtain a diversity gain, and the example illustrated in FIG. 46 corresponds to a case in which the base station 4610 and the relay node 4620 transmit, in cooperation with each other, the signals $s_2$ and $s_1$ in the $(i+1)^{th}$ frame in order to obtain a multiplexing gain.

Figure 47:
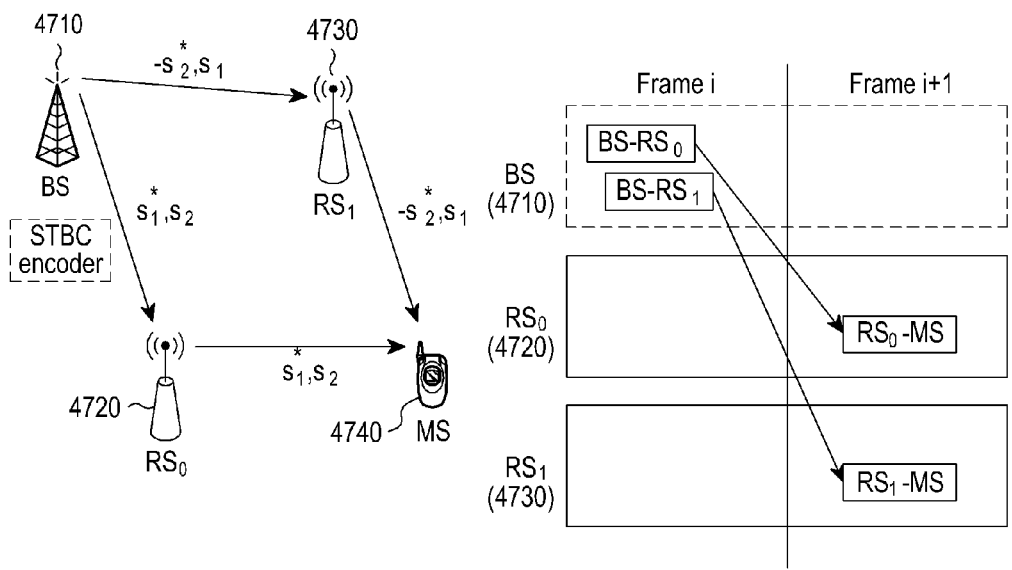
FIG. 47 illustrates an example of a relay-relay cooperation structure as a cooperation structure according to an embodiment of the present invention.

FIG. 47 illustrates an example of a relay node-relay node cooperation structure as a cooperation structure according to an embodiment of the present invention.

Referring to FIG. 47, in an $i^{th}$ frame, a base station 4710 transmits a signal $s_1$ and a signal $s_2$ to a first relay node 4720 and a second relay node 4730 based on the Alamouti coding scheme. In an $(i+1)^{th}$ frame, the first and second relay nodes 4720 and 4730 transmit, in cooperation with each other, the signal $s_1$ and the signal $s_2$ to a user terminal 4740 based on the Alamouti coding scheme, so as to provide a diversity gain to the user terminal 4740.

Figure 48:
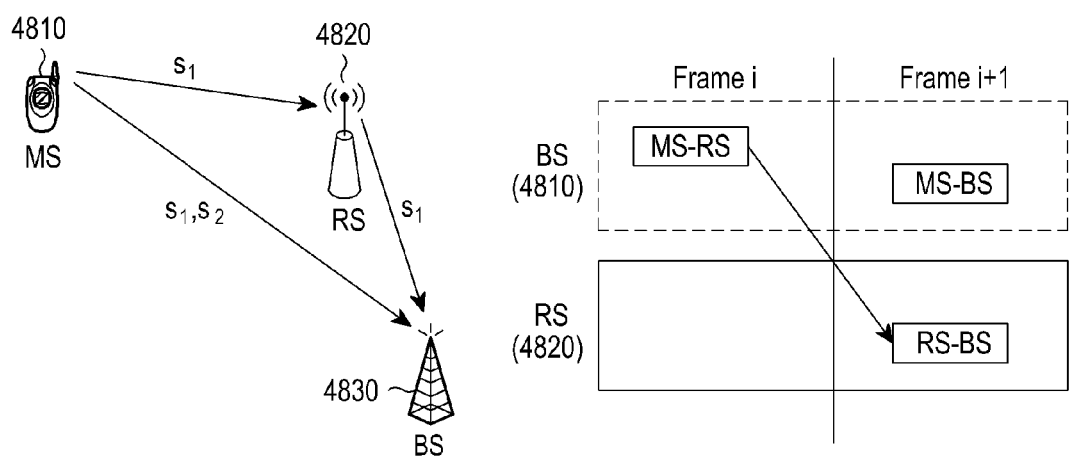
FIG. 48 illustrates an example of a relay-relay cooperation structure as a cooperation structure according to an embodiment of the present invention.

FIG. 48 illustrates an example of a relay node-user terminal cooperation structure as a cooperation structure according to an embodiment of the present invention.

Referring to FIG. 48, a user terminal 4810 transmits a signal $s_1$ to a relay node 4820 in an $i^{th}$ frame, and the user terminal 4810 and the relay node 4820 transmit, in cooperation with each other, a signal $s_2$ and the signal $s_1$ to a base station 4830 in an $(i+1)^{th}$ frame, so as to provide a multiplexing gain.

C-4□ Interface Configuration Determining Scheme

In a relay node according to an embodiment of the present invention, an RAT of at least one interface among backhaul network interfaces and access network interfaces in the relay node may be reconfigured into another RAT. The reconfiguration of an RAT may be performed under the control of a connection configuration determining unit within the relay node.

For example, a Software Defined Ratio (SDR) may be used as a technology for reconfiguring an RAT of a backhaul network interface or an access network interface. It goes without saying that it is possible to employ another RAT reconfiguration technology in order to reconfigure an RAT of a backhaul network interface or an access network interface.

In the process of reconfiguring an RAT of a backhaul network interface into another RAT, an RAT of at least one backhaul network interface is reconfigured into another RAT in order to configure a backhaul network connection with one base station or a plurality of base stations and/or one relay node or a plurality of relay nodes configured by an RAT different from the RAT of the backhaul network interface. For example, a first backhaul network interface configured by LTE is reconfigured into WCDMA in order to configure a backhaul network connection with a base station of WCDMA.

In the process of reconfiguring an RAT of an access network interface into another RAT, an RAT of at least one access network interface is reconfigured into another RAT in order to configure an access network connection with one base station or a plurality of base stations and/or one relay node or a plurality of relay nodes configured by an RAT different from the RAT of the access network interface. For example, a first access network interface configured by WiBro is reconfigured into WLAN in order to configure an access network connection with a base station of WLAN.

Figure 49:
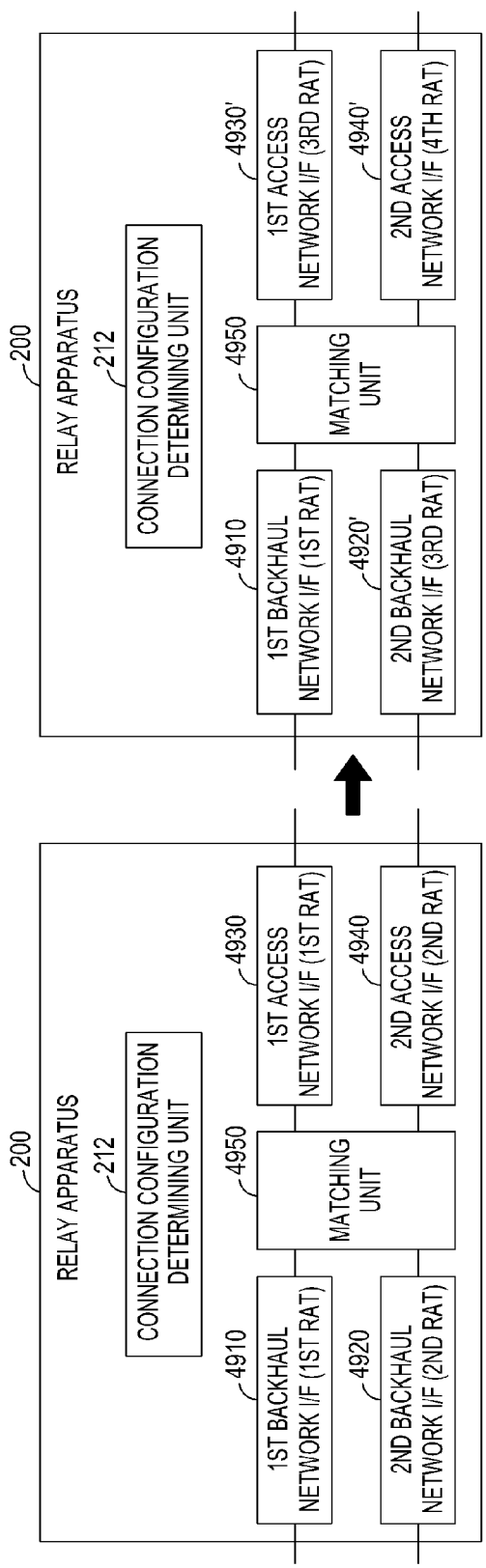
FIG. 49 illustrates an example of RAT reconfiguration of a backhaul network interface and a access network interface by an interface configuration determining scheme according to an embodiment of the present invention.

FIG. 49 illustrates an example of RAT reconfiguration of a backhaul network interface and an access network interface by an interface configuration determining scheme according to an embodiment of the present invention.

Referring to FIG. 49, a first backhaul network interface 4910 configured by a first RAT is maintained to have the first RAT without change, and a second backhaul network interface 4920 configured by a second RAT is reconfigured to have a third RAT (4920'). A first access network interface 4930 configured by the first RAT is reconfigured to have a third RAT (4930'), and a second access network interface 4940 configured by the second RAT is reconfigured to have a fourth RAT (4940').

FIG. 49 is based on a relay node including two backhaul network interfaces 4910 and 4920 and two access network interfaces 4930 and 4940. However, this construction is only for convenience of description, and it goes without saying that the same scheme is applicable to cases where a relay node includes more than or less than two backhaul network interfaces and access network interfaces, in the RAT reconfiguration of the backhaul network interface and access network interface.

C-5☐ Adaptive Connection Configuration Determining Condition of Relay Node

A relay node according to an embodiment of the present invention may adaptively determine a connection configuration for communication between one base station or a plurality of base stations and one user terminal or a plurality of user terminals. In order to determine at least one among the connection configuration and a connection operation, at least one among a channel condition, a service condition, an access condition, a base station request, and a user request is used. Now, the channel condition, the service condition, the access condition, the base station request, and the user request used by a relay node in order to determine a connection configuration will be discussed.

1. Channel condition: The channel condition includes a channel characteristic-related quality factor, a space characteristic-related quality factor, and a channel information using method as follows.

First, the channel characteristic quality factor includes a Received Signal Strength Indicator (RSSI), a Signal-to-Noise Ratio (SNR), a Signal-to-Interference plus Noise Ratio (SINR), an error rate, a channel capacity, a transmission rate, a variance of a transmission rate, and an outage rate. In addition, it goes without saying that other elements related to the channel characteristics may be used as the channel characteristic quality factor. The channel characteristic quality factor is determined by the channel characteristics, which include fading, path attenuation, shadowing, delay spread, multi-path, intra-cell interference, inter-cell interference, Doppler, antenna gain, and channel allocation.

Now, the channel characteristic quality factor will be described in more detail. The RSSI is an indicator indicating a received signal intensity measured by a receiver side, and the SNR is an indicator indicating a ratio of a signal power with respect to a noise power.

The SNR is an indicator indicating a ratio of a signal power with respect to an interference and noise power.

The error rate is a probability of error occurrence at the time of signal transmission, and includes a Bit Error Rate (BER), a Block Error Rate (BLE), a Frame Error Rate (FER), and a Packet Error Rate (PER). The channel capacity corresponds to the maximum quantity of information which can be transmitted through a channel without an error.

The transmission rate refers to an actual transmission rate in consideration of channel characteristic factors, can be expressed by an instantaneous transmission rate or an average transmission rate, and includes a total transmission rate, user-specific transmission rate, and a stream-specific transmission rate.

The variance of a transmission rate is an indicator indicating the degree of change in the transmission rate according to the channel characteristics.

The outage rate corresponds to a probability of communication incapability which may happen when the channel quality does not exceed a predetermined communication incapability standard which includes RSSI, SNR, SINR, error rate, channel capacity, and transmission rate. For example, when the communication incapability standard is set to 0 dB SNR, the outage rate of a user is determined according to a probability by which the user experiences a channel having an SNR lower than or equal to 0 dB.

Next, the space characteristic quality factor is a quality factor intended to consider the space characteristic in addition to the channel characteristic quality factor in the case of transmitting a signal to a plurality of user groups using multiple antennas. The space characteristic quality factor includes a correlation between user channels, a correlation between antennas, a rank of a channel matrix, a stream-specific channel quality factor, and other factors relating to the space characteristic.

Now, the space characteristic quality factor will be discussed in detail. The space characteristic quality factor is an indicator indicating the degree of similarity of the channel characteristics between user channels. When there is a high correlation between user channels, the user channels have a high similarity so that the performance is degraded at the time of multi-user space division multiplexing transmission.

The correlation between antennas is an indicator indicating the similarity of channel characteristics between channels formed through a plurality of antennas used by a receiving user apparatus. When there is a high correlation between antennas, the antennas have a high similarity so that the performance is degraded at the time of space division multiplexing transmission using multiple antennas.

The rank of a channel matrix is an indicator indicating the number of data streams independently usable for a matrix channel formed between a transmitter and a receiver.

The stream-specific channel quality factor indicates an intensity of each stream corresponding to the number of data streams independently usable for a matrix channel formed between a transmitter and a receiver. The stream-specific channel quality factor includes an RSSI, an SNR, an SINR, an error rate, a channel capacity, a transmission rate, a distribution of a transmission rate, and an outage rate as described above.

The channel information using method is classified into a channel quality information using method and a channel state information using method as follows, according to the channel information used by a transmitter for transmission of a plurality of user signals.

When a transmitter uses only channel quality information without using channel state information, the transmitter can use all methods corresponding to an open-loop transmission for the signal transmission. The open-loop transmission includes a power division transmission, a division transmission, a space multiplexing, a beam forming, a transmission diversity, an antenna selection, and an antenna set division.

When a transmitter uses channel state information, the transmitter can use all methods corresponding to a closed-loop transmission for the signal transmission, and the closed-loop transmission includes a DPC, Interference Alignment (IA), a precoding, and a beam forming.

2. Service condition: The service condition is a condition relating to a service required by a user, and includes a Quality of Service (QoS) and a traffic class. It goes without saying that other factors relating to a service may be used as the service condition.

The QoS includes a delay condition for a service required by each user, a transmission rate condition, an error rate condition, and an outage condition.

The traffic class corresponds to types of services required by each user and includes a large capacity file, voice communication, image communication, video streaming, web browsing, and a game.

3. Access condition: The access condition refers to a condition relating to an access environment between communication nodes, and includes an interface-specific RAT configuration, backhaul network type, access network type, the number of network-specific usable communication nodes, communication node-specific usability, communication node-specific load, user distribution, and a user access condition. It goes without saying that other factors relating to an access environment between communication nodes may be used as the access condition.

The interface-specific RAT configuration indicates an RAT used by each interface for at least one interface configuring a relay apparatus.

The backhaul link connection network type indicates the type of a network around a relay apparatus, which can establish a backhaul link with the relay apparatus.

The access link connection network type indicates the type of a network around a relay apparatus, which can establish an access link with the relay apparatus.

The number of network-specific usable communication nodes refers to the number of communication nodes around a relay apparatus, which can establish a backhaul link connection, an access link connection, and a direct access link connection with the relay apparatus.

The communication node-specific usability refers to whether communication nodes around a relay apparatus can establish a backhaul link connection, an access link connection, and a direct access link connection with the relay apparatus.

The communication node-specific load indicates a load on each of communication nodes around a relay apparatus.

The user distribution indicates the distribution of users using a communication service according to each RAT supportable by a relay apparatus.

The user access condition indicates the reason why user terminals around a relay node desire to access the relay node. The user access condition includes a handover access and an initial access.

The handover access includes an intra-cell base station-relay node handover access, an inter-cell base station-base station handover access, an inter-cell base station-relay node handover access, an inter-cell relay node-relay node handover access, a heterogeneous network handover access, a multi-path access, a multi-homing access, and a multi-session access.

The intra-cell base station-relay node handover access corresponds to a handover operation performed by a user terminal when the user terminal moves between a base station area and a relay node area within a single cell.

The inter-cell base station-base station handover access corresponds to a handover operation performed by a user terminal when the user terminal moves between a first base station area and a second base station area of adjacent cells.

The inter-cell base station-relay node handover access corresponds to a handover operation performed by a user terminal when the user terminal moves between a first base station area and a relay node area within a second base station area of adjacent cells.

The inter-cell relay node-relay node handover access corresponds to a handover operation performed by a user terminal when the user terminal moves between a relay node area within a first base station area and a relay node area within a second base station area of adjacent cells.

The heterogeneous network handover access corresponds to a handover operation performed by a user terminal when the user terminal moves between cell areas of different RATs. According to an embodiment of the present invention, a user terminal performs a heterogeneous network handover access when the user terminal moves from a WCDMA area to a WLAN area.

The multi-path access corresponds to an operation of a user terminal for performing network access through a plurality of paths.

The multi-path access corresponds to an operation of simultaneously accessing a plurality of base stations for one service session by a user terminal.

The multi-session access corresponds to an operation of accessing at least one base station in order to connect a plurality of service sessions by a user terminal.

4. Base station request: The base station request corresponds to a method of determining a connection configuration of a relay node according to contents of a request from a base station connected to the relay node, and the contents of a request from the base station may include a direct request for connection configuration of the relay node, as well as channel condition, service condition, and access condition as described above.

5. User request: The user request corresponds to a method of determining a connection configuration of a relay node according to contents of a request from a user terminal connected to the relay node, and the contents of a request from the user terminal may include a direct request for connection configuration of the relay node, as well as channel condition, service condition, and access condition as described above.

C-6☐ Condition Acquiring Scheme of Relay Node

In order to determine the connection configuration, a relay node according to an embodiment of the present invention should acquire at least one among a channel condition, a service condition, an access condition, a base station request, and a user request. In this event, the relay node can perform a measurement by itself, request at least one of a base station, a user terminal, and another relay node to provide the information, or receive the information periodically or non-periodically provided by at least one of a base station, a user terminal, and another relay node.

1. Conditions measured by itself: Conditions measured by a relay node itself includes inter-base station-relay node channel conditions (RSSI, SNR, SINR, error rate, channel capacity, transmission rate, variance of transmission rate, outage rate, inter-antenna correlation, rank of a channel matrix, and stream-specific channel quality factor), interface-specific RAT configuration, and the number of network-specific usable communication nodes.

2. Conditions requested to base station: Conditions which a relay node requests and receives from a base station includes service conditions (QoS and traffic class), backhaul link connection network type, communication node-specific usability, and communication node-specific load.

3. Conditions requested to user terminal: Conditions which a relay node requests and receives from a relay node include channel conditions between the relay node and a user terminal (RSSI, SNR, SINR, error rate, channel capacity, transmission rate, transmission rate distribution, outage rate, inter-antenna correlation, rank of a channel matrix, and stream-specific channel quality factor), service conditions (QoS and traffic class), access link connection network type, communication node-specific usability, and user access condition.

It goes without saying that a part of the conditions acquired by a relay node in order to adaptively determine the connection configuration as described above can be acquired either through a direct measurement by itself or by requesting and receiving them from a base station, a user terminal, or another relay node.

For example, a relay node according to an embodiment of the present invention can reconfigure an interface of the relay node by requesting and acquiring RAT information from each of a base station and a user terminal for relaying between the base station and the user terminal. That is, upon acquiring information that an RAT of a base station is a first RAT and an RAT of a user terminal is a second RAT, the relay node reconfigures the connection configuration by reconfiguring a backhaul network interface into the first RAT and reconfiguring an access network interface into the second RAT.

Further, by requesting and acquiring load information of a base station, the relay node determines whether the base station can accept a corresponding user terminal. Further, the relay node determines a relay scheme for guaranteeing QoS of a corresponding user terminal by measuring SNR between a base station and a relay node by itself and requesting and acquiring, from a user terminal, SNR and QoS between the relay node and the user terminal.

In the way described above, a relay node according to an embodiment of the present invention adaptively determines the connection configuration in accordance with at least one among a channel condition, a service condition, an access condition, a base station request, and a user request.

C-7□ Role Distribution Scheme of Relay Node

A relay node according to an embodiment of the present invention may transfer or take back a part of the role of determining the connection configuration to or from at least one of at least one base station, at least one user terminal, and at least another one relay node.

For example, a relay node according to an embodiment of the present invention can transfer the role of determining the backhaul link connection to at least one base station, so as to allow the at least one base station to determine the connection configuration for communication between the base station and at least one interface of the relay node.

As another example, a relay node according to an embodiment of the present invention can transfer the role of determining the relay scheme to at least one user terminal, so as to allow the at least one user terminal to determine the reception and transmission scheme of the relay node for relaying between at least one base station and at least one user terminal.

As another example, a relay node according to an embodiment of the present invention can take back the role of determining a cooperation scheme from at least one base station, so as to enable the relay node to determine the cooperation scheme of the relay node for relaying between at least one base station and the user terminal.

As another example, a relay node according to an embodiment of the present invention can take back the role of determining an access link connection from at least one user terminal, so as to enable the relay node to determine the connection configuration for communication between at least one user terminal and at least one interface of the relay node.

While the present invention has been shown and described with reference to certain embodiments thereof, it will be understood by those skilled in the art that various changes in form and details may be made therein without departing from the scope of the present invention. Thus, the scope of the present invention shall not be determined merely based on the described exemplary embodiments and rather determined based on the accompanying claims and the equivalents thereto.

The invention claimed is:

1. A method for controlling connection between at least one first communication node and at least one second communication node by a relay node in a communication system, the method comprising:

determining, by the relay node, a relay connection configuration for communication between the at least one first communication node and the at least one second communication node, wherein the relay connection configuration comprises: at least one of an indirect access connection configuration to interconnect the at least one first communication node and the at least one second communication node with passing through the relay node, and a direct access connection configuration to interconnect the at least one first communication node and the at least one second communication node without passing through the relay node, wherein the indirect access connection configuration comprises:

a backhaul network connection configuration to interconnect the at least one first communication node and the relay node;

an access network connection configuration to interconnect the at least one second communication node and the relay node; and an internal connection configuration to interconnect a backhaul network interface bank to be connected to the at least one first communication node and an access network interface bank to be connected to the at least one second communication node within the relay node, wherein the determining of the relay connection configuration comprises:

determining at least one of a network access structure, a relay structure, a cooperation scheme, and an interface configuration, wherein the determining of the network access structure comprises at least one of:

for the backhaul network connection configuration, a first process of determining a connection configuration for communication between at least one backhaul network interface composing the relay node and the at least one first communication node;

for the access network connection configuration, a second process of determining a connection configuration for communication between at least one access network interface composing the relay node and the at least one second communication node;

for the direct access connection configuration, a third process of determining a connection configuration for direct communication between the at least one first communication node and the at least one second communication node.

2. The method of claim 1, wherein at least one Radio Access Technology (RAT) set corresponding to the at least one first communication node is equal to at least one RAT set corresponding to the at least one second communication node; or at least one RAT set corresponding to the at least one first communication node is different from at least one RAT set corresponding to the at least one second communication node, and when at least one among the at least one first communication node and the at least one second communication node includes a plurality of communication nodes, RATs of at least two of the plurality of the at least one first communication node or the at least one second communication node are identical or different.

3. The method of claim 1, wherein a part of operations for determining the relay connection configuration is transferred to or taken back from at least one of the at least one first communication node and the at least one second communication node.

4. The method of claim 1, wherein the relay connection configuration is determined in accordance with at least one among a channel condition, a service condition, an access condition, a base station request, and a user request.

5. The method of claim 1,
wherein the determining of the relay structure comprises:
determining an internal connection configuration of the relay node by at least one of a matching matrix setting and a link matching for internal connection between the backhaul network interface bank and the access network interface bank composing the relay node,
wherein the matching matrix setting is a connection configuration to determine a matching relation between at least one backhaul network interface and at least one access network interface; and
the link matching is a connection configuration to match an RAT signal of at least one backhaul network interface with an RAT signal of at least one access network interface, and
wherein the determining of the cooperation scheme comprises:
determining at least one of a cooperation transmission scheme and a cooperation structure,
wherein the cooperation transmission scheme comprises a non-cooperation scheme, a diversity cooperation scheme, and a multiplexing cooperation scheme; and
the cooperation structure comprises a base station-relay node cooperation structure, a relay node-relay node cooperation structure, and a relay node-user terminal cooperation structure.

6. The method of claim 5, wherein, in order to determine the network access structure, a state of each interface included in the access network interface bank and the backhaul network interface bank is set to one of an operation state, an off state, and a standby state.

7. The method of claim 5, wherein the connection configuration determined by the first process comprises:
a connection configuration between a base station or another relay node and a backhaul network interface included in the relay node;
a connection configuration between a backhaul network interface and a plurality of base stations, a plurality of other relay nodes, or a plurality of nodes including at least one base station and at least another one relay node;
a connection configuration between a plurality of backhaul network interfaces and a base station or another relay node; or
a connection configuration between a plurality of backhaul network interfaces and a plurality of base stations, a plurality of other relay nodes, or a plurality of nodes including at least one base station and at least another one relay node, the connection configuration determined by the second process comprises:
a connection configuration between a user terminal or another relay node and an access network interface included in the relay node;
a connection configuration between an access network interface and a plurality of user terminals, a plurality of other relay nodes, or a plurality of nodes including at least one user terminal and at least another one relay node;
a connection configuration between a plurality of access network interfaces and a user terminal or another relay node; or
a connection configuration between a plurality of access network interfaces and a plurality of user terminals, a plurality of other relay nodes, or a plurality of nodes including at least one user terminal and at least another one relay node, and the connection configuration determined by the third process comprises:
a direct access connection configuration between a base station or another relay node and a user terminal or another relay node;
a direct access connection configuration between a plurality of base stations, a plurality of other relay nodes, or a plurality of nodes including at least one base station and at least another one relay node and a plurality of user terminals, a plurality of other relay nodes, or a plurality of nodes including at least one user terminal and at least another one relay node;
a direct access connection configuration between a base station or another relay node and a plurality of user terminals, a plurality of other relay nodes, or a plurality of nodes including at least one user terminal and at least another one relay node; or
a direct access connection configuration between a plurality of base stations, a plurality of relay nodes, or a plurality of nodes including at least one base station and at least another one relay node and a user terminal or another relay node.

8. The method of claim 5, wherein the RAT signal of the at least one backhaul network interface and the RAT signal of the at least one access network interface are matched in accordance with at least one among a relay matching, a conversion matching, a distribution matching, a distribution-conversion matching, a combination matching, a combination-conversion matching, a combination-distribution matching, a combination distribution-conversion matching, a combination-conversion distribution matching, and a combination-conversion distribution-conversion matching.

9. The method of claim 5, wherein the interface configuration comprises a connection configuration to independently reconfigure RAT for each of at least one backhaul network interface and at least one access network interface included in the relay node into another RAT.

10. The method of claim 1, further comprising:
scanning at least one of the at least one first communication node and the at least one second communication node.

11. An apparatus for controlling connection between at least one first communication node and at least one second communication node in a communication system, the apparatus comprising:
a backhaul network interface bank including at least one backhaul network interface to form a link with the at least one first communication node;
an access network interface bank including at least one access network interface to form a link with the at least one second communication node; and
a control unit to determine a relay connection configuration between the at least one first communication node and the at least one second communication node and control the backhaul network interface bank and the access network interface bank by the determined relay connection configuration,
wherein the relay connection configuration comprises at least one of an indirect access connection configuration to interconnect the at least one first communication node and the at least one second communication node with passing through the relay node and a direct access connection configuration to interconnect the at least one first communication node and the at least one second communication node without passing through a relay node, wherein the indirect access connection configuration comprises:

a backhaul network connection configuration to interconnect the at least one first communication node and the relay node;

an access network connection configuration to interconnect the at least one second communication node and the relay node; and an internal connection configuration to interconnect the backhaul network interface bank to be connected to the at least one first communication node and the access network interface bank to be connected to the at least one second communication node within the relay node, wherein a connection configuration determining unit configuring the control unit determines at least one of a network access structure, a relay structure, a cooperation scheme, and an interface configuration, wherein the network access structure is determined by at least one of:

for the backhaul network connection configuration, a first process of determining a connection configuration for communication between at least one backhaul network interface composing the relay node and the at least one first communication node;

for the access network connection configuration, a second process of determining a connection configuration for communication between at least one access network interface composing the relay node and the at least one second communication node;

for the direct access connection configuration, a third process of determining a connection configuration for direct communication between the at least one first communication node and the at least one second communication node.

12. The apparatus of claim 11, wherein at least one Radio Access Technology (RAT) set corresponding to the at least one first communication node is equal to at least one RAT set corresponding to the at least one second communication node or at least one RAT set corresponding to the at least one first communication node is different from at least one RAT set corresponding to the at least one second communication node, and when at least one among the at least one first communication node and the at least one second communication node includes a plurality of communication nodes, RATs of at least two of the plurality of the at least one first communication node or the at least one second communication node are identical or different.

13. The apparatus of claim 11, wherein a connection configuration determining unit configuring the control unit performs transfers or taken back a part of an operations for determining the relay connection configuration to or from at least one of the at least one first communication node and the at least one second communication node.

14. The apparatus of claim 11, wherein the relay connection configuration is determined in accordance with at least one among a channel condition, a service condition, an access condition, a base station request, and a user request.

15. The apparatus of claim 11, wherein the relay structure is determined by determining an internal connection configuration of the relay node by at least one of a matching matrix setting and a link matching for internal connection between the backhaul network interface bank and the access network interface bank composing the relay node, wherein the matching matrix setting is a connection configuration to determine a matching relation between at least one backhaul network interface and at least one access network interface;

the link matching is a connection configuration to match an RAT signal of at least one backhaul network interface with an RAT signal of at least one access network interface, and wherein the cooperation scheme is determined by determining at least one of a cooperation transmission scheme and a cooperation structure, wherein the cooperation transmission scheme comprises a non-cooperation scheme, a diversity cooperation scheme, and a multiplexing cooperation scheme; and the cooperation structure comprises a base station-relay node cooperation structure, a relay node-relay node cooperation structure, and a relay node-user terminal cooperation structure.

16. The apparatus of claim 15, wherein the control unit further comprises a connection operation control unit to set, in order to determine the network access structure, a state of each interface included in the access network interface bank and the backhaul network interface bank to one of an operation state, an off state, and a standby state.

17. The apparatus of claim 15, wherein the connection configuration determined by the first process comprises:

a connection configuration between a base station or another relay node and a backhaul network interface included in the relay node;

a connection configuration between a backhaul network interface and a plurality of base stations, a plurality of other relay nodes, or a plurality of nodes including at least one base station and at least another one relay node;

a connection configuration between a plurality of backhaul network interfaces and a base station or another relay node; or a connection configuration between a plurality of backhaul network interfaces and a plurality of base stations, a plurality of other relay nodes, or a plurality of nodes including at least one base station and at least another one relay node, the connection configuration determined by the second process comprises:

a connection configuration between a user terminal or another relay node and an access network interface included in the relay node;

a connection configuration between an access network interface and a plurality of user terminals, a plurality of other relay nodes, or a plurality of nodes including at least one user terminal and at least another one relay node;

a connection configuration between a plurality of access network interfaces and a user terminal or another relay node; or a connection configuration between a plurality of access network interfaces and a plurality of user terminals, a plurality of other relay nodes, or a plurality of nodes including at least one user terminal and at least another one relay node, and the connection configuration determined by the third process comprises:

a direct access connection configuration between a base station or another relay node and a user terminal or another relay node;

a direct access connection configuration between a plurality of base stations, a plurality of other relay nodes, or a plurality of nodes including at least one base station and at least another one relay node and a plurality of user terminals, a plurality of other relay nodes, or a plurality of nodes including at least one user terminal and at least another one relay node;

a direct access connection configuration between a base station or another relay node and a plurality of user terminals, a plurality of other relay nodes, or a plurality of nodes including at least one user terminal and at least another one relay node; or a direct access connection configuration between a plurality of base stations, a plurality of relay nodes, or a plurality of nodes including at least one base station and at least another one relay node and a user terminal or another relay node.

18. The apparatus of claim 15, wherein the RAT signal of the at least one backhaul network interface and the RAT signal of the at least one access network interface are matched in accordance with at least one among a relay matching, a conversion matching, a distribution matching, a distribution-conversion matching, a combination matching, a combination-conversion matching, a combination-distribution matching, a combination distribution-conversion matching, a combination-conversion distribution matching, and a combination-conversion distribution-conversion matching.

19. The apparatus of claim 15, wherein the interface configuration comprises a connection configuration to independently reconfigure RAT for each of at least one backhaul network interface and at least one access network interface included in the relay node into another RAT.

20. The apparatus of claim 11, wherein the control unit performs scanning at least one of the at least one first communication node and the at least one second communication node.

* * * * *